US011146927B2

(12) United States Patent
Panergo et al.

(10) Patent No.: US 11,146,927 B2
(45) Date of Patent: Oct. 12, 2021

(54) AIRCRAFT TO GROUND DATA SYSTEMS AND COMPUTING METHODS

(71) Applicant: The Boeing Company, Chicago, IL (US)

(72) Inventors: Reynold Rullan Panergo, Lynnwood, WA (US); Lakshmi M. Puttaswamy, Bellevue, WA (US); Mycah Mattox, Mountlake Terrace, WA (US); Subramaniam Natarajan, Karnataka (IN); Selvakumar Santharam, Karnataka (IN); Timothy William Anstey, Seattle, WA (US); Nathan T. VanRheenen, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/721,653

(22) Filed: Dec. 19, 2019

(65) Prior Publication Data
US 2021/0051455 A1 Feb. 18, 2021

(30) Foreign Application Priority Data
Aug. 16, 2019 (IN) .............................. 201911033157

(51) Int. Cl.
*H04W 4/42* (2018.01)
*G08G 5/00* (2006.01)
(Continued)

(52) U.S. Cl.
CPC .............. *H04W 4/42* (2018.02); *B64D 45/00* (2013.01); *G06F 9/541* (2013.01); *G06F 9/546* (2013.01);
(Continued)

(58) Field of Classification Search
CPC ... H04W 4/42; G08G 5/0013; H04L 67/2842; H04L 45/125; H04L 43/0876; H04L 67/06; H04L 67/12
See application file for complete search history.

(56) References Cited

U.S. PATENT DOCUMENTS 8,442,751 B2 * 5/2013 Kimberly .................. G06F 8/61
701/120
8,594,931 B2 * 11/2013 Sterkel ................... H04H 60/51
701/454

(Continued)

FOREIGN PATENT DOCUMENTS

EP    1798872    6/2007

OTHER PUBLICATIONS

European Patent Office, Extended European Search Report for related European Patent Application Publication EP 1798872, dated Jan. 25, 2021.

*Primary Examiner* — Dong-Chang Shiue
(74) *Attorney, Agent, or Firm* — Dascenzo Gates Intellectual Property Law, P.C.

(57) ABSTRACT

A computing method for transmitting data from an aircraft computing device on an aircraft to a ground computing device, comprises receiving, by an aircraft API executing on an aircraft interface computing device, an initial communication from an aircraft service executing on the aircraft computing device; determining, by the aircraft API, that a data file is to be transmitted from the aircraft computing device to the ground computing device; transmitting, to the aircraft computing device, a data signal configured to cause the data file to be transmitted from the aircraft computing device to a transient storage location associated with an aircraft interface computing device; and causing the trans- (Continued)

mission of the data file from the transient storage location to the ground computing device.

20 Claims, 8 Drawing Sheets

(51) Int. Cl.
*H04L 29/08* (2006.01)
*H04B 7/185* (2006.01)
*B64D 45/00* (2006.01)
*G06F 9/54* (2006.01)
*G06K 9/62* (2006.01)

(52) U.S. Cl.
CPC ........... *G06K 9/6267* (2013.01); *G08G 5/003* (2013.01); *G08G 5/0013* (2013.01); *G08G 5/0026* (2013.01); *H04B 7/18506* (2013.01); *H04L 67/06* (2013.01); *H04L 67/10* (2013.01); *H04L 67/18* (2013.01); *H04L 67/2842* (2013.01); *H04L 67/2847* (2013.01); *B64D 2045/0085* (2013.01)

(56) References Cited

U.S. PATENT DOCUMENTS

| | | |
|---|---|---|
| 10,049,508 B2 | 8/2018 | Jensen et al. |
| 2010/0167723 A1 | 7/2010 | Soumier et al. |
| 2018/0102964 A1* | 4/2018 | Kao ................... H04L 67/12 |
| 2019/0110174 A1 | 4/2019 | Way et al. |
| 2020/0342771 A1* | 10/2020 | Mohan ................ G08G 5/0013 |

* cited by examiner

AIRCRAFT TO GROUND DATA SYSTEMS AND COMPUTING METHODS

RELATED APPLICATION

This application claims priority to India Patent Application No. 201911033157 entitled AIRCRAFT TO GROUND DATA SYSTEMS AND COMPUTING METHODS, which was filed on Aug. 16, 2019, and the complete disclosure of which is hereby incorporated by reference.

FIELD

The present disclosure relates to network systems for facilitating air-to-ground data communication with aircraft computing devices.

BACKGROUND

Aircraft computing devices are an important component of today's aircraft, as are the software modules operating on aircraft computing devices to enable them to communicate with other computing systems. Additionally, as computing technology has evolved, the complexity of aircraft computing devices available to be integrated into new aircraft, as well as the corresponding software written to operate thereon, have also increased. However, because aircraft software is expensive to create and maintain due to the rigorous requirements of flight certifications and must be calibrated against numerous security and safety concerns, once an aircraft is deployed with a functional computing system and corresponding software, the original computing system generally remains onboard the aircraft for the life of the aircraft. This means that entities that interact with aircraft computing devices onboard aircraft must currently exchange data with the many different types of computing systems and corresponding software modules which are utilized by today's aircraft. Since there are no common ground software interfaces for ground clients to communicate with multiple aircraft computing devices and/or software modules, each ground client must currently employ multiple software communication interfaces individually written for a corresponding type of computing system and/or software module.

Additionally, the availability and reliability of uplink and downlink communication systems for air-to-ground communication with aircraft varies across different geographic regions. This means that during air travel, the ability of ground-based entities to communicate with aircraft computing devices can be very unreliable. This results in dropped data transfers, missed transmissions, and other data transfer issues.

SUMMARY

Computing methods and computing systems for exchanging data files between aircraft computing devices and ground computing devices are disclosed.

Some methods comprise receiving, by an aircraft API executing on an aircraft interface computing device, an initial communication from an aircraft service executing on an aircraft computing device located onboard an aircraft; determining, by the aircraft API, that a data file is to be transmitted from the ground computing device to the aircraft computing device; transmitting, to the ground computing device, a data signal configured to cause the data file to be transmitted from the ground computing device to a transient storage location associated with the aircraft interface computing device; and causing the data file to be transmitted from the transient storage location to the aircraft computing device.

DESCRIPTION

Figure 1:
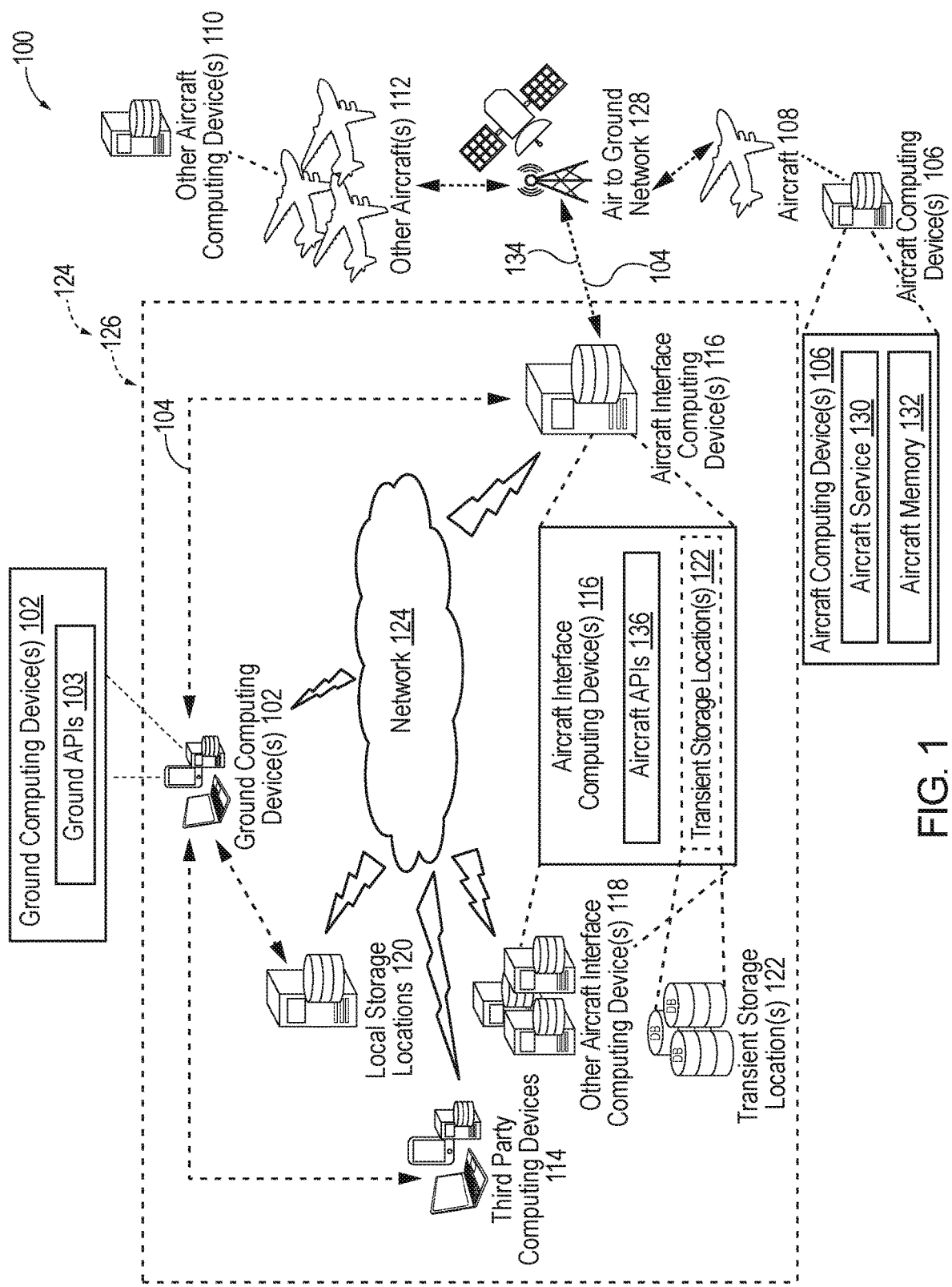
FIG. 1 is schematic drawing of an example environment that illustrates techniques for exchanging data files between aircraft computing devices and a ground computing device.

The present disclosure describes techniques for exchanging data files between aircraft computing devices and a ground computing device. By utilizing these techniques, external ground-based computing devices are able to use a single interface to communicate and exchange data files with many different types of legacy aircraft computing devices. The disclosed techniques employ a set of decoupled interfaces to provide access points for communicating with multiple types of aircraft computing devices. Additionally, as will be discussed further below, the techniques described herein utilize cloud network resources to more efficiently exchange data files between aircraft computing devices in flight and a ground computing device. Not only does this improve the reliability of such data exchanges, but it also more efficiently uses network resources.

FIGS. 1-8 illustrate examples of computing systems, network-connected computing devices, and methods for exchanging data files between aircraft computing devices and a ground computing device. In general, in the drawings, elements that are likely to be included in a given examples are illustrated in solid lines, while elements that are optional or alternatives are illustrated in dashed lines. However, elements that are illustrated in solid lines are not essential to all examples of the present disclosure, and an element shown in solid lines may be omitted from a particular example without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or utilized with any of the figures without departing from the scope of the present disclosure.

FIG. 1 is schematic drawing of example environments 100 that illustrate techniques for exchanging data files between aircraft computing devices and a ground computing device. Additional details of individual operations illustrated in FIG. 1 and discussed below are described in more detail with reference to subsequent figures.

The environment 100 includes one or more network-connected ground computing devices 102 that exchanges data files 104 with one or more aircraft computing devices 106 operating on aircraft 108, other aircraft computing devices 110 operating on other aircraft 112, or both. In some examples, the ground computing device 102 operates electronic distribution software that enables data files to be exchanged between the ground computing device 102 and aircraft computing devices 106 and/or other aircraft computing devices 110. In some examples, data files 104 include one or more of a software module, a software update, a flight plan, an entertainment file, an alert, a message, a security log, a performance log, health monitoring data, a system log, or other data construct that is associated with the performance and/or operation of a corresponding aircraft 108 or 112. As used herein, aircraft 112 also may be referred to as aircraft 108 and aircraft computing device 110 may be referred to as aircraft computing device 106, with aircraft 108 and aircraft computing device 106 being used generally when referring to a single aircraft and its corresponding one or more aircraft computing devices.

In various embodiments according to the present disclosure, the ground computing device 102 may include many different types of electronic devices, including, but not limited to, a personal computer, a laptop computer, a server, a cloud-based device or devices, and so forth. In some embodiments, the ground computing device 102 is associated with an entity that engages in the transmission of data files with aircraft 108 in flight, such as an airline, an aircraft manufacturer, a communication service provider, a regulation agency, an air traffic control body, etc.

In some embodiments, the ground computing device 102 hosts and/or provides one or more ground-based programmatic services. As illustrated, ground computing device 102 hosts ground application programming interfaces (APIs) 103 that permit third party computing devices 114 to interact with ground computing device 102, and as a result ultimately with aircraft 108 and other aircraft 112. In addition, in some examples, the ground computing device 102 includes ground-based service modules that acquire, manipulate, and/or evaluate data files 104 from aircraft computing devices 106. For example, in some examples, the ground computing device 102 hosts a software suite that provides a messaging service, a video stream service, monitoring of aircraft part interface, an aircraft sensor monitoring, a connectivity interface, a navigation assistance service, or other ground-based service that allows the ground computing device 102 to transmit data with an aircraft and/or a fleet of aircraft. In various embodiments, the ground computing device 102 provides a plurality of services that each operate by transmitting data files 104 between the ground computing device 102 and one or more aircraft computing devices 106. For example, in various embodiments a software-based service executing on a ground computing device 102 provides executable instructions to push entertainment files and/or flight plans to an aircraft operated by an airline.

In other examples, the ground computing device 102 is associated with a service provider, such as an aircraft manufacturer that provides third parties, such as airlines, with communication infrastructure for communicating with aircraft in flight. In an example embodiment, an aircraft manufacturer and/or aircraft component manufacturer provides a ground-based software service that uses the ability of the ground computing device 102 to communicate with aircraft computing devices 106 to pull system health information gathered by sensors on aircraft 108 and/or 112, and/or to push software updates to electronic systems within aircraft 108 and/or 112. Alternatively or in addition, a service provider uses the ground computing device 102 to acquire performance data about one or more aircraft 108 and/or the components on the aircraft while the aircraft is in flight, and then push some or all the performance data to a third party airline. For example, in some embodiments where the ground computing device 102 exchanges data with aircraft operated by different airlines, the ground computing device 102 segregates the data from an individual aircraft 108 according to the corresponding airline that operates the individual aircraft 108, and/or transmits some or all of the data to the corresponding airline. In this way, the ground computing device 102 enables multiple airlines to simultaneously exchange data with aircraft in its fleet.

As shown in FIG. 1, the ground computing device 102 is connected to one or more of third party computing devices 114, remote aircraft interface computing devices 116, other remote aircraft interface computing devices 118, local storage locations 120, and transient storage locations 122 via network 124. In various embodiments, network 124 is a wired network, a wireless network, or a combination of both. Examples of network 124 include the internet, a wide area network, a local area network, or a combination thereof. Network 124 also may be referred to herein as ground network 124, and in some examples, the network 124 includes a cloud computing network 126.

In some embodiments, the third party computing devices 114 are associated with another entity that is different from the entity associated with the ground computing device 102. For example, where the ground computing device 102 are operated by a communication service provider, the third party computing devices 114 include devices that are associated with airlines that engage the communication service provider to enable data transmission with their aircraft fleet.

As further illustrated in FIG. 1, environment 100 includes an aircraft interface computing device 116 and other aircraft interface computing devices 118 in communication with ground computing device 102 over network 124. Each of the aircraft interface computing devices 116, 118 executes aircraft APIs that enables data files to be exchanged between the ground computing device 102 and aircraft computing devices 106 and/or other aircraft computing devices 110. In various embodiments according to the present disclosure, the aircraft interface computing devices 116 may include many different types of electronic devices, including, but not limited to, server devices. In some examples, the individual ones of aircraft interface computing devices 116 include a computing resource of a cloud server, a dedicated server, or a combination thereof. In some examples, the aircraft interface computing devices 116 are cloud server resources operating within cloud computing network 126, such as transient routers. As used herein, aircraft interface computing device 118 also may be referred to as aircraft interface computing device 116, with aircraft interface computing device 116 being used generally when referring to a single aircraft interface computing device 116.

The aircraft interface computing devices 116 are geographically distributed across multiple geographic regions. A geographic region corresponds to a threshold distance, a coverage area, a geopolitical boundary, or other geographic zones. For example, individual aircraft interface computing devices 116 are geographically positioned so as to be remote from one another and/or the ground computing device 102 (e.g., located in a geographically separate server farm).

As further shown in FIG. 1, the aircraft interface computing device 116 also is in communication with aircraft 108 and other aircraft 112 over an air-to-ground network 128. In some embodiments, the air-to-ground network 128 includes one or more networks for facilitating air-to-ground data exchanges between airborne aircraft computing devices 106 and ground-based aircraft interface computing devices 116. For example, in some embodiments, the air-to-ground network 128 includes one or more of a wireless network, a satellite network, a cellular network, or a combination thereof.

Aircraft 108 and 112 are shown in FIG. 1 as commercial airplanes. However, in various embodiments, aircraft 108 and 112 can include any of personal aircraft, military aircraft, private airplanes, rotorcraft, spacecraft, or other types of aircraft having aircraft computing devices 106 operating thereon. Aircraft computing device 106 can include many different types of electronic devices, including, but not limited to, a personal computer, a laptop computer, a server, and an onboard computer infrastructure, located on and/or otherwise incorporated into individual aircraft 108 and 112. The aircraft computing devices 106 provide one or more functionalities for the aircraft, such as entertainment, operation support, navigation support, aircraft component operation, data security, health and safety monitoring, etc. In some examples, the aircraft computing devices 106 obtain operational and/or health data from sensors associated with one or more components of the aircraft 108. In some embodiments, the aircraft computing devices 106 provide pilots of the aircraft 108 and/or 112 with flight plan information, navigation assistance, and/or full/partial autopilot functionality.

As shown in FIG. 1, an aircraft service 130 is stored on aircraft memory 132 associated with each of the aircraft computing devices 106 and the other aircraft computing devices 110. The aircraft memory 132 is a component memory of the corresponding aircraft computing device 106, or an external memory storage that is separate from the corresponding aircraft computing device 106. In some embodiments, the aircraft memory 132 also stores data files 104. The aircraft service 130 is a software module that is executable to cause the corresponding aircraft computing device 106 or 110 to interface with external computing devices, such as the ground computing devices 102, aircraft interface computing devices 116, transient storage locations 122, or other computing devices.

In some embodiments, there are multiple versions of aircraft services 130 executing on the aircraft computing devices 106 that can interface with a specific aircraft API. That is, different aircraft computing devices 106 have different software modules that are individually executable to cause its corresponding aircraft computing device 106 to interact with an aircraft interface computing device 116. For example, aircraft 108 includes a first aircraft computing device 106 that uses a first aircraft service 130 to communicate with external computing devices, while a particular other aircraft 112 includes another aircraft computing device 110 that uses a second aircraft service 130 that is different from the first aircraft service 130 to communicate with external computing devices. The different versions of aircraft services 130 correspond to different software modules programmed to perform on different types of computing devices, programmed in different languages, created by different programming entities, programmed to operate within different operating systems and/or with different versions of a software, etc.

In some examples, the aircraft service 130 is executable to cause the corresponding aircraft computing device 106 to transmit an initial communication 134 to one or more computing devices such as the ground computing device 102, the aircraft interface computing devices 116, the transient storage locations 122, or other computing devices. In some embodiments, transmitting the initial communication 134 includes establishing a secure connection between the aircraft computing device 106 or 110 and the external computing device. The initial communication 134 is be transmitted over the air-to-ground network 128.

In some embodiments, the initial communication 134 includes one or more identifiers that are associated with the corresponding aircraft, aircraft computing device, aircraft API, or a combination thereof. In some examples, the initial communication 134 includes one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, the initial communication 134 also can include a command. A command is a software-based instruction that identifies an action and/or data transfer that is to occur between the ground computing devices 102 and one or more aircraft computing devices 106. An example command corresponds to a request to exchange a data file 104 between the ground computing device 102 and the aircraft computing device 106.

In some examples, the aircraft service 130 is executable to cause the corresponding aircraft computing device 106 to transmit the initial communication 134 periodically, according to a schedule, and/or based on a trigger event, such as an input from a user associated with the aircraft (e.g., pilot, passenger, steward, etc.), a data file 104 being generated, a data file 104 reaching a preset size, an available amount of the aircraft memory 132 reaching or dropping below a threshold, occurrence of a preset event (e.g., reaching a preset altitude, reaching a preset location, the aircraft being airborne for a preset amount of time, etc.), or reception of a transmission from an external computing device, such as the ground computing device 102, the aircraft interface computing device 116, the transient storage locations 122, or other computing devices.

Accordingly, because of the wide number of aircraft services 130 deployed, entities that interact with aircraft computing devices onboard aircraft, such as airline manufacturers and airlines, must have multiple aircraft APIs for communicating with different types of aircraft computing devices, or be limited to only communicating with aircraft computing devices having a particular type of aircraft computing device. This makes it difficult for aircraft manufacturers and airlines to communicate broadly across their entire fleet. Not only must such aircraft manufacturers and airlines employ a plurality of aircraft APIs that allow their computing devices to communicate with each of a plurality of aircraft services 130 used by the aircraft computing devices 106 deployed on the aircraft within their fleet, but also each of their software protocols that are written to facilitate and/or utilize data exchange between aircraft computing devices must be written such that it cannot interface with each deployed aircraft service 130. Not only does this make the coding prohibitively complex, but it also requires each software protocol to be updated each time a new aircraft service 130 is deployed onto an aircraft computing device 106 and/or 110.

The techniques of the present disclosure address these issues by utilizing a system of decoupled interfaces to conduct communication and data exchanges between a ground computing device 102 and an aircraft computing device 106. For example, FIG. 1 shows each of the aircraft interface computing devices 116 storing aircraft APIs 136. The aircraft APIs 136 are software modules that are executable to cause the corresponding aircraft interface computing devices 116 to facilitate the exchange of data files 104 between the ground computing devices 102 and the aircraft computing devices 106.

In some embodiments, in response to receiving the initial communication 134, an aircraft interface computing device 116 is configured to determine an aircraft classifier associated with at least one of the aircraft, the aircraft computing device, the aircraft service, or a combination thereof, from which the initial communication 134 originated. An aircraft classifier corresponds to one or more of a type of the aircraft, a year of the aircraft, a model of the aircraft, an airline associated with the aircraft, a type of computing device on which the aircraft service is executing, a type of application to which the aircraft service corresponds, or a combination thereof. In some embodiments, the aircraft interface computing device determines the aircraft classifier based on one or more aircraft identifiers included in the initial communication 134. For example, based on the initial communication 134 including a tail number from the originating aircraft, the aircraft interface computing device 116 can access a data lookup table that identifies relationships between aircraft tail numbers and the corresponding type of aircraft computing device and/or aircraft service. In various embodiments, such a data construct is stored on one or more storage locations within cloud computing network 126, aircraft interface computing device 116, or both. Alternatively, the aircraft interface computing device 116 transmits the aircraft identifier and/or the aircraft classifier to the ground computing device 102, the ground computing device 102 accesses a data lookup table that identifies relationships between aircraft identifiers and/or aircraft classifiers and corresponding aircraft computing devices, aircraft services, and/or aircraft types, and transmits the type of aircraft computing device, aircraft service, and/or aircraft from which the initial communication 134 originated. In another example, the initial communication 134 includes metadata that identifies the type of aircraft computing device and/or aircraft service executing on the originating aircraft.

In some embodiments, the aircraft interface computing device 116 is configured to select an aircraft API 136 for communicating with the aircraft computing device. As illustrated in FIG. 1, the aircraft interface computing device 116 can store multiple aircraft APIs 136, with each aircraft API defining a programmatic protocol for communicating with a specific aircraft computing device 106 and/or aircraft service 130 executing thereon. The programmatic protocol of each aircraft API 136 is configured to enable the aircraft interface computing device 116 to interact with one or more corresponding aircraft computing devices and/or corresponding aircraft services 130 thereof. The selected aircraft API 136 then uses its programmatic protocol to facilitate a data exchange between the ground computing device 102 and the aircraft computing device and/or aircraft service executing on the originating aircraft. In some embodiments, the aircraft interface computing device 116 selects an appropriate aircraft API based on a schedule or table that indicates relationships between aircraft identifiers and/or aircraft classifiers and corresponding programmatic protocols of aircraft API. In this way, not only can the aircraft interface computing device 116 quickly select and/or automatically deploy an aircraft API 136 for interfacing with any aircraft computing device 106, but by acting as an intermediate decoupled interface from ground services operated by ground computing device 102, each of the ground services are able to interface with any type of aircraft computing device 106 and/or aircraft service 130. In other embodiments, an appropriate aircraft API 136 is automatically available and utilized for interaction with a corresponding aircraft service 130 as a result of the initial communication 134.

In some embodiments, the aircraft interface computing device 116 also receives an additional initial communication from another aircraft computing device 110 onboard another aircraft 112 over the air-to-ground network 128. The additional initial communication includes one or more aircraft identifiers, which the aircraft interface computing device 116 uses to identify one or more aircraft classifiers associated with the other aircraft 112, the other aircraft computing device 110, and/or the aircraft service 130 executing on the other aircraft computing device 110. The aircraft interface computing device 116 then uses the aircraft classifiers to select the corresponding aircraft API 136 that is able to communicate with the other aircraft computing device 110, and/or the aircraft service executing on the other aircraft computing device 110. In some examples, the aircraft API 136 selected for communicating with the other aircraft computing device 110 is the same as the aircraft API 136 selected for communicating with the aircraft computing device 106. In other examples, it may be a different aircraft API.

In embodiments where the initial communication 134 includes a command to exchange a data file 104, the aircraft interface computing device 116 utilizes the aircraft API 136 to facilitate such an exchange of the data file 104. For example, where the initial communication 134 includes a request for a particular video file to be uploaded to the aircraft computing device 106, the aircraft API 136 defines a programmatic protocol for interacting with the originating aircraft computing device, and then causes the particular video file to be uploaded to the aircraft computing device 106. Alternatively or in addition, the aircraft interface computing device 16 may send an initiation request to an aircraft computing device 106, such as for a selection of sensor and/or health data stored on the aircraft memory 132, for example, to be downloaded from the aircraft computing device 106. In such an example, the aircraft API 136 is utilized to transmit a signal to cause the aircraft computing device 106 to transmit the selection of sensor and/or health data over the air-to-ground network 128.

Alternatively, where the initial communication 134 does not include a command to exchange a data file 104, the aircraft API 136 determines that a data file 104 is be exchanged with the aircraft computing device 106 by transmitting a command request to the ground computing device 102. In some examples, the command request includes the aircraft identifiers, aircraft classifiers, metadata that identifies the aircraft/aircraft computing device/aircraft API, or a combination thereof. Upon receipt of the command request, the ground computing device 102 accesses a data construct that identifies relationships between aircraft and corresponding commands that are to be executed. For example, the ground computing device 102 stores and maintains a data structure, or data construct, that stores a queue of commands that are to be performed in association with individual aircraft 108 and/or aircraft computing devices 106. In response to receiving the command request from the aircraft interface computing device 116, the ground computing device 102 uses the aircraft identifiers, aircraft classifiers, and/or metadata included in the command request to identify the queue associated with the corresponding aircraft 108 and/or aircraft computing device 106, and then identify one or more commands that are to be executed in association with the corresponding aircraft 108 and/or aircraft computing device 106. The ground computing device 102 then transmits the one or more commands to the aircraft interface computing device 116, and the aircraft API 136 is utilized to exchange data files with the aircraft computing device 106 according to the one or more commands.

Where a command corresponds to a data file 104 being transmitted from an aircraft computing device 106 to another computing device (e.g., ground computing device 102, third party computing devices 114, local storage locations 120, etc.), the data file 104 is first transmitted to a network 124 (e.g., the cloud computing network 126) over the air-to-ground network 128. For example, in some embodiments, the data file 104 is transmitted from the aircraft computing device 106 to the aircraft interface computing device 116.

In some embodiments, the data file 104 is exchanged between the aircraft computing device 106 and the cloud computing network 126 via a transient storage location 122. The transient storage location 122 corresponds to a data storage resource of cloud computing network 126, and is configured to exchange data files 104 between the ground computing device 102 over the network 124, and also exchange data files 104 between the aircraft computing devices 106 over the air-to-ground network 128. In some embodiments, the cloud computing network 126 includes a plurality of transient storage locations 122 through which data files 104 can be routed. Individual transient storage locations 122 are geographically positioned so that they are more proximate to and/or have stronger connections to aircraft 108 and 110 located in an associated geographic area. Thus, by using the transient storage location 122, the environment 100 is able to ensure that the data file 104 is transmitted to the associated aircraft computing device 106 over a stronger, more efficient, and/or more reliable uplink/downlink connection (i.e., connection over air-to-ground network 128). Additionally, by using a transient storage location 122, if a break in the communication over the air-to-ground network 128 occurs during the transfer of the data file 104, the transfer can be resumed with minimal involvement from the ground computing device 102. For example, where the data file 104 is being transmitted to the aircraft computing device 106, the transmission of the data file 104 can be resumed without the ground computing devices 102 needing to resend the data file 104, as the data file 104 is fully stored in the transient storage location 122. Additionally, where the data file 104 is being transmitted from the aircraft computing device 106, the transmission of the data file 104 does not need to be sent until it is fully downloaded from the aircraft computing device 106 to the transient storage location 122. Thus the ground computing device 102 is unaffected by a break in communication over the air-to-ground network 128 during the transfer of the data file 104.

In some examples, the transient storage location 122 is selected from a plurality of transient storage locations 122 by the ground computing device 102, the aircraft interface computing device 116, or a combination thereof. In some examples, the transient storage location 122 through which the data file 104 is to be transferred is selected based on the aircraft being geographically located within a threshold distance of the transient storage location at the time the data file will be transferred to the aircraft computing device, a flight plan of the aircraft, an expected strength/efficiency of the uplink/downlink connection between the aircraft computing device 106 and the transient storage location 122 during at least the portion of the flight plan of the aircraft, or a combination thereof. In some embodiments, when there is a break in communication over the air-to-ground network 128 during the transfer of the data file 104, the ground computing device 102 and/or the aircraft interface computing device 116 selects a different transient storage location 122 through which to resume the data transfer. For example, based on the aircraft 108 moving into a new geographic area in which there is a stronger, more efficient, and/or more reliable connection with a different transient storage location, the ground computing device 102 and/or the aircraft interface computing device 116 selects to continue the data exchange through the different transient storage location 122.

In some embodiments, transmitting the data file 104 from an aircraft computing device 106 to a ground-based computing device comprises transmitting the data file 104 to a local storage location 120 associated with the ground computing device 102. For example, the local storage location 120 can correspond to a database that stores information associated with the aircraft computing device, other aircraft computing device 110, or a subset thereof (e.g., a fleet of aircraft computing devices). In some embodiments, the ground computing device 102 and/or the local storage location 120 includes a database that stores data from aircraft computing devices 106, and is further configured to segregate the stored data according to the aircraft classifiers. For example, in some embodiments, the ground computing device 102 and/or the local storage location 120 stores the data files received from aircraft computing devices 106 operated by a first airline in a first database, and the data files received from aircraft computing devices 106 operated by a second airline in a second database.

In some embodiments, transmitting the data file 104 from an aircraft computing device 106 to a ground-based computing device comprises transmitting the data file 104 to a third party computing device 114 and/or storage location associated with the third party computing device 114. As an example embodiment, the ground computing device 102 and/or the local storage location 120 segregates the stored data according to the type of data. In some embodiments, the ground computing device 102 and/or the local storage location 120 stores a security log from an aircraft in a separate database from performance logs from the aircraft.

Where a command corresponds to a data file 104 being transmitted from a ground-based computing device (e.g., ground computing device 102, third party computing devices 114, local storage locations 120, etc.) to an aircraft computing device 106, the data file 104 is first transmitted to an aircraft interface computing device 116 and/or transient storage location 122 via a network 124 (e.g., the cloud computing network 126). Upon determining that a data file is to be transmitted to aircraft computing device 106 operating on aircraft 108, the ground computing device 102 and/or aircraft interface computing device 116 determines a most efficient path for transmitting the data file 104 to the aircraft computing device 106. For example, based upon the flight plan of the aircraft 108 passing through a region within which a particular aircraft interface computing device 116 and/or transient storage location 120 has a reliable and/or high quality air-to-ground coverage, the data file 104 is transmitted to the particular aircraft interface computing device 116 and/or transient storage location 122, and then transmitted to the aircraft computing device 106 from the particular aircraft interface computing device 116 and/or transient storage location 122 via the air-to-ground network 128.

Due to the unreliability of air-to-ground connections, breaks in connection occur during data exchanges with aircraft computing devices 106 over the air-to-ground network 128. When such a break occurs, the aircraft service 130 initiates an additional initial communication. Upon reception of the additional initial communication, an aircraft interface computing device 116 causes the broken data exchange to continue. The additional initial communication includes one or more aircraft identifiers associated with the aircraft service 130, the aircraft computing device 106, the aircraft 108, or a combination thereof. In some embodiments, the additional initial communication includes a command and/or other indication that the broken data exchange is to be completed. Alternatively, the aircraft interface computing device 116 determines that the data exchange was broken based on the one or more aircraft identifiers included in the additional initial communication and/or metadata stored by the aircraft interface computing device 116, the ground computing device 102, and/or a transient storage location 122. In some embodiments, the additional initial communication is received by an aircraft interface computing device that is different from the aircraft interface computing device 116 that received the initial communication 134. For example, due to the aircraft 108 traveling to a new geographic region, the additional initial communication is received by an aircraft interface computing device 116 in the new geographic region. The aircraft interface computing device 116 then utilizes an aircraft API 136 for communicating with the aircraft computing device 106 based on the one or more aircraft identifiers included in the additional initial communication.

Figure 2:
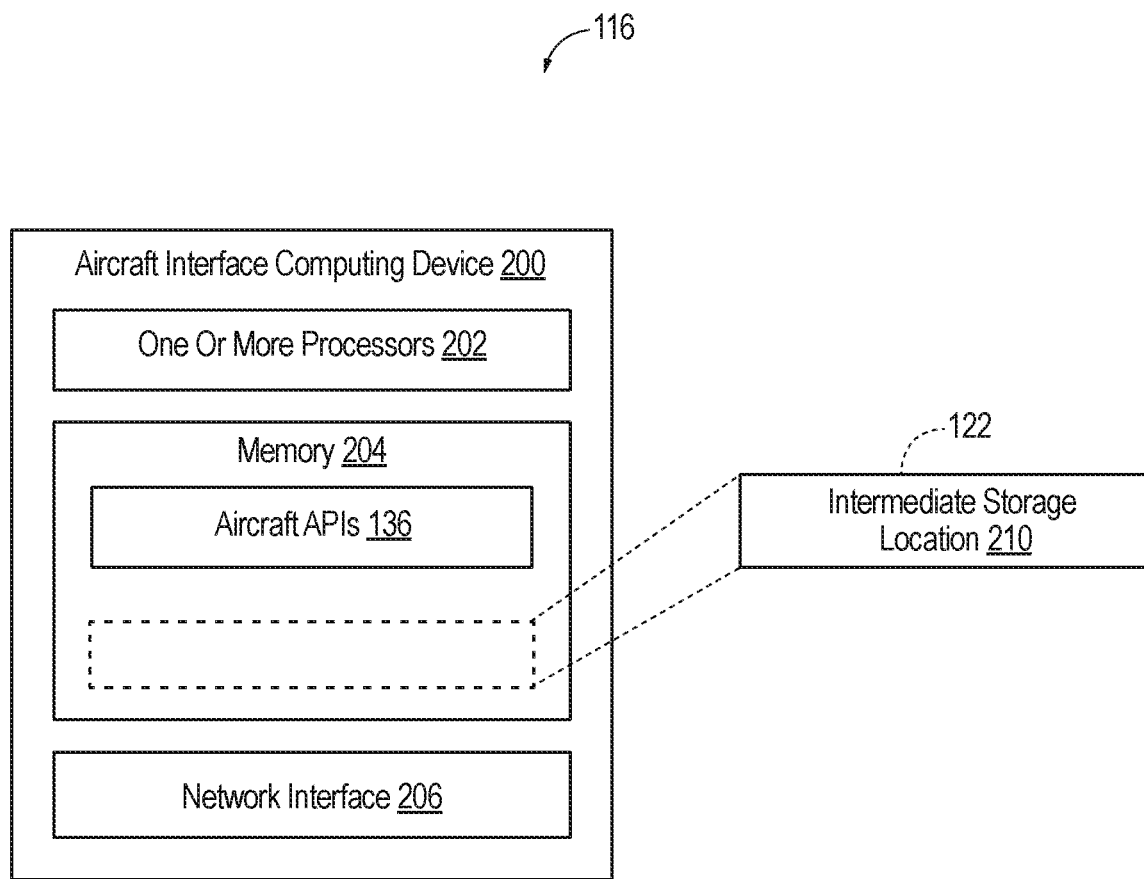
FIG. 2 is a schematic representation of a remote aircraft interface computing device for exchanging data files between aircraft computing devices and a ground computing device.
Figure 3:
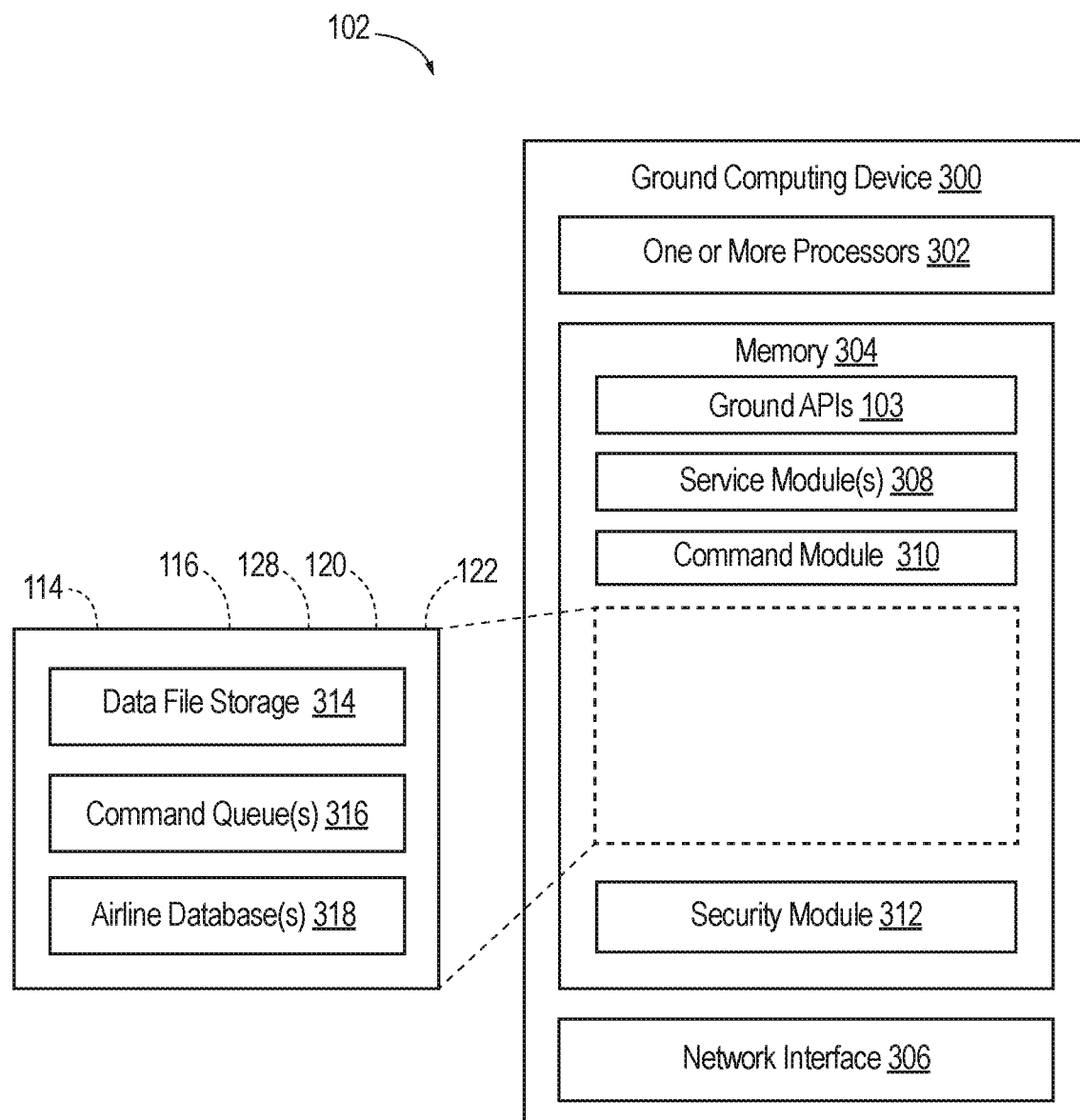
FIG. 3 is a schematic representation of ground computing device(s) for exchanging data files between aircraft computing devices and the ground computing device(s).

FIG. 2-3 are schematic diagrams illustrating example aircraft interface computing devices 200 and ground computing device 300 for exchanging data files between aircraft computing devices and a ground computing device, according to the present disclosure. FIG. 1 illustrates a generalized environment and conceptual flow of operations. FIGS. 2-3 illustrate additional details of hardware and software components that, in some examples according to the present disclosure, are utilized to implement such techniques. The computing devices 200 and 300 are merely two examples, and the techniques described herein are not limited to performance using the computing devices 200 and 300 of FIGS. 2-3. Accordingly, any of the details of aircraft interface computing devices 200 and/or ground computing device 300 described or depicted with regard to FIGS. 2-3 may be utilized within environment 100 of FIG. 1. Additionally, any of the details described or depicted with regard to ground computing device 102, aircraft interface computing devices 116, and/or additional other aircraft interface computing devices 118 within environment 100 of FIG. 1 may be utilized by one or more of aircraft interface computing devices 200 and ground computing device 300 of FIGS. 2-3.

FIG. 2 is a schematic diagram illustrating example aircraft interface computing devices 200 for exchanging data files between aircraft computing devices and a ground computing device, according to the present disclosure. FIG. 2 illustrates additional details of the hardware and software components that, in some examples, are utilized with environment 100 of FIG. 1, are utilized to communicate with ground computing device 300 of FIG. 3, and/or that are utilized to implement techniques and/or methods 400, 500, 600, 700, and 800 illustrated in FIGS. 4-8. The aircraft interface computing devices 200 are merely examples, and the techniques described herein are not limited to performance using the aircraft interface computing devices 200 of FIG. 2. That is, aircraft interface computing device 200 of FIG. 2 is an example of an aircraft interface computing device 116, and ground computing device 300 of FIG. 3 is an example of a ground computing device 102.

According to the present disclosure, in various embodiments the aircraft interface computing devices 200 correspond to any computing device that is connected to ground computing device 102, other aircraft interface computing devices 118, and/or transient storage locations 122 over a network 124, and which also are connected to aircraft computing device 106 and other aircraft computing devices 110 over the air-to-ground network 128. As noted, the aircraft interface computing devices 200 correspond to remote aircraft interface computing devices 116. For example, the aircraft interface computing devices 200 can include a collection of server devices that provide network services for hosting and executing aircraft APIs 136 that enables services operated by ground computing device 102 to interface with aircraft computing devices 106.

In FIG. 2, the aircraft interface computing devices 200 include one or more processors 202, memory 204 communicatively coupled to the one or more processors 202, and a network interface 206. According to the present disclosure, the memory 204 stores a plurality of aircraft APIs 136. Each aircraft API 136 is configured to enable the aircraft interface computing device 116 to interact with one or more corresponding aircraft computing devices 106 and/or corresponding aircraft services 130. For example, an individual aircraft API 136 is written to communicate with the type of aircraft computing device 106, or aircraft service 130 thereof, deployed on a particular make and model of aircraft. In this way, the aircraft interface computing device 116 is able to communicate with a wide number of different types of aircraft computing devices 106 and/or aircraft services 130. Additionally, when a new type of aircraft computing devices 106 and/or aircraft service 130 is used on an aircraft, a new aircraft API 136 can be introduced that enables the aircraft interface computing device 116 to interface with the new type of aircraft computing devices 106 and/or aircraft service 130. Moreover, if a type of aircraft computing devices 106 and/or aircraft service 130 deployed on aircraft is updated, the corresponding aircraft API 136 can be updated and/or replaced with a new aircraft API 136.

FIG. 2 further illustrates memory 204 as storing an intermediate storage location 210 in which data files 104 can be stored during their transmission between an aircraft computing device 106 and the ground computing device 102. In an example embodiment, a data file 104 is transmitted from the ground computing device 102 over the network 124 and is stored in the intermediate storage location 210, and then transmitted from the intermediate storage location 210 to the aircraft computing device 106 over the air-to-ground network 128. The intermediate storage location 210 is a dedicated area of memory 204.

Alternatively or in addition, the intermediate storage location 210 is a separate computing device such as a transient storage location 122, as schematically illustrated in FIG. 2. The transient storage location 122 is a data storage resource of cloud computing network 126 that is external to the aircraft interface computing device 116.

The aircraft APIs 136 are executable on the one or more processors 202 to cause the aircraft interface computing device 116 to facilitate the exchange of data files between aircraft computing devices 106 and a ground computing device 102, such as is discussed herein with reference to FIGS. 1 and 4-7. By acting as a decoupled interface, the aircraft interface computing device 116 is able to be used by one or more services operated by ground computing device 102 to communicate with many types of aircraft computing devices 106 and/or aircraft services 130 thereof without the services needing to be individually coded to interact with each type of aircraft computing device 106 and/or aircraft service 130.

The aircraft APIs 136 are executable to receive an initial communication 134 from an aircraft computing device 106 over the air-to-ground network 128. For example, an aircraft API 136 is executable to receive an initial communication 134 transmitted by an aircraft service 130 executing on an aircraft computing device 106 and over a satellite communications network. In various embodiments, the initial communication 134 is transmitted by the aircraft service 130 periodically, according to a schedule, and/or based on a trigger event, such as an input from a user associated with the aircraft (e.g., pilot, passenger, steward, etc.), a data file 104 being generated, a data file 104 reaching a preset size, an available amount of the aircraft memory 132 reaching or dropping below a threshold, occurrence of a preset event (e.g., reaching a preset altitude, reaching a preset location, the aircraft being airborne for a preset amount of time, etc.), or a combination thereof. For example, in some embodiments the aircraft computing device 106 transmits the initial communication 134 to initiate a data transfer in response to an amount of aircraft health data reaching or exceeding a threshold amount.

Alternatively or in addition, an aircraft API 136 is executable to transmit an initiation signal, and the initial communication 134 is transmitted by the aircraft computing device 106 in response to a reception of the initiation signal. In various embodiments, the corresponding aircraft API 136 transmits the initiation signal periodically, or in response to a communication request from ground computing device 102. For example, where the ground computing device 102 is operating a navigation service, the ground computing device 102 transmits a notification that a new flight plan for aircraft 108 is to be sent to an aircraft computing device 106, and the aircraft API 136 is executable to transmit the initiation signal to the aircraft computing device 106.

In some embodiments, the initial communication 134 includes one or more identifiers associated with the originating aircraft, aircraft computing device, aircraft service, or a combination thereof. For example, in some embodiments the initial communication 134 includes an airline identifier (e.g., an international civil aviation organization (ICAO) code or an international air transport association (IATA) code, etc.), an airplane identifier (e.g., a tail number, a registration number, a manufacturer number, a serial number, etc.), a software identifier, or a combination thereof.

The aircraft API 136 is further executable to determine an aircraft classifier associated with at least one of the aircraft, aircraft computing device, aircraft service, or a combination thereof, from which the initial communication 134 originated. An aircraft classifier corresponds to one or more of a type of the aircraft, a year of the aircraft, a model of the aircraft, an airline associated with the aircraft, a type of computing device on which the aircraft API is executing, a type of API to which the aircraft service 130 correspond, or a combination thereof. In an example embodiment, the aircraft API 136 determines the aircraft classifier based on one or more aircraft identifiers included in the initial communication 134. For example, in such an embodiment based on the initial communication 134 including a tail number from the originating aircraft, the aircraft interface computing device 116 accesses a data lookup table (e.g., a protocol schedule) that indicates relationships between aircraft tail numbers and the corresponding type of aircraft computing device and/or aircraft service 130 thereof. In some examples, a protocol schedule is located on an aircraft interface computing device 116; however, in other examples, a protocol schedule is stored by the ground computing device 102 or on a device accessible to the ground computing device 102. In such embodiments, the aircraft interface computing device 116 determines the aircraft classifier by transmitting the aircraft identifiers included in the initial communication 134 to the ground computing device 102, and it is the ground computing device 102 that accesses the data construct to identify relationships between aircraft identifiers and/or aircraft classifiers and corresponding aircraft computing devices, aircraft APIs, and/or aircraft types, and transmits the type of aircraft computing device, aircraft API, and/or aircraft from which the initial communication 134 originated. Alternatively or in addition, the initial communication 134 includes metadata that identifies the type of aircraft computing device and/or aircraft service executing on the originating aircraft.

Aircraft APIs 136 also are executable to receive additional initial communications 134 from the aircraft computing device 106 and/or another aircraft computing device 110 onboard another aircraft 112 over the air-to-ground network 128. In some embodiments, the additional initial communication 134 also includes one or more aircraft identifiers. For example, in various embodiments, the additional initial communication 134 from another aircraft 112 includes one or more aircraft identifiers that the aircraft API 136 uses to identify one or more aircraft classifiers associated with the other aircraft 112, the other aircraft computing device 110, and/or the aircraft service 130 executing on the other aircraft computing device 110.

In some embodiments, the initial communication 134 also includes a command. The command corresponds to a request to exchange a data file 104 between the ground computing device 102 and the aircraft computing device 106. In some examples, the command corresponds to an identification of a data file 104 that is to be transmitted from the aircraft computing device 106 to the ground computing device 102, and/or a data file 104 that is to be transmitted from the ground computing device 102 to the aircraft computing device 106. Alternatively, where the initial communication 134 does not include a command to exchange a data file 104, the aircraft API 136 transmits a command request to the ground computing device 102 to determine whether a data file 104 is to be exchanged with the aircraft computing device 106. A command request includes the aircraft identifiers, the aircraft classifiers, metadata that identifies the aircraft, the aircraft computing device, and/or the aircraft API, or a combination thereof.

Once it is determined that a command is to be exchanged between the aircraft computing device 106 and the ground computing device 102, the aircraft API 136 is executable to transmit one or more signals to cause the exchange of the data file 104 to occur. The one or more signals are transmitted to the aircraft computing device 106, the ground computing device 102, or both. In some examples, the aircraft API 136 causes a transmission of a signal to the ground computing device 102 that notifies the ground computing device 102 that a data file 104 is to be received from aircraft computing device 106, and request a location to which the data file 104 is to be transmitted. In other examples, the aircraft API 136 causes a transmission of a signal to the ground computing device 102 and/or to the aircraft computing device 106 that identifies a data file 104 that is to be transmitted, and identifies an intermediate storage location 210 (e.g., aircraft interface computing device 116, transient storage location 122, etc.) through which the data file 104 is to be transmitted through. In some examples, such a transmission also includes security and/or identification information that the ground computing device 102 and/or the aircraft computing device 106 uses to verify that the ground computing device 102, the aircraft computing device 106, and/or the aircraft API 136 has permission to access the data file 104.

FIG. 3 is a schematic diagram illustrating example ground computing device 300 for exchanging data files between aircraft computing devices and a ground computing device, according to the present disclosure. FIG. 3 illustrates additional details of hardware and software components that, in some examples, are utilized with environment 100 of FIG. 1, are utilized to communicate with aircraft interface computing devices 200 of FIG. 2, and/or that are utilized to implement techniques and/or methods 400, 500, 600, 700 and 800 illustrated in FIGS. 4-8. Ground computing device 300 is merely an example, and the techniques described herein are not limited to performance using the ground computing device 300 of FIG. 3.

According to the present disclosure, in some examples, ground computing device 300 corresponds to any computing device that is connected to an aircraft interface computing device 116, other an aircraft interface computing devices 118, and/or transient storage locations 122 over a network 124. In various embodiments, the ground computing device 300 corresponds to a ground computing device 102. In some examples, the ground computing device 300 includes a collection of many different types of electronic devices, including, but not limited to, a personal computer, a laptop computer, a server, and so forth. In other examples, the ground computing device 300 hosts and/or operates a software-based service that facilitates the exchange of data files 104 between aircraft computing devices 106 and 110 and the ground computing device 300. In other examples, the ground computing device 300 is associated with an entity that engages in the transmission of data files with aircraft 108 in flight, such as an airline, an aircraft manufacturer, a communication service provider, a regulation agency, an air traffic control body, etc.

In FIG. 3, the ground computing device 300 includes one or more processors 302, memory 304 communicatively coupled to the one or more processors 302, and a network interface 306. According to the present disclosure, the memory 304 stores ground APIs 103, one or more service modules 308, a command module 310, and a security module 312. FIG. 3 further illustrates the memory 304 as optionally housing and/or storing data file storage 314, one or more command queues 316, and/or one or more airline databases 318. Alternatively, one or more of the data file storage 314, one or more command queues 316, and/or one or more airline databases 318 are stored on an alternate computing device, such as a third party computing devices 114, aircraft interface computing device 116, other remote aircraft interface computing devices 118, local storage locations 120, and/or transient storage locations 122, as schematically represented in FIG. 3.

The one or more service modules 308 are executable to cause the ground computing device 300 to execute a software-based service. For example, in various embodiments a service module 308 is executable to cause a data file 104 to be exchanged between the ground computing device 102 and an aircraft computing device 106. The service modules 308 are configured to utilize the aircraft interface computing device as a decoupled interface to facilitate data exchange between the ground computing device 102 and aircraft computing devices 106. Because service modules 308 are configured to utilize the aircraft interface computing device as a decoupled interface for interacting with aircraft computing devices 106, the service modules 308 do not need to be coded to be able to interface with each version/type of aircraft computing device 106 and/or aircraft service 130 thereof. Instead, each service module 308 needs only to be written to interact with the aircraft APIs 136, and the aircraft APIs 136 facilitate communication with the aircraft computing devices 106 and 108 and/or aircraft services 130 thereof. Not only does this simplify the initial coding requirements of creating new service modules 308, but it also decreases maintenance requirements as updates to the ability of the aircraft APIs 136 to communicate with new types of aircraft computing devices 106 and aircraft APIs 136 also enable the service modules 308 to communicate with the new types of aircraft computing devices 106 and aircraft services 130.

In an example embodiment, the ground computing device 102 is associated with an airline that operates a fleet of aircraft, and a service module 308 is executable to cause the ground computing device 300 to gather and store component health data collected by aircraft sensors of the fleet of aircraft via the aircraft APIs 136. Such a service module 308 also optionally can be configured to provide the component health data to third party computing devices associated with the airline, analyze the component health data to determine components that are likely to require maintenance and/or replacement, provide notifications of maintenance suggestions for the fleet of aircraft, or a combination thereof. As another example, a service module 308 is executable to cause the ground computing device 300 to transmit software instructions and/or updates to aircraft computing devices 106 via the aircraft APIs 136.

As shown in FIG. 3, the memory 304 optionally includes data file storage 314. The data file storage 314 includes one or more databases and/or storage locations where data files 104 are stored. For example, the data file storage 314 can be hosted on storage locations on the memory 304, storage devices accessible to the ground computing device 300 (e.g., local storage locations 120, third party computing devices 114, etc.), or a combination thereof. Examples of data files 104 include a software module, a software update, a flight plan, an entertainment file, an alert, a message, a security log, a performance log, health monitoring data, a system log, or other data construct that is associated with the performance and/or operation of a corresponding aircraft 108 or 112. For example, memory 304 may include a first data file storage in which data files that are to be transmitted to aircraft computing devices are stored, and a second data file storage in which data files that are received from the aircraft computing device are stored. In some embodiments, the data files 104 stored in the data file storage 314 is segregated according to data file type, aircraft type, aircraft identity, aircraft computing device, airline, or other classification means. For example, in some embodiments the data file storage 314 includes multiple dedicated storage areas, where each dedicated storage area stores data files that correspond to a particular airline, service module, aircraft type, aircraft computing device type, etc.

The command module 310 is executable to cause the ground computing device 300 to receive commands, generate a command queue 316, maintain the command queue 316, and/or determine commands that are to be executed based on the command queue 316. A command is a software-based instruction that identifies an action and/or data transfer that is to occur between the ground computing devices 102 and one or more aircraft computing device 106. An example command identifies a data file 104 that is to be exchanged, one or more identifiers and/or aircraft classifiers with the data file 104 that is to be exchanged, a schedule of when the data file 104 is to be exchanged, or other instructions that enable the command module 310 to facilitate the execution of a data exchange included in the command. In some examples, a command corresponds to an instruction that sensor data collected by aircraft computing devices operating on aircraft of a certain classification (i.e., aircraft type, sensor type, etc.) be transmitted from the individual aircraft computing devices to the ground computing device 300 according to a determined frequency or schedule. In some embodiments, a command also includes security, identification, and/or permissions information that enables the data exchange included in the command to occur. For example, such a command can include a security key that is to be provided in order for a data file 104 in the data file storage 314 to be accessed and/or transmitted.

In some embodiments, the commands are received via user inputs into the ground computing device 300 (e.g., inputs provided via a keyboard, mouse, touchpad, camera, audio, etc.), a physical input to the ground computing device 300 (e.g., a CD, DVD, software input, etc.), data inputs provided to the ground computing device 300 via the network interface 306 (e.g., input from a third party computing device 114, aircraft computing device 106, etc.), or a combination thereof. In an example embodiment, a user enters one or more identifiers and/or classifiers of one or more aircraft, and a selection of a data file 104 that is to be exchanged between the ground computing device 300 and the one or more aircraft computing devices operating on aircraft associated with the one or more identifiers and/or classifiers. Alternatively or in addition, commands are generated by a service module 308 executing on the ground computing device 300. For example, a service module 308 that monitors flight conditions can determine that the weather in a particular geographic region is hazardous, and then generate and provide to the command module 310 a command to transmit a warning of the hazardous weather and/or a new flight plan that avoids the hazardous weather to the individual aircraft computing devices operating on aircraft within the geographic region.

In some embodiments, the command module 310 is further executable to receive the data files 104 for upload to one or more aircraft computing devices 106. In some embodiments, a data file 104 is input directly into the ground computing device 300 via a user input such as by keyboard, touchscreen, mouse selection, etc. Alternatively, the data file 104 is received by the command module 310 via a data transfer from another computing device, such as from third party computing device 114. In an example embodiment, a computing device operated by an airline provides the command module 310 with a video file that is to be uploaded to the entertainment systems of aircraft in its fleet. In another example, a third party software provider that provides aircraft software executing on an aircraft computing device transmits a software update for the aircraft software. Additionally, in some embodiments the command module 310 also receives a data file from the service module 308. For example, memory 304 can optionally store a service module 308 that is configured to generate, update, and distribute flight plans to aircraft computing device 106. Such a service module 308 generates a new flight plan for an aircraft 108, and transmits the new flight plan to the command module 310 and/or the data file storage 314 for storage and ultimate distribution to the aircraft computing device 106.

In some embodiments, the command module 310 is further executable to generate and maintain one or more command queues 316. A command queue 316 corresponds to a data structure, or data construct, that comprises one or more commands that are to be executed, and an order in which the one or more commands are to be executed. Individual command queues 316 comprise commands that are to be executed with regard to a particular aircraft, an aircraft type, an airline, and/or aircraft corresponding to particular identifiers and/or classifiers, etc. Maintaining a command queue 316 involves adding new commands to the command queue 316, removing commands from the command queue 316 once completed, updating a status of a command within the command queue (e.g., pending, interrupted, etc.), reordering the commands in the command queue 316, or a combination thereof. For example, when a repeating command that a data file 104 is to be obtained from an associated aircraft computing device, the command module 310 removes the command from the command queue 316 and adds a new command that corresponds to the next time the repeating command is to reoccur.

In some embodiments, the command module 310 maintains an individual command queue 316 of commands that are to be executed with regard to aircraft 108. Alternatively or in addition, an individual command queue 316 is comprised of commands that are to be executed with aircraft associated with a particular identifier and/or classifier, airline, geographic location, etc. In some examples, the order of commands in a queue is updated each time execution of a command is completed, and/or they may be dynamically updated by the command module 310. In an example embodiment, the order of the commands in a command queue is dynamically reordered based on one or more of an importance or urgency of individual commands; the size of the data file; the flight plan of the aircraft; a performance of the cloud network; and the capabilities of the aircraft computing device. For example, where a particular command indicates that it is required to be executed before a particular time, as the particular time approaches, an urgency rating associated with the command is increased, resulting in the command module 310 reordering the associated command queue 316 so that the particular command is positioned higher in the command queue 316. In another example, based on a performance of the air-to-ground network between an aircraft interface computing device 116 and/or transient storage location 122 and the aircraft computing device 106, the command module 310 determines that a current connection will not be live long enough to transmit files above a threshold size, and reorders the associated command queue 316 so that commands that are expected to be able to executed over the current connection are higher in the command queue 316.

The command module 310 is further executable to receive command requests from aircraft interface computing devices 116. In an example embodiment, a command request is transmitted to the command module 310 by an aircraft API 136 to determine whether a data file 104 is to be exchanged with a particular aircraft computing device 106. Such a command request includes information, such as aircraft identifiers and/or classifiers associated with the particular aircraft computing device 106, metadata that identifies the aircraft, the aircraft computing device, the aircraft API, or a combination thereof. The command module 310 is executable to use this information to identify a command queue 316 that corresponds to data files 104 that are to be exchanged with the particular aircraft computing device 106.

In some embodiments, the command module 310 is configured to determine information associated with the particular aircraft computing device 106. In some embodiments, the command module 310 accesses an airline database 318 and/or other resource to identify additional information about the particular aircraft computing device 106. For example, where the command request includes a tail number of the associated aircraft 108, the command module 310 uses the tail number to identify other airline identifiers and/or classifiers associated with the aircraft 108 within the airline database 318. In this way, even when the command request includes very little identification information, the command module 310 is able to use the record in the airline database 318 to determine additional information about the aircraft 108. In another example, the command module 310 uses the information in the command request to identify a location of the aircraft 108, and accesses a weather resource to determine weather conditions in the geographic location of the aircraft 108.

In some embodiments, the command module 310 identifies a plurality of commands that are to be executed in relation to the particular aircraft computing device 106 (i.e., from a pool of commands, from a plurality of command queues, etc.), and then dynamically generate a command queue 316 for the particular aircraft computing device 106. For example, where the queue request identifies an airline, an aircraft type, and a geographic location of the associated aircraft, the command module 310 identifies commands that are to be executed with aircraft operated by the airline, with aircraft of the aircraft type, with the aircraft within the geographic location, and/or a combination thereof. In some embodiments, the command module 310 then generates a command queue 316 of the relevant commands that are to be executed with the particular aircraft computing device 106 and an order in which they are to be executed.

In various embodiments, the command module 310 uses the command queue 316 to determine a command that is to be executed with the particular aircraft computing device 106, and then transmits one or more signals to the aircraft interface computing device 116 that are configured to cause the aircraft interface computing device 116 to facilitate the execution of the command. For example, in some embodiments, the signals identify a data file 104 that is to be exchanged between the ground computing device 300 and the particular aircraft computing device 106, a location that the data file 104 is to be transmitted from/to, security and/or permissions information required to facilitate the exchange (e.g., passwords, security key, identifiers, etc.), or a combination thereof.

In some embodiments, the command module 310 is further executable to select a transient storage location 122 through which the data file 104 is to be transferred during the data exchange. The transient storage location 122 is selected from a plurality of transient storage locations 122 by the ground computing device 300, the aircraft interface computing device 200, or a combination thereof. In some embodiments, the transient storage location 122 through which the data file 104 is to be transferred is selected based on the aircraft being geographically located within a threshold distance of the transient storage location 122 at the time the data file 104 will be transferred to the aircraft computing device 106, a flight plan of the aircraft, an expected strength/efficiency of the uplink/downlink connection between the aircraft computing device 106 and the transient storage location 122 during at least the portion of the flight plan of the aircraft, or a combination thereof. In some embodiments, when there is a break in communication over the air-to-ground network 128 during the transfer of the data file 104, the ground computing device 300 and/or the aircraft interface computing device 200 selects a different transient storage location 122 through which to resume the data transfer. For example, based on the aircraft 108 moving into a new geographic area in which there is a stronger, more efficient, and/or more reliable connection with a different transient storage location, the ground computing device 300 and/or the aircraft interface computing device 116 selects to continue the data exchange through the different transient storage location 122.

In some embodiments, the command module 310 also is executable to receive transmissions from the aircraft interface computing device 200 to execute the command. Such transmissions include instructions and/or metadata that cause the command module 310 to initiate the transfer, such as a name of the data file, a type of the data file, a size of the data file, security and/or permissions information required to facilitate the exchange (e.g., passwords, security key, identifiers, etc.), a time stamp for the data file, a time stamp for the transfer, an airplane classifier, an airline identifier, an airplane identifier, a location of the aircraft, a location of the transient storage location, and a unique storage location (e.g., a URL) for the data file to be transmitted to, or a combination thereof. Alternatively or in addition, in some examples, such transmissions include a request for a unique storage location of the data file storage 314 or other storage location to which the data file 104 is to be transmitted.

In some embodiments, the command module 310 is executable to receive a classification request from an aircraft interface computing device 116. Such a classification request includes an identifier received from a particular aircraft computing device 106, and a request for classification information about the associated aircraft. The command module 310 can determine the classification information by accessing the airline databases 318 and/or other resources, and use the identifier to find further classification information about the particular aircraft computing device 106. For example, in some embodiments the command module 310 accesses an airline database 318, and uses the relationships indicated in the airline database 318 to determine classification information (i.e., one or more of a type of aircraft, a year of the aircraft, a model of the aircraft, an airline associated with the aircraft, a type of computing device on which the aircraft API is executing, a type of API to which the aircraft API corresponds, etc.)

According to the present disclosure, in some examples, the one or more processors 202 and 302 are configured to execute instructions, applications, or programs stored in memories 204 and 304. In some examples, the one or more processors 202 and 302 include hardware processors that include, without limitation, a hardware central processing unit (CPU), a graphics processing unit (GPU), a field-programmable gate array (FPGA), a complex programmable logic device (CPLD), an application-specific integrated circuit (ASIC), a system-on-chip (SoC), or a combination thereof.

The memories 204 and 304 are examples of computer-readable media. In some examples, computer-readable media include two types of computer-readable media, namely computer storage media and communication media. In some examples, computer storage media includes volatile and non-volatile, removable and non-removable media implemented in any method or technology for storage of information, such as computer-readable instructions, data structures, program modules, or other data. Computer storage media includes, but is not limited to, random access memory (RAM), read-only memory (ROM), erasable programmable read-only memory (EPROM), electrically erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as ground computing device 102, aircraft interface computing devices 116, third party computing devices 114, transient storage locations 122, and/or aircraft computing devices 106 and 110. In general, computer storage media may include computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

Additionally, the network interfaces 206 and 306 include physical and/or logical interfaces for connecting the respective computing devices to another computing device or a network. For example, in some embodiments, the network interfaces 206 and 306 enable WiFi-based communication such as via frequencies defined by the IEEE 802.11 standards, short range wireless frequencies such as Bluetooth™, or any other suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

FIGS. 4-8 schematically provide flowcharts that represent examples of methods according to the present disclosure. In FIGS. 4-8, some steps are illustrated in dashed boxes indicating that such steps may be optional or may correspond to an optional version of a method according to the present disclosure. That said, not all methods according to the present disclosure are required to include the steps illustrated in dashed boxes. Additionally, the order of steps illustrated in FIGS. 4-8 is exemplary, and in different embodiments, the steps in FIGS. 4-8 may be performed in a different order. The methods and steps illustrated in FIGS. 4-8 are not limiting, and other methods and steps are within the scope of the present disclosure, including methods having greater than or fewer than the number of steps illustrated, as understood from the discussions herein.

Figure 4:
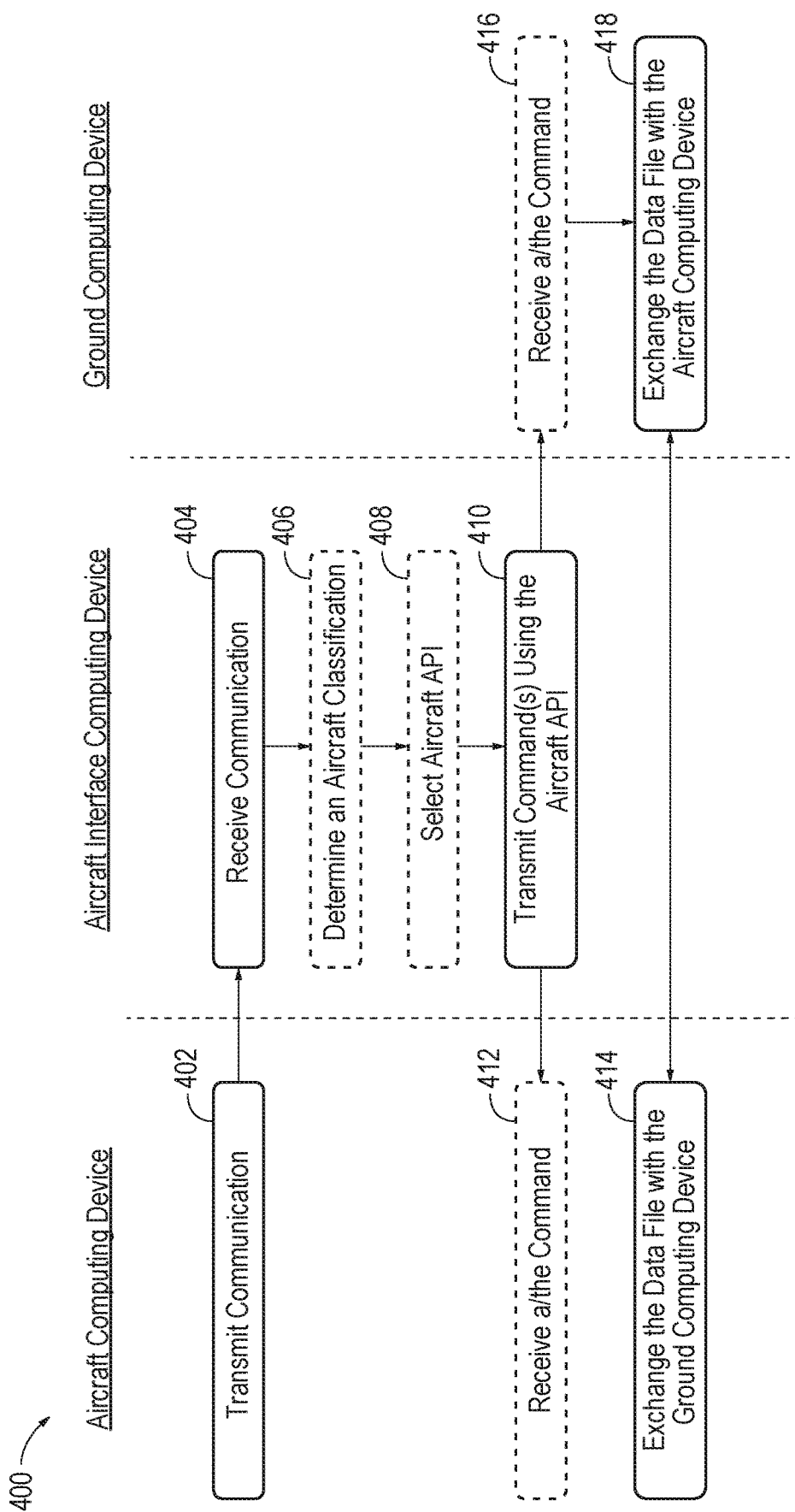
FIG. 4 is a flowchart depicting methods for exchanging data files between aircraft computing devices and a ground computing device.

FIG. 4 is a flowchart depicting methods 400, according to the present disclosure, for exchanging data files between an aircraft computing device 106 and a ground computing device 102. As shown in FIG. 4, at operation 402, the aircraft computing device transmits a communication. For example, in some examples, an aircraft service 130 executing on the aircraft computing device causes a communication to be transmitted to one or more aircraft interface computing devices. In some such examples, the communication is transmitted over an air-to-ground network 128, such a wireless network, a satellite network, a cellular network, or other type of air-to-ground network that allows uplinks/downlinks to facilitate data exchanges between an aircraft in flight and a ground-based computing device. In some examples, the communication includes one or more identifiers that are associated with the corresponding aircraft, aircraft computing device, aircraft service, or a combination thereof. As examples, the communication includes one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, in some examples, the communication also includes a software-based instruction that identifies an action and/or data transfer that is to occur between ground computing devices and the aircraft computing device.

In some examples, the aircraft service causes the aircraft computing device to transmit the communication periodically, according to a schedule, and/or based on a trigger event, such as an input from a user associated with the aircraft (e.g., pilot, passenger, steward, etc.), a data file being generated, a data file reaching a preset size, an available amount of the aircraft memory reaching or dropping below a threshold, occurrence of a preset event (e.g., reaching a preset altitude, reaching a preset location, the aircraft being airborne for a preset amount of time, etc.), and/or reception of a transmission from an external computing device, such as a ground computing device, an aircraft interface computing device, a transient storage location, or another computing device.

At operation 404, the aircraft interface computing device receives the communication over the air-to-ground network. In some examples, receiving the communication includes establishing a secure connection between the aircraft computing device and the aircraft interface computing device. In some embodiments, more than one aircraft interface computing device receives the communication, and it is determined which one of the aircraft interface computing devices is to establish a secure connection with the aircraft computing device.

At operation 406, the aircraft interface computing device optionally determines an aircraft classifier. For example, in response to receiving the communication, in some examples, the aircraft interface computing device determines an aircraft classifier associated with at least one of the aircraft, aircraft computing device, aircraft API, or a combination thereof, from which the communication originated. In some examples, an aircraft classifier corresponds to one or more of a type of the aircraft, a year of the aircraft, a model of the aircraft, an airline associated with the aircraft, a type of computing device on which the aircraft service is executing, a type of service to which the aircraft service corresponds, or a combination thereof.

In some examples, the aircraft interface computing device determines the aircraft classifier based on one or more aircraft identifiers included in the communication. For example, based on the communication including a serial number from the originating aircraft, in some examples, the aircraft interface computing device accesses a data lookup table that indicates relationships between aircraft serial numbers and the corresponding type of aircraft computing device and/or aircraft service. Alternatively, in other examples, the aircraft interface computing device transmits the aircraft identifier and/or aircraft classifier to a ground computing device, which then accesses a data construct that identifies relationships between aircraft identifiers and/or aircraft classifiers and corresponding aircraft computing devices, aircraft services, and/or aircraft types. In some such examples, the ground computing device then transmits the determined aircraft identifiers and/or aircraft classifiers to the aircraft interface computing device.

At operation 408, the aircraft interface computing device optionally selects a programmatic protocol. Specifically, in some examples, the aircraft interface computing device is configured to select an aircraft API 136 for communicating with the aircraft computing device and/or aircraft service 130 executing on the originating aircraft. In some examples, the aircraft interface computing device stores multiple aircraft APIs with each aircraft API defining a programmatic protocol for communicating with a specific aircraft computing device and/or aircraft service executing thereon. The programmatic protocol of each aircraft API is configured to enable the aircraft interface computing device to interact with one or more corresponding aircraft computing devices and/or corresponding aircraft services. In some embodiments, the aircraft interface computing device selects the appropriate aircraft API based on a schedule or table that indicates relationships between aircraft identifiers and/or aircraft classifiers and corresponding aircraft APIs. In other embodiments, an appropriate aircraft API is automatically available and utilized for interaction with a corresponding aircraft services as a result of the initial communication from the originating aircraft.

At operation 410, the aircraft interface computing device transmits a command using the aircraft API. For example, in some embodiments, the aircraft API executing on the aircraft interface computing device then uses its programmatic protocol to facilitate a data exchange between the ground computing device and the aircraft computing device. In this way, by quickly identifying or automatically selecting and deploying appropriate aircraft APIs across a wide range of aircraft types and/or types of aircraft services, the aircraft interface computing device is able to act as a decoupled interface that enables ground-based software services to conduct communication and data exchanges with aircraft computing devices without the software services needing to be individually programmed to communicate with each type of aircraft and/or aircraft service.

At operation 412, the aircraft computing device optionally receives the command from the aircraft interface computing device. For example, in some embodiments, the aircraft computing device receives a communication that indicates that a data file is to be exchanged between the aircraft computing device and one or more ground computing devices. In some examples, the command includes instructions and/or metadata that cause the aircraft computing device to initiate the transfer, such as a name of the data file, a type of the data file, a size of the data file, security and/or permissions information required to facilitate the exchange (e.g., passwords, security key, identifiers, etc.), a time stamp for the data file, a time stamp for the transfer, an airplane classifier, the airline identifier, the airplane identifier, a location of the aircraft, a location of the transient storage location, and a unique storage location (e.g., a URL) to which and/or from which the data file is to be transmitted, or a combination thereof. At operation 414, the aircraft computing device exchanges the data file with the ground computing device.

At operation 416, the ground computing device optionally receives the command from the aircraft interface computing device. In some examples, the ground computing device also receives transmissions from the aircraft interface computing device to exchange the data file with the aircraft computing device. In some such examples, such transmissions include instructions and/or metadata that cause the ground computing device to initiate the transfer, such as a name of the data file, a type of the data file, a size of the data file, security and/or permissions information required to facilitate the exchange (e.g., passwords, security key, identifiers, etc.), a time stamp for the data file, a time stamp for the transfer, an airplane classifier, the airline identifier, the airplane identifier, a location of the aircraft, a location of the transient storage location, and a unique storage location (e.g., a URL) for the data file to be transmitted to, or a combination thereof. Alternatively or in addition, such transmissions include a request for a unique storage location of the data file storage or other storage location to which the data file is to be transmitted. At operation 418, the ground computing device exchanges the data file with the aircraft computing device.

Figure 5:
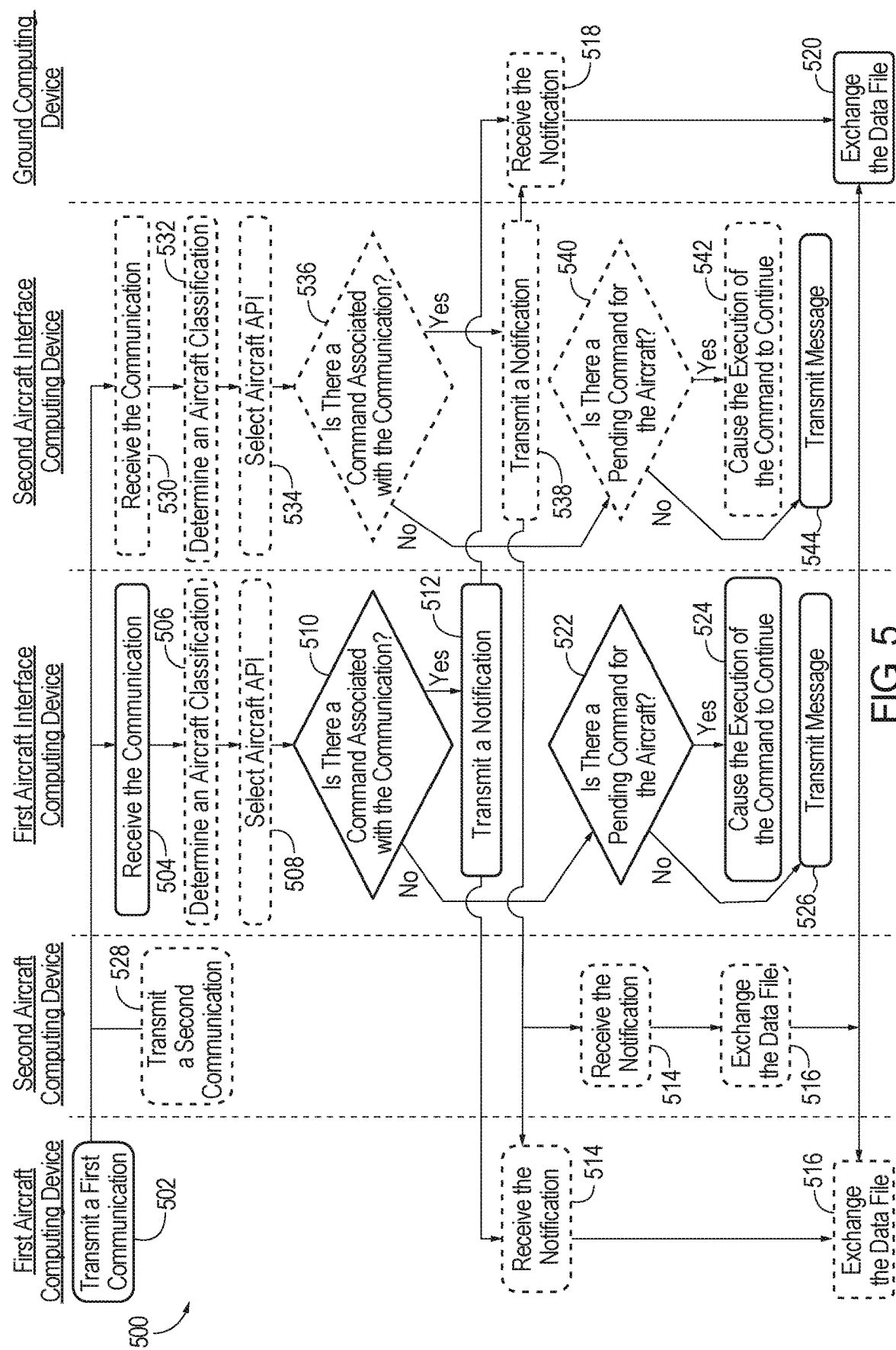
FIG. 5 is a flowchart depicting methods for exchanging data files between a plurality of aircraft computing devices and a ground computing device.

FIG. 5 is a flowchart depicting methods 500, according to the present disclosure, for exchanging data files between a plurality of aircraft computing devices 106 and a ground computing device 102. As shown in FIG. 5, at operation 502, the first aircraft computing device transmits a first communication. In some embodiments, a first aircraft service executing on the first aircraft computing device causes the first communication to be transmitted to one or more of the first aircraft interface computing device and the second aircraft interface computing device. In some examples, the first communication is transmitted over an air-to-ground network, such a wireless network, a satellite network, a cellular network, or other type of air-to-ground network that allows uplinks/downlinks to facilitate data exchanges between an aircraft in flight and a ground-based computing device. In some examples, the first communication includes one or more identifiers that are associated with the first aircraft, first aircraft computing device, first aircraft service, or a combination thereof. For example, in some embodiments, the one or more identifiers include one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, in some examples, the first communication also includes a software-based instruction that identifies an action and/or data transfer that is to occur between ground computing devices and the first aircraft computing device.

In some examples, the first aircraft service causes the first aircraft computing device to transmit the first communication periodically, according to a schedule, and/or based on a trigger event, such as an input from a user associated with the first aircraft (e.g., pilot, passenger, steward, etc.), a data file being generated, a data file reaching a preset size, an available amount of aircraft memory reaching or dropping below a threshold, occurrence of a preset event (e.g., reaching a preset altitude, reaching a preset location, the aircraft being airborne for a preset amount of time, etc.), and/or reception of a transmission from an external computing device, such as the ground computing devices, an aircraft interface computing device, a transient storage location, or another computing device.

At operation 504, the first aircraft interface computing device receives the communication. In some examples, receiving the communication includes establishing a secure connection between the first aircraft computing device and the first aircraft interface computing device. In some embodiments, both the first aircraft interface computing device and the second aircraft interface computing device receive the first communication, and it is determined that the first aircraft interface computing device is to establish a secure connection with the aircraft computing device.

At operation 506, the first aircraft interface computing device optionally determines an aircraft classifier. For example, in some embodiments, in response to receiving the first communication, the first aircraft interface computing device determines an aircraft classifier associated with at least one of the first aircraft, first aircraft computing device, first aircraft service, or a combination thereof. In some examples, an aircraft classifier corresponds to one or more of a type of the first aircraft, a year of the first aircraft, an aircraft model of the first aircraft, an airline associated with the first aircraft, a type of computing device on which the first aircraft service is executing, a type of service to which the first aircraft service corresponds, or a combination thereof. In some examples, the first aircraft interface computing device determines the aircraft classifier based on one or more aircraft identifiers included in the first communication. For example, based on the first communication including a serial number of first aircraft, in some examples, the first aircraft interface computing device accesses a data lookup table that indicates relationships between aircraft serial numbers and the corresponding type of aircraft computing device and/or aircraft service. Alternatively, in other examples, the first aircraft interface computing device transmits the one or more aircraft identifiers to a ground computing device, which then accesses a data construct that identifies relationships between aircraft identifiers and/or aircraft classifiers and corresponding aircraft computing devices, aircraft services, and/or aircraft types. In some examples, the ground computing device then transmits the aircraft classifiers associated with the one or more aircraft identifiers to the first aircraft interface computing device.

At operation 508, the first aircraft interface computing device optionally selects an appropriate aircraft API. Specifically, the first aircraft interface computing device is configured to select an aircraft API for communicating with the first aircraft computing device and/or first aircraft service executing thereon. In some examples, the first aircraft interface computing device stores multiple aircraft APIs with each aircraft API defining a programmatic protocol for communicating with a specific aircraft computing device and/or aircraft service executing therein. The programmatic protocol of each aircraft API is configured to enable the first aircraft interface computing device to interact with one or more corresponding aircraft computing devices and/or corresponding aircraft services. In some embodiments, the first aircraft interface computing device selects the appropriate aircraft API based on a schedule or table that indicates relationships between aircraft identifiers and/or aircraft classifiers and corresponding aircraft APIs. In other embodiments, an appropriate aircraft API is automatically available and utilized for interaction with a corresponding aircraft services as a result of the initial communication from the originating aircraft.

At operation 510, the first aircraft interface computing device determines whether there is a command associated with the first communication. If the answer is yes (there is a command associated with the first communication), then the process continues to operation 512, where the first aircraft interface computing device transmits one or more notifications. For example, in some examples, the first aircraft interface computing device transmits notifications that include information configured to cause the command to be executed using the programmatic protocol to the first computing device, the ground computing device, or both. The command causes a data file to be exchanged between the first computing device and the ground computing device.

In some embodiments, where the command included in the first communication indicates that a data file is to be exchanged between the first aircraft interface computing device and the ground computing device, a first aircraft API executing on the first aircraft interface computing device uses the selected aircraft API to facilitate a data exchange between the ground computing device and the aircraft computing device. For example, in some embodiments, the first aircraft interface computing device uses the selected aircraft API to interface with a first aircraft service executing on the first aircraft computing device, and to cause the first aircraft service to perform one or more actions to facilitate the data exchange.

At operation 514, the first aircraft computing device optionally receives the notification from the first aircraft interface computing device. For example, in some embodiments, the first aircraft computing device receives a notification that indicates that a data file is to be exchanged between the first aircraft computing device and ground computing device via the selected aircraft API. In some examples, the command includes instructions and/or metadata that causes the first aircraft computing device to initiate the transfer of the data file, such as a name of the data file, a type of the data file, a size of the data file, security and/or permissions information required to facilitate the exchange (e.g., passwords, security key, identifiers, etc.), a time stamp for the data file, a time stamp for the transfer, an airplane classifier, the airline identifier, the airplane identifier, a location of the aircraft, a location of the transient storage location, and a unique storage location (e.g., a URL) to which and/or from which the data file is to be transmitted, or a combination thereof. At operation 516, the first aircraft computing device exchanges the data file with the ground computing device.

At operation 518, the ground computing device optionally receives the notification from the first aircraft interface computing device. In some examples, the ground computing device also receives notifications from the first aircraft interface computing device to exchange the data file with the first aircraft computing device. In some such examples, such notifications include instructions and/or metadata that cause the ground computing device to initiate the transfer of the data file, such as a name of the data file, a type of the data file, a size of the data file, security and/or permissions information required to facilitate the exchange (e.g., passwords, security key, identifiers, etc.), a time stamp for the data file, a time stamp for the transfer, an airplane classifier, the airline identifier, the airplane identifier, a location of the aircraft, a location of the transient storage location, and a unique storage location (e.g., a URL) for the data file to be transmitted to, or a combination thereof. Alternatively or in addition, such notifications include a request for a unique storage location of the data file storage or other storage location to which the data file is to be transmitted. At operation 520, the ground computing device exchanges the data file with the first aircraft computing device.

However, if the answer at operation 510 is no (there is not a command associated with the first communication), then the process continues to operation 522, where the first aircraft interface computing device determines whether there is a pending command for the aircraft. If the answer is yes (there is a pending command for the first aircraft), then the process continues to operation 524, where the first aircraft interface computing device causes the execution of the pending command to continue. In some examples, the pending command corresponds to a previously initiated data transfer of the data file that was interrupted by a break in communication with the aircraft computing device over the air-to-ground network.

In some embodiments, the first aircraft interface computing device determines that there is a pending command for the first aircraft by transmitting a command request to the ground computing device, and receiving a notification from the ground computing device that a previous data exchange with the first aircraft computing device was interrupted and that it should be continued. In some examples, the notification that the previous data exchange should be continued includes information necessary to cause the first aircraft interface computing device to continue the execution of the command, such as a name of the data file, an aircraft identifier, an aircraft classifier, an amount of the data file transferred, an identification of the last portion of the data file that was transferred, a storage location to which or from which the data file is to be transferred, etc.

Alternatively or in addition, the first aircraft interface computing device determines that there is a pending command for the first aircraft based on metadata stored on one of the first aircraft interface computing device, the second aircraft interface computing device, the ground computing device, or a transient storage location. For example, in some embodiments, when a break in communication occurs, one or more computing devices involved in the data transfer store metadata that indicates information about the data transfer, such as a name of the data file, an aircraft identifier, an aircraft classifier, an amount of the data file transferred, an identification of the last portion of the data file that was transferred, a storage location to which or from which the data file is to be transferred, etc. Thus, by accessing the metadata, the first aircraft interface computing device is able to determine both that a pending command for the first aircraft exists and the information necessary to resume the exchange of the corresponding data file. In this way, the first aircraft interface computing device is able to cause the execution of the command to continue from the point at which the breakage occurred, reducing the amount of redundant data that is transferred over the air-to-ground network.

In some embodiments, the pending command corresponds to an exchange of a data file between the first aircraft computing device and a different computing device (e.g., the second aircraft interface computing device, a transient storage location, etc.) over the air-to-ground network. For example, in some embodiments, the pending command corresponds to a data exchange between the first aircraft computing device and the second aircraft interface computing device that was interrupted due to the first aircraft moving into a geographic area that no longer allowed for an uplink/downlink connection between the second aircraft interface computing device and the first aircraft computing device. In such a situation, if the first aircraft moves into a new geographic region in which the first aircraft computing device is able to connect to the first aircraft interface computing device over the air-to-ground network, the data transfer may be resumed between the first aircraft interface computing device and the first aircraft computing device. Where the data transfer corresponds to a transmission of the data file from the first aircraft computing device to the ground computing device, each of the first aircraft interface computing device and the second aircraft interface computing device sends one or more portion of the data file that it received from the first aircraft computing device, and the ground computing device assembles the data file based on the received portions.

If the answer at operation 522 is no (there is not a pending command for the first aircraft), then the process continues to operation 526, where the first aircraft interface computing device transmits a message to the ground computing device requesting a command associated with the first aircraft computing device. If the ground computing device transmits a response indicating a command that is to be executed with regard to the first aircraft computing device, the first aircraft interface computing device performs one or more actions to cause the execution of the command. Alternatively, if the ground computing device transmits a response indicating that there is not a command to be executed with regard to the first aircraft computing device, the first aircraft interface computing device transmits a message to the first aircraft computing device that no commands are to be executed at this time.

FIG. 5 further illustrates operation 528, where a second aircraft computing device optionally transmits a second communication. For example, in some embodiments, a second aircraft service executing on the second aircraft computing device causes the second communication to be transmitted to one or more of the first aircraft interface computing device and the second aircraft interface computing device. In some examples, the second communication is transmitted over an air-to-ground network, such as a wireless network, a satellite network, a cellular network, or other type of air-to-ground that allows uplinks/downlinks to facilitate data exchanges between an aircraft in flight and a ground-based computing device. In some examples, the second communication includes one or more identifiers that are associated with the second aircraft, second aircraft computing device, second aircraft service, or a combination thereof. In some examples, the one or more identifiers includes one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, in some examples, the second communication also includes a software-based instruction that identifies an action and/or data transfer that is to occur between ground computing devices and the second aircraft computing device.

In some examples, the second aircraft service causes the second aircraft computing device to transmit the second communication periodically, according to a schedule, and/or based on a trigger event, such as an input from a user associated with the second aircraft (e.g., pilot, passenger, steward, etc.), a data file being generated, a data file reaching a preset size, an available amount of aircraft memory reaching or dropping below a threshold, occurrence of a preset event (e.g., reaching a preset altitude, reaching a preset location, the aircraft being airborne for a preset amount of time, etc.), and/or reception of a transmission from an external computing device, such as the ground computing device, an aircraft interface computing device, a transient storage location, or another computing device.

The second transmission is optionally received by the second aircraft interface computing device at operation 530. In some examples, receiving the second communication includes establishing a secure connection between the second aircraft computing device and the second aircraft interface computing device. In some embodiments, both the first aircraft interface computing device and the second aircraft interface computing device receive the second communication, and it is determined that the second aircraft interface computing device is to establish a secure connection with the second aircraft computing device.

At operation 532, the second aircraft interface computing device optionally determines an aircraft classifier. For example, in some embodiments, in response to receiving the second communication, the second aircraft interface computing device determines an aircraft classifier associated with at least one of the second aircraft, second aircraft computing device, second aircraft service, or a combination thereof. In some examples, an aircraft classifier corresponds to one or more of a type of the second aircraft, a year of the second aircraft, an aircraft model of the second aircraft, an airline associated with the second aircraft, a type of computing device on which the second aircraft service is executing, a type of service to which the second aircraft service corresponds, or a combination thereof. In some examples, the second aircraft interface computing device determines the aircraft classifier based on one or more aircraft identifiers included in the second communication. For example, in some embodiments, based on the second communication including a serial number of second aircraft, the second aircraft interface computing device accesses a data lookup table that indicates relationships between aircraft serial numbers and the corresponding type of aircraft computing device and/or aircraft service. Alternatively, in other examples, the second aircraft interface computing device transmits the one or more aircraft identifiers to a ground computing device, which then accesses a data construct that identifies relationships between aircraft identifiers and/or aircraft classifiers and corresponding aircraft computing devices, aircraft services, and/or aircraft types. In some such examples, the ground computing device then transmits the aircraft classifiers associated with the one or more aircraft identifiers to the second aircraft interface computing device.

At operation 534, the second aircraft interface computing device optionally selects an aircraft API. In some examples, the second aircraft interface computing device is configured to select an aircraft API for communicating with the second aircraft computing device and/or second aircraft service executing thereon. In some examples, the second aircraft interface computing device stores multiple aircraft APIs with each aircraft API defining a programmatic protocol for communicating with a specific aircraft computing device and/or aircraft service executing thereon. In some embodiments, the second aircraft interface computing device selects the appropriate aircraft API based on a schedule or table that indicates relationships between aircraft identifiers and/or aircraft classifiers and corresponding aircraft APIs. In other embodiments, an appropriate aircraft API is automatically available and utilized for interaction with a corresponding aircraft services as a result of the initial communication from the originating aircraft.

At operation 536, the second aircraft interface computing device optionally determines whether there is a command associated with the second communication. If the answer is yes (there is a command associated with the second communication), then the process continues to operation 538, where the second aircraft interface computing device transmits a notification. For example, in some embodiments, the second aircraft interface computing device transmits notifications that include information configured to cause the command to be executed using the programmatic protocol to the second computing device, the ground computing device, or both. The command causes a data file to be exchanged between the second aircraft computing device and the ground computing device.

In embodiments where the command included in the second communication indicates that a data file is to be exchanged between the second aircraft interface computing device and the ground computing device, a second aircraft API executing on the second aircraft interface computing device uses the selected programmatic protocol to facilitate a data exchange between the ground computing device and the second aircraft computing device. For example, in some embodiments, the second aircraft interface computing device uses the selected aircraft API to interface with a second aircraft service executing on the second aircraft computing device, and to cause the second aircraft service to perform one or more actions to facilitate the data exchange.

At operation 514, the second aircraft computing device optionally receives the notification from the second aircraft interface computing device, and at operation 516, the second aircraft computing device exchanges the data file with the ground computing device. Additionally, as illustrated in FIG. 5, at operation 518, the ground computing device optionally receives the notification from the second aircraft interface computing device, and at operation 520, the ground computing device exchanges the data file with the second aircraft computing device.

If the answer at operation 536 is no (there is not a command associated with the second communication), then the process continues to operation 540, where the second aircraft interface computing device determines whether there is a pending command for the aircraft. If the answer is yes (there is a pending command for the second aircraft), then the process continues to operation 542, where the second aircraft interface computing device causes the execution of the pending command to continue.

In some embodiments, the second aircraft interface computing device determines that there is a pending command for the second aircraft by transmitting a command request to the ground computing device, and receiving a notification from the ground computing device that a previous data exchange with the second aircraft computing device was interrupted and that it should be continued. In some examples, the notification includes the information necessary to cause the second aircraft interface computing device to continue the execution of the command, such as a name of the data file, an aircraft identifier, an aircraft classifier, an amount of the data file transferred, an identification of the last portion of the data file that was transferred, a storage location to which or from which the data file is to be transferred, etc. Alternatively or in addition, the second aircraft interface computing device determines that there is a pending command for the second aircraft based on metadata stored on one of the first aircraft interface computing device, the second aircraft interface computing device, the ground computing device, or a transient storage location.

In some embodiments, the pending command corresponds to an exchange of a data file between the second aircraft computing device and a different computing device (e.g., the first aircraft interface computing device, a transient storage location, etc.) over the air-to-ground network. Where the data transfer corresponds to a transmission of the data file from the second aircraft computing device to the ground computing device, in some examples, each of the first aircraft interface computing device and the second aircraft interface computing device sends one or more portion of the data file that it received from the second aircraft computing device, and the ground computing device assembles the data file based on the received portions.

If the answer at operation 540 is no (there is not a pending command for the second aircraft), then the process continues to operation 544, where the second aircraft interface computing device transmits a message to the ground computing device requesting a command associated with the second aircraft computing device. If the ground computing device transmits a response indicating a command that is to be executed with regard to the second aircraft computing device, the second aircraft interface computing device performs one or more actions to cause the execution of the command. Alternatively, if the ground computing device transmits a response indicating that there is not a command to be executed with regard to the second aircraft computing device, the second aircraft interface computing device transmits a message to the second aircraft computing device that no commands are to be executed at this time.

Figure 6:
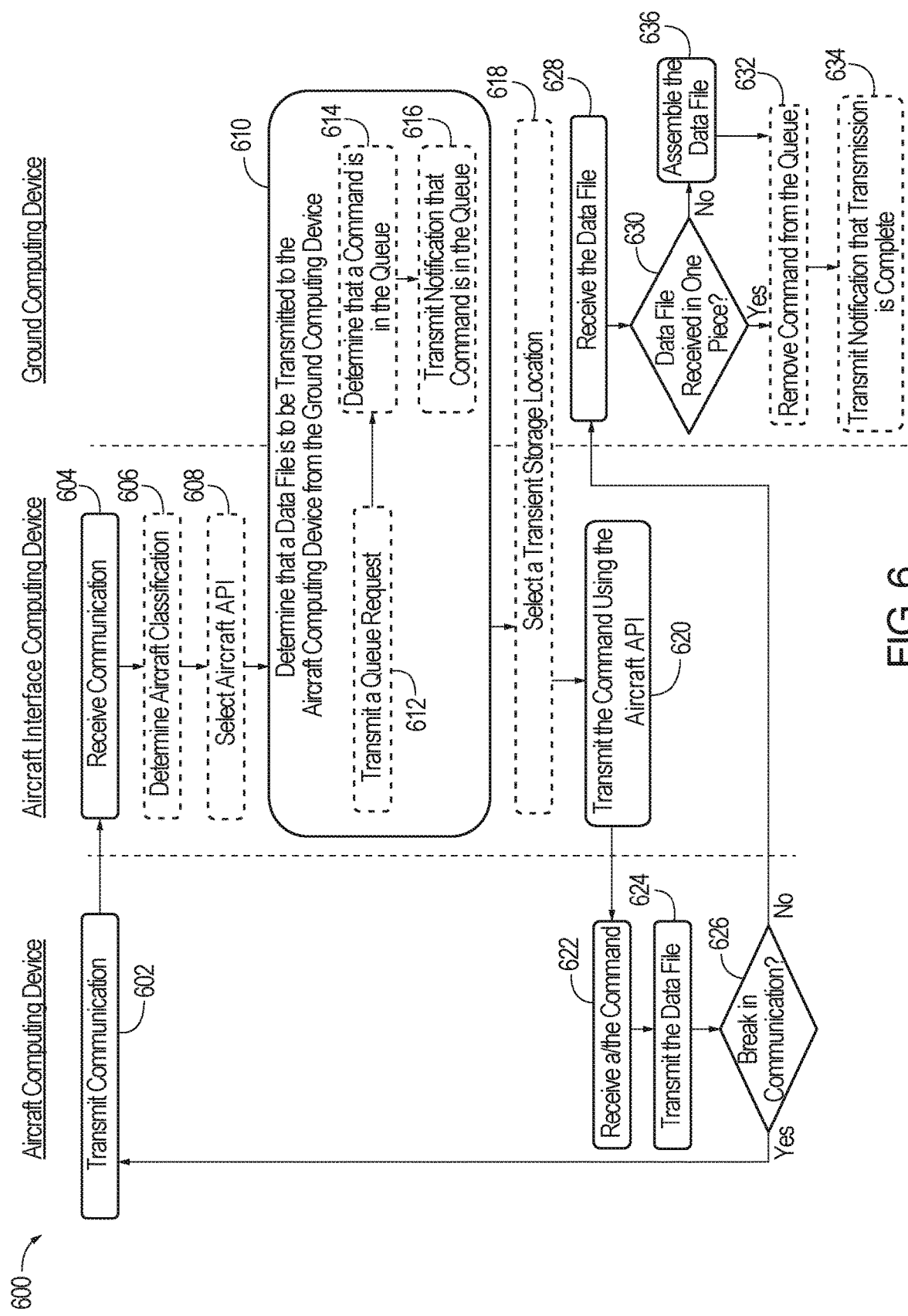
FIG. 6 is a flowchart depicting methods for transmitting data files from an aircraft computing device to a ground computing device.

FIG. 6 is a flowchart depicting methods 600, according to the present disclosure, for exchanging data files from an aircraft computing device 106 to a ground computing device 102. As shown in FIG. 6, at operation 602, the aircraft computing device transmits a communication. In some examples, an aircraft service executing on the aircraft computing device causes a communication to be transmitted to one or more aircraft interface computing devices. In some examples, the communication is transmitted over an air-to-ground network, such a wireless network, a satellite network, a cellular network, or other type of air-to-ground network that allows uplinks/downlinks to facilitate data exchanges between an aircraft in flight and a ground-based computing device. In some examples, the communication includes one or more identifiers that are associated with the corresponding aircraft, aircraft computing device, aircraft API, or a combination thereof. In some examples, the communication includes one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, in some examples, the communication also includes a software-based instruction that identifies an action and/or data transfer that is to occur between ground computing devices and the aircraft computing device.

In some embodiments, the aircraft service causes the aircraft computing device to transmit the communication periodically, according to a schedule, and/or based on a trigger event, such as an input from a user associated with the aircraft (e.g., pilot, passenger, steward, etc.), a data file being generated, a data file reaching a preset size, an available amount of the aircraft memory reaching or dropping below a threshold, occurrence of a preset event (e.g., reaching a preset altitude, reaching a preset location, the aircraft being airborne for a preset amount of time, etc.), and/or reception of a transmission from an external computing device, such as the ground computing device, an aircraft interface computing device, a transient storage location, or another computing device.

At operation 604, the aircraft interface computing device receives the communication. In some examples, receiving the communication includes establishing a secure connection between the aircraft computing device and an aircraft interface computing device. In some embodiments, more than one aircraft interface computing device receives the communication, and it is determined which one of the aircraft interface computing devices is to establish a secure connection with the aircraft computing device.

At operation 606, the aircraft interface computing device optionally determines an aircraft classifier. For example, in response to receiving the communication, in some examples, the aircraft interface computing device determines an aircraft classifier associated with at least one of the aircraft, aircraft computing device, aircraft service, or a combination thereof, from which the communication originated. In some examples, an aircraft classifier corresponds to one or more of a type of the aircraft, a year of the aircraft, a model of the aircraft, an airline associated with the aircraft, a type of computing device on which the aircraft service is executing, a type of service to which the aircraft service corresponds, or a combination thereof.

In some examples, the aircraft interface computing device determines the aircraft classifier based on one or more aircraft identifiers included in the communication. In some such examples, based on the communication including a serial number from the originating aircraft, the aircraft interface computing device accesses a data lookup table that indicates relationships between aircraft serial numbers and the corresponding type of aircraft computing device and/or aircraft service. Alternatively, in other examples, the aircraft interface computing device transmits the aircraft identifier and/or aircraft classifier to a ground computing device, which then accesses a data construct that identifies relationships between aircraft identifiers and/or aircraft classifiers and corresponding aircraft computing devices, aircraft services, and/or aircraft types. The ground computing device then transmits the determined aircraft identifiers and/or aircraft classifiers to the aircraft interface computing device.

At operation 608, the aircraft interface computing device optionally selects an appropriate aircraft API. Specifically, in some examples, the aircraft interface computing device is configured to select an aircraft API for communicating with the aircraft computing device and/or aircraft service executing on the originating aircraft. In some examples, the aircraft interface computing device stores multiple aircraft APIs with each aircraft API defining a programmatic protocol for communicating with a specific aircraft computing device and/or aircraft service executing thereon. The programmatic protocol of each aircraft API is configured to enable the aircraft interface computing device to interact with one or more corresponding aircraft computing devices and/or corresponding aircraft services. In some embodiments, the aircraft interface computing device selects the appropriate aircraft API based on a schedule or table that indicates relationships between aircraft identifiers and/or aircraft classifiers and corresponding aircraft APIs. In other embodiments, an appropriate aircraft API is automatically available and utilized for interaction with a corresponding aircraft services as a result of the initial communication from the originating aircraft.

At operation 610, it is determined that a data file is to be transmitted to the aircraft computing device from the ground computing device. In some embodiments, the communication includes the command. In some such examples, the communication from the aircraft computing device indicates that a data file including aircraft health data is to be transmitted from the aircraft computing device to the ground computing device.

Alternatively, where the communication does not include a command, in some examples, the aircraft interface computing device determines that a data file is to be transferred to the ground computing device based on a command queue maintained by the ground computing device. As illustrated in FIG. 6, this optionally includes a transmission of a queue request at operation 612. In some examples, a queue request includes the aircraft identifiers, aircraft classifiers, metadata that identifies the aircraft/aircraft computing device/aircraft service, or a combination thereof.

In some examples, operation 610 includes a determination that a command is in the command queue at optional operation 614. For example, in some examples, the ground computing device is configured to receive queue requests from the aircraft interface computing device, identify a command queue that corresponds to data files that are to be exchanged with the aircraft computing device, and determine that a command is in a command queue associated with the aircraft computing device.

In some embodiments, determining that the command is in the command queue comprises the ground computing device dynamically generating a command queue for the aircraft computing device. In some such examples, the ground computing device identifies a plurality of commands that are to be executed in relation to the particular aircraft computing device (i.e., from a pool of commands, from a plurality of command queues, etc.), and then dynamically generates a command queue for the particular aircraft computing device. In some examples, where the queue request identifies an airline type, aircraft type, and a geographic location of the associated aircraft, the ground computing device identifies commands that are to be executed with aircraft operated by the airline, with aircraft of the aircraft type, with aircraft within the geographic location, and/or a combination thereof. In some examples, the ground computing device then generates a command queue of the relevant commands that are to be executed with the particular aircraft computing device and an order in which they are to be executed. In some examples, the ground computing device then uses the command queue to determine a command that is to be executed with the aircraft computing device.

In some examples, operation 610 also includes transmitting a notification that the command is in the command queue at optional operation 616. In some such examples, the ground computing device transmits a notification to the aircraft interface computing device that is configured to cause the aircraft interface computing device to facilitate the execution of the command. In some examples, the signals identify a data file that is to be exchanged between the ground computing device and the particular aircraft computing device, a location that the data file is to be transmitted from/to, security and/or permissions information required to facilitate the exchange (e.g., passwords, security key, identifiers, etc.), or a combination thereof.

At operation 618, a transient storage location is optionally selected. In some embodiments, the data file is exchanged between the aircraft computing device and the cloud computing resources via a transient storage location. In some examples, a transient storage location corresponds to a data storage resource of a cloud computing network that is configured to exchange data files between the ground computing devices over the cloud computing network, and also exchange data files between the aircraft computing devices over the air-to-ground network. In some embodiments, the cloud computing network includes a plurality of transient storage locations through which data files can be routed. Individual transient storage locations may be geographically positioned so that they are more proximate to and/or have stronger connections to aircraft located in an associated geographic area.

In some examples, the transient storage location is selected from a plurality of transient storage locations by the ground computing device, the aircraft interface computing device, or a combination thereof. In some examples, the transient storage location through which the data file is to be transferred is selected based on the aircraft being geographically located within a threshold distance of the transient storage location at the time the data file will be transferred to the aircraft computing device, a flight plan of the aircraft, an strength/efficiency of the uplink/downlink connection between the aircraft computing device and the transient storage location during at least a portion of the flight plan of the aircraft, or a combination thereof.

At operation 620, the aircraft interface computing device transmits the command using the corresponding aircraft API. In some examples, an aircraft API executing on the aircraft interface computing device then uses the selected aircraft API to initiate a data exchange from the aircraft computing device to the ground computing device. In this way, by quickly identifying or automatically selecting and deploying appropriate aircraft APIs across a wide range of aircraft types and/or types of aircraft services, the aircraft interface computing device is able to act as a decoupled interface that enables ground-based software services to conduct communication and data exchanges with aircraft computing devices without the software services needing to be individually programmed to communicate with each type of aircraft and/or aircraft service.

At operation 622, the aircraft computing device receives the command from the aircraft interface computing device. In some examples, the aircraft computing device receives a communication that indicates that the data file is to be exchanged from the aircraft computing device to one or more ground computing devices. In some such examples, the command includes instructions and/or metadata that cause the aircraft computing device to initiate the transfer, such as a name of the data file, a type of the data file, a size of the data file, security and/or permissions information required to facilitate the exchange (e.g., passwords, security key, identifiers, etc.), a time stamp for the data file, a time stamp for the transfer, an airplane classifier, an airline identifier, an airplane identifier, a location of the aircraft, a location of the transient storage location, and a unique storage location (e.g., a URL) to which and/or from which the data file to be transmitted, or a combination thereof. At operation 624, the aircraft computing device initiates the transmission of the data file. In some examples, the data file is transmitted directly to the ground computing device. Alternatively, it is transmitted via the aircraft interface computing device and/or a transient storage location.

At operation 626, the aircraft computing device determines whether there is a break in communication during the transmission of the data file. In some examples, a break in communication corresponds to a break in the connection with the aircraft computing device over the air-to-ground network during the transfer of the data file. If the answer is yes (there is a break in communication), then the process continues to operation 602, where the aircraft interface computing device transmits an additional communication. If the answer at operation 626 is no (there is not a break in communication), then the process continues to operation 628, where the ground computing device receives the data file.

At operation 630, the ground computing device determines whether the data file was received in one piece. If the answer is yes (the data file was received in one piece), then the process continues to operation 632, where the ground computing device optionally removes the command from the command queue. In some embodiments, when the command to transmit the data file to the ground computing device is a repeating command, upon completion of the transmission of the data file, the ground computing device removes a first instance of the command from the command queue and add a new instance of the command that corresponds to the next time the repeating command is to reoccur.

At operation 634, the ground computing device transmits a notification that the transmission of the data file is complete. In response to receiving the notification, in some examples, the aircraft interface computing device and/or a transient storage location deletes a local version of the data file. If the answer at operation 630 is no (the data file was received in more than one piece), then the process continues to operation 636, where the ground computing device assembles the data file. The process then continues at operation 634. For example, where the transmission of the data file is interrupted by a break in communication, in some examples, the data file is transmitted to the ground computing device in one or more pieces. In such a situation, the ground computing device assembles one or more pieces into a complete version of the data file.

Figure 7:
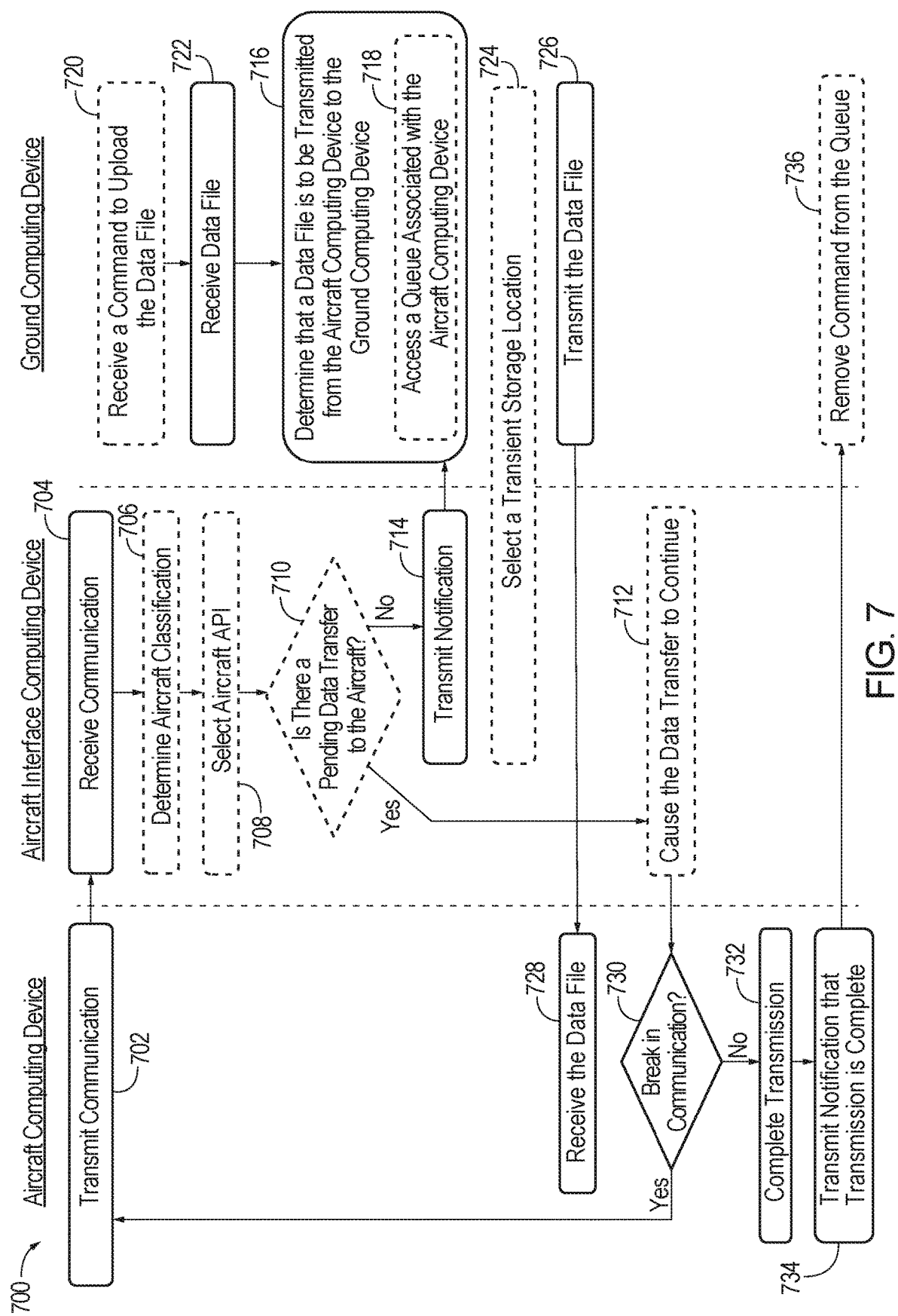
FIG. 7 is a flowchart depicting methods for transmitting data files to an aircraft computing device and from a ground computing device.

FIG. 7 is a flowchart depicting methods 700, according to the present disclosure, for exchanging data files to an aircraft computing device 106 and from a ground computing device 102.

As shown in FIG. 7, at operation 702, the aircraft computing device transmits a communication. For example, an aircraft service 130 executing on the aircraft computing device, in some examples, causes a communication to be transmitted to one or more aircraft interface computing devices. In some such examples, the communication is transmitted over an air-to-ground network, such a wireless network, a satellite network, a cellular network, or other type of air-to-ground that allows uplinks/downlinks to facilitate data exchanges between an aircraft in flight and a ground-based computing device. In some examples, the communication includes one or more identifiers that are associated with the corresponding aircraft, aircraft computing device, aircraft service, or a combination thereof. For example, in some examples, the communication includes one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, in some examples, the communication also includes a software-based instruction that identifies an action and/or data transfer that is to occur between ground computing devices and the aircraft computing device.

In some embodiments, the aircraft service causes the aircraft computing device to transmit the communication periodically, according to a schedule, and/or based on a trigger event, such as an input from a user associated with the aircraft (e.g., pilot, passenger, steward, etc.), a data file being generated, a data file reaching a preset size, an available amount of the aircraft memory reaching or dropping below a threshold, occurrence of a preset event (e.g., reaching a preset altitude, reaching a preset location, the aircraft being airborne for a preset amount of time, etc.), and/or reception of a transmission from an external computing device, such as the ground computing devices, an aircraft interface computing device, a transient storage location, or another computing device.

At operation 704, the aircraft interface computing device receives the communication. In some examples, receiving the communication includes establishing a secure connection between the aircraft computing device and an aircraft interface computing device. In some embodiments, more than one aircraft interface computing device receives the communication, and it is determined that the aircraft interface computing device is to establish a secure connection with the aircraft computing device.

At operation 706, the aircraft interface computing device optionally determines an aircraft classifier. For example, in some examples, in response to receiving the communication, the aircraft interface computing device determines an aircraft classifier associated with at least one of the aircraft, aircraft computing device, aircraft service, or a combination thereof, from which the communication originated. In some examples, an aircraft classifier corresponds to one or more of a type of the aircraft, a year of the aircraft, a model of the aircraft, an airline associated with the aircraft, a type of computing device on which the aircraft service is executing, a type of service to which the aircraft service corresponds, or a combination thereof.

In some examples, the aircraft interface computing device determines the aircraft classifier based on one or more aircraft identifiers included in the communication. In some examples, based on the communication including a serial number from the originating aircraft, the aircraft interface computing device accesses a data lookup table that indicates relationships between aircraft serial numbers and the corresponding type of aircraft computing device and/or aircraft service. Alternatively, in other examples, the aircraft interface computing device transmits the aircraft identifier and/or aircraft classifier to a ground computing device, which then accesses a data construct that identifies relationships between aircraft identifiers and/or aircraft classifiers and corresponding aircraft computing devices, aircraft services, and/or aircraft types. In some such examples, the ground computing device then transmits the determined aircraft identifiers and/or aircraft classifiers to the aircraft interface computing device.

At operation 708, the aircraft interface computing device optionally selects an appropriate aircraft API. Specifically, in some examples, the aircraft interface computing device is configured to select an aircraft API for communicating with the aircraft computing device and/or aircraft service executing on the originating aircraft. In some examples, the aircraft interface computing device stores multiple aircraft APIs with each aircraft API defining a programmatic protocol for communicating with a specific aircraft computing device and/or aircraft service executing thereon. The programmatic protocol of each aircraft API is configured to enable the aircraft interface computing device to interact with one or more corresponding aircraft computing devices and/or corresponding aircraft services. In some embodiments, the aircraft interface computing device selects the appropriate aircraft API based on a schedule or table that indicates relationships between aircraft identifiers and/or aircraft classifiers and corresponding aircraft APIs. In other embodiments, an appropriate aircraft API is automatically available and utilized for interaction with a corresponding aircraft services as a result of the initial communication from the originating aircraft.

At operation 710, the aircraft interface computing device optionally determines whether there is a pending data transfer to the aircraft computing device. In some examples, the pending command corresponds to a previously initiated data transfer of the data file that was interrupted by a break in communication with the aircraft computing device over the air-to-ground network. In some embodiments, the aircraft interface computing device determines that there is a pending command for the aircraft computing device by transmitting a queue request to the ground computing device, and receiving a notification from the ground computing device that a previous data exchange with the aircraft computing device was interrupted and that it should be continued. In some examples, the notification includes the information necessary to cause the aircraft interface computing device to continue the execution of the command, such as a name of the data file, an aircraft identifier, an aircraft classifier, an amount of the data file transferred, an identification of the last portion of the data file that was transferred, a storage location to which and/or from which the data file is to be transferred, etc.

Alternatively or in addition, the aircraft interface computing device determines that there is a pending command for the aircraft based on metadata stored on one of the aircraft interface computing device, the ground computing device, or a transient storage location. In some examples, when a break in communication occurs, one or more computing devices involved in the data transfer stores metadata that includes information about the data transfer, such as a name of the data file, an aircraft identifier, an aircraft classifier, an amount of the data file transferred, an identification of the last portion of the data file that was transferred, a storage location to which and/or from which the data file is to be transferred, etc. Thus, by accessing the metadata, the aircraft interface computing device is able to determine both that a pending command for the aircraft computing device exists and the information necessary to resume the exchange of the corresponding data file. In this way, the aircraft interface computing device is able to cause the execution of the command to continue from the point at which the break in communication occurred, reducing the amount of redundant data that is transferred over the air-to-ground network.

If the answer at operation 710 is yes (there is a pending data transfer), then the process continues to operation 712 and the cloud computing resource optionally causes the data transfer to continue. Alternatively, if the answer at operation 710 is no (there is not a pending data transfer), then the process continues to operation 714, where the aircraft interface computing device transmits a notification to the ground computing device. In some examples, the notification corresponds to a request to determine whether there is a command that is to be executed in association with the aircraft computing device.

At operation 716, the ground computing device determines that a data file is to be transmitted from the aircraft computing device to the ground computing device. As illustrated in FIG. 7, in some examples, the ground computing device determines that the data file is to be transmitted in this way by optionally accessing a command queue associated with the aircraft computing device at operation 718. In some examples, the ground computing device is configured to receive queue requests from the aircraft interface computing device, identify a command queue that corresponds to data files that are to be exchanged with the aircraft computing device, and determine that a command is in a command queue associated with the aircraft computing device.

In some embodiments, determining that the command is in the command queue comprises the ground computing device dynamically generating a command queue for the aircraft computing device. In some examples, the ground computing device identifies a plurality of commands that are to be executed in relation to the particular aircraft computing device (i.e., from a pool of commands, from a plurality of command queues, etc.), and then dynamically generate a command queue for the particular aircraft computing device. In some examples, where the queue request identifies an airline type, aircraft type, and a geographic location of the associated aircraft, the ground computing device identifies commands that are to be executed with aircraft operated by the airline, with aircraft of the aircraft type, with aircraft within the geographic location, and/or a combination thereof. In some examples, the ground computing device then generates a command queue of the relevant commands that are to be executed with the particular aircraft computing device and an order in which they are to be executed. In some examples, the ground computing device then uses the command queue to determine a command that is to be executed with the aircraft computing device.

FIG. 7 further illustrates process 700 as optionally including operation 720, where the ground computing device receives a command to upload the data file. In some examples, the command is received via user inputs into a ground computing device (e.g., inputs provided via a keyboard, mouse, touchpad, camera, audio, etc.), a physical input to the ground computing device (e.g., a CD, DVD, software input, etc.), data inputs provided to the ground computing device via the network interface (e.g., input from a third party computing device, aircraft computing device, etc.), or a combination thereof. In some examples, a user enters one or more identifiers and/or classifiers of one or more aircraft, and a selection of a data file that is to be exchanged between the ground computing device and the one or more aircraft computing devices operating on aircraft associated with the one or more identifiers and/or classifiers. Alternatively or in addition, commands are generated by a service module executing on the ground computing device. In some examples, a service module that monitors flight conditions determines that the weather in a particular geographic region is hazardous, and generates and provides a command to transmit a warning of the hazardous weather and/or a new flight plan that avoids the hazardous weather to the individual aircraft computing devices operating on aircraft within the geographic region.

At operation 722, the ground computing device receives the data file. In some examples, the ground computing device is further executable to receive the data files for upload to one or more aircraft computing devices. In some embodiments, a data file is input directly into the ground computing device via a user input such as by keyboard, touchscreen, mouse selection, etc. Alternatively, in other examples, the data file is received by the ground computing device via a data transfer from another computing device, such as from a third party computing device. In some examples, a computing device operated by an airline is the third party computing device, and it receives a video file that is to be uploaded to the entertainment systems of aircraft in its fleet. In another example, a third party software provider that provides aircraft software executing on an aircraft computing device transmits a software update for the aircraft software. Additionally, in some examples, the ground computing device also receives a data file from the service module. For example, in some examples, the ground computing device stores a service module that is configured to generate, update, and distribute flight plans to aircraft computing device. Such a service module generates a new flight plan for an aircraft, and transmits the new flight plan to the ground computing device for storage and ultimate distribution to the aircraft computing device.

At operation 724, a transient storage location is optionally selected. In some embodiments, the data file is exchanged between the aircraft computing device and the cloud computing resources via a transient storage location. In some examples, a transient storage location corresponds to a data storage resource of a cloud computing network that is configured to exchange data files between the ground computing devices over the network, and also exchange data files between the aircraft computing devices over the air-to-ground network. In some embodiments, the cloud computing network includes a plurality of transient storage locations through which data files can be routed. In some examples, individual transient storage locations are geographically positioned so that they are more proximate to and/or have stronger connections to aircraft located in an associated geographic area.

In some examples, the transient storage location is selected from a plurality of transient storage locations by the ground computing device, the aircraft interface computing device, or a combination thereof. In some examples, the transient storage location through which the data file is to be transferred is selected based on the aircraft being geographically located within a threshold distance of the transient storage location at the time the data file will be transferred to the aircraft computing device, a flight plan of the aircraft, an strength/efficiency of the uplink/downlink connection between the aircraft computing device 106 and the transient storage location during at least the portion of the flight plan of the aircraft, or a combination thereof.

At operation 726, the data file is transmitted. In some embodiments, the data file is transmitted over a cloud computing network connection to an aircraft interface computing device or the transient storage connection, and then transmitted to the aircraft computing device over an air-to-ground connection from the aircraft interface computing device or the transient storage connection. At operation 728, the aircraft computing device receives the data file.

At operation 730, the aircraft computing device determines whether there is a break in communication during the transmission of the data file. A break in communication may correspond to a break in the connection with the aircraft computing device over the air-to-ground network during the transfer of the data file. If the answer is yes (there is a break in communication), then the process continues to operation 702, where the aircraft computing device transmits an additional communication. If the answer at operation 730 is no (there is not a break in communication), then the process continues to operation 732, where the aircraft computing device completes the transmission of the data file.

At operation 734, the aircraft computing device transmits a notification that the transmission of the transmission is complete, and at operation 736, the ground computing device optionally removes the command from the command queue. In some embodiments, when the command to transmit the data file to the ground computing device is a repeating command, upon completion of the transmission of the data file, the ground computing device removes a first instance of the command from the command queue and add a new instance of the command that corresponds to the next time the repeating command is to reoccur.

Figure 8:
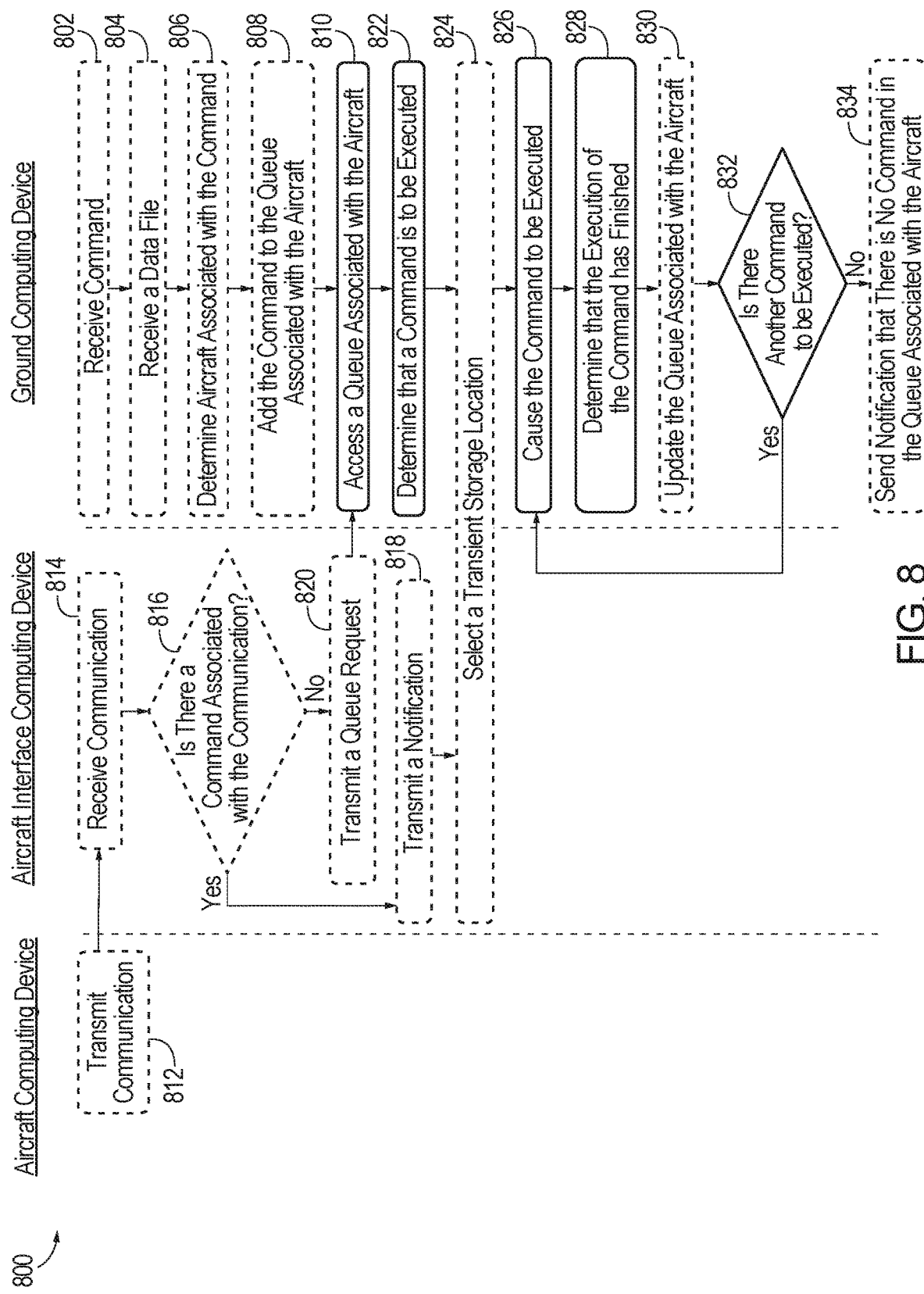
FIG. 8 is a flowchart depicting methods for generating and maintaining a command queue for exchanging data files between an aircraft computing device and a ground computing device.

FIG. 8 is a flowchart depicting methods 800, according to the present disclosure, for generating and maintaining a command queue for exchanging data files between an aircraft computing device 106 and a ground computing device 102.

As shown in FIG. 8, at operation 802 the ground computing device optionally receives a command. In some examples, the command is received via user inputs into a ground computing device (e.g., inputs provided via a keyboard, mouse, touchpad, camera, audio, etc.), a physical input to the ground computing device (e.g., a CD, DVD, software input, etc.), data inputs provided to the ground computing device via the network interface (e.g., input from a third party computing device, aircraft computing device, etc.), or a combination thereof. For example, a user may enter one or more identifiers and/or classifiers of one or more aircraft, and a selection of a data file that is to be exchanged between the ground computing device and the one or more aircraft computing devices operating on aircraft associated with the one or more identifiers and/or classifiers. Alternatively or in addition, commands are generated by a service module executing on the ground computing device. For example, a service module that monitors flight conditions may determine that the weather in a particular geographic region is hazardous, and may generate and provide a command to transmit a warning of the hazardous weather and/or a new flight plan that avoids the hazardous weather to the individual aircraft computing devices operating on aircraft within the geographic region.

At operation 804, the ground computing device optionally receives a data file. In some examples, the ground computing device is further executable to receive the data files for upload to one or more aircraft computing devices. In some embodiments, a data file is input directly into the ground computing device via a user input such as by keyboard, touchscreen, mouse selection, etc. Alternatively, the data file is received by the ground computing device via a data transfer from another computing device, such as from a third party computing device. In some examples, a computing device operated by an airline is the third party computing device, and it provide receives a video file that is to be uploaded to the entertainment systems of aircraft in its fleet. In another example, a third party software provider that provides aircraft software executing on an aircraft computing device transmits a software update for the aircraft software. Additionally, in some examples, the ground computing device also receives a data file from the service module. In some examples, the ground computing device stores a service module that is configured to generate, update, and distribute flight plans to aircraft computing device. Such a service module generates a new flight plan for an aircraft, and transmits the new flight plan to the ground computing device for storage and ultimate distribution to the aircraft computing device.

At operation 808, the ground computing device optionally adds the command to a command queue associated with the aircraft computing device. In some examples, the ground computing device is configured to generate and maintain one or more command queues. In some examples, maintaining a command queue involves adding new commands to the command queue, removing commands from the command queue once completed, updating a status of a command within the command queue (e.g., pending, interrupted, etc.), reordering the commands in the command queue, or a combination thereof. In some examples, at operation 806, in response to receiving a command, the ground computing device optionally identifies an aircraft computing device associated with the command, and then adds the command to a command queue associated with the aircraft computing device.

At operation 810, the ground computing device accesses the command queue associated with the aircraft computing device. In some examples, the ground computing device is configured to receive queue requests from the aircraft interface computing device, identify a command queue that corresponds to data files that are to be exchanged with the aircraft computing device, and determine that a command is in a command queue associated with the aircraft computing device. In some embodiments, determining that the command is in the command queue comprises the ground computing device dynamically generating a command queue for the aircraft computing device. In some examples, the ground computing device identifies a plurality of commands that are to be executed in relation to the particular aircraft computing device (i.e., from a pool of commands, from a plurality of command queues, etc.), and then dynamically generates a command queue for the particular aircraft computing device. For example, where the queue request identifies an airline type, aircraft type, and a geographic location of the associated aircraft, in some examples, the ground computing device identifies commands that are to be executed with aircraft operated by the airline, with aircraft of the aircraft type, with aircraft within the geographic location, and/or a combination thereof. In some examples, the ground computing device then generates a command queue of the relevant commands that are to be executed with the particular aircraft computing device and an order in which they are to be executed.

At operation 812, the aircraft computing device optionally transmits a communication. In some examples, an aircraft service executing on the aircraft computing device causes a communication to be transmitted to one or more aircraft interface computing devices. In some examples, the communication is transmitted over an air-to-ground network, such as a wireless network, a satellite network, a cellular network, or other type of air-to-ground that allows uplinks/downlinks to facilitate data exchanges between an aircraft in flight and a ground-based computing device. In some examples, the communication includes one or more identifiers that are associated with the corresponding aircraft, aircraft computing device, aircraft service, or a combination thereof. For example, in some examples, the communication includes one or more of an airline identifier (e.g., an international civil aviation organization (ICAO) code or an international air transport association (IATA) code, etc.), an airplane identifier (e.g., a tail number, a registration number, a manufacturer number, a serial number, etc.), and a software identifier. In addition, in some examples, the communication also includes a software-based instruction that identifies an action and/or data transfer that is to occur between ground computing device and the aircraft computing device.

In some embodiments, the aircraft service causes the aircraft computing device to transmit the communication periodically, according to a schedule, and/or based on a trigger event, such as an input from a user associated with the aircraft (e.g., pilot, passenger, steward, etc.), a data file being generated, a data file reaching a preset size, an available amount of the aircraft memory reaching or dropping below a threshold, occurrence of a preset event (e.g., reaching a preset altitude, reaching a preset location, the aircraft being airborne for a preset amount of time, etc.), and/or reception of a transmission from an external computing device, such as the ground computing devices, an aircraft interface computing device, a transient storage location, or another computing device.

At operation 814, the aircraft interface computing device optionally receives the communication. Receiving the communication may include establishing a secure connection between the aircraft computing device and an aircraft interface computing device. In some embodiments, more than one aircraft interface computing devices receive the communication, and it is determined which one of the aircraft interface computing devices is to establish a secure connection with the aircraft computing device. In some embodiments, the aircraft interface computing device also determines an aircraft classifier associated with the aircraft computing device, and/or selects an aircraft API for communication with an aircraft service executing on the aircraft computing device.

At operation 816, the aircraft interface computing device optionally determines whether there is a command associated with the communication. If the answer at operation 816 is no (there is not a command associated with the communication), then the process continues to operation 820 and the aircraft interface computing device optionally transmits a queue request. In some examples, the queue request includes the aircraft identifiers, aircraft classifiers, and/or metadata that identifies the aircraft, the aircraft computing device, the aircraft service, or a combination thereof. Alternatively, if the answer at operation 816 is yes (there is a command associated with the communication), then the process continues to operation 818, where the aircraft interface computing device optionally transmits a notification. In some examples, the aircraft interface computing device transmits a notification that includes information configured to cause the command associated with the communication to be executed. In some examples, the notification is configured to cause a data file to be exchanged between the aircraft computing device and the ground computing device.

At operation 822, the ground computing device determines that a command is to be executed. In some examples, the ground computing device uses the command queue to determine a command that is to be executed with the aircraft computing device.

At operation 824, a transient storage location is optionally selected. In some embodiments, the data file may be exchanged between the aircraft computing device and the aircraft interface computing device via a transient storage location. In some examples, a transient storage location corresponds to a data storage resource of cloud computing network that is configured to exchange data files between the ground computing devices over the network, and also exchange data files between the aircraft computing devices over the air-to-ground network. In some embodiments, the cloud computing network includes a plurality of transient storage locations through which data files can be routed. Individual transient storage locations may be geographically positioned so that they are more proximate to and/or have stronger connections to aircraft located in an associated geographic area.

In some examples, the transient storage location is selected from a plurality of transient storage locations by the ground computing device, the aircraft interface computing device, or a combination thereof. In some examples, the transient storage location through which the data file is to be transferred is selected based on the aircraft being geographically located within a threshold distance of the transient storage location at the time the data file will be transferred to the aircraft computing device, a flight plan of the aircraft, an strength/efficiency of the uplink/downlink connection between the aircraft computing device and the transient storage location during at least a portion of the flight plan of the aircraft, or a combination thereof.

At operation 826, the ground computing device causes the command to be executed. In some examples, the ground computing device performs one or more actions to cause a data file to be exchanged between the ground computing device and an aircraft computing device. Then, at operation 828, the ground computing device determines that the execution of the command has finished, and optionally updates the queue associated with the aircraft at operation 830. In some examples, updating the queue corresponds to removing the command, or, where the command is to be repeated, the ground computing device removes the command and then adds a new instance of the command that corresponds to the next occasion that the command is to be executed.

At operation 832, the ground computing device determines whether there is another command to be executed. If the answer is yes (there is another command to be executed), then the process returns to operation 826, where the ground computing device causes the command to be executed. However, if the answer at operation 832 is no (there is not another command to be executed), then the process continues to operation 834, where the ground computing device optionally sends a notification that there is no command in the queue associated with the aircraft to the aircraft interface computing device, the aircraft computing device, or both.

The methods 400, 500, 600, 700, and 800 are described with reference to the environment 100 and computing devices 200 and 300 of FIGS. 1-3 for convenience and ease of understanding. However, the methods 400, 500, 600, 700, and 800 are not limited to being performed using the environment 100 and/or computing devices 200 and 300. Moreover, the environment 100 and computing devices 200 and 300 are not limited to performing the methods 400, 500, 600, 700, and 800.

The methods 400, 500, 600, 700, and 800 are illustrated as collections of blocks in logical flow graphs, which represent sequences of operations that may be implemented in hardware, software, or a combination thereof. In the context of software, the blocks represent computer-executable instructions stored on one or more computer-readable storage media that, when executed by one or more processors, perform the recited operations. Generally, computer executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the methods. In some embodiments, one or more blocks of the method may be omitted entirely. Moreover, the methods 400, 500, 600, 700, and 800 may be combined in whole or in part.

The various techniques described herein may be implemented in the context of computer-executable instructions or software that are stored in computer-readable storage and executed by the processor or processors of one or more computers or other devices such as those illustrated in the figures. Generally, program modules include routines, programs, objects, components, data structures, etc., and define operating logic for performing particular tasks or implement particular abstract data types. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media and not limited to the forms of memory that are specifically described.

Illustrative, non-exclusive examples of inventive subject matter according to the present disclosure are described in the following enumerated paragraphs:

A1. A computing method for data exchanges between an aircraft computing device and a ground computing device, the method comprising:

receiving, by an aircraft interface computing device, an initial communication from an aircraft service executing on the aircraft computing device located onboard an aircraft;

determining, based on the initial communication, an aircraft classifier associated with at least one of the aircraft service, the aircraft computing device, and the aircraft;

selecting, by the aircraft interface computing device and based on the aircraft classifier, an aircraft API for communicating with the aircraft service from a plurality of aircraft APIs, wherein each of the aircraft APIs allows the aircraft interface computing device to communicate with one or more of corresponding aircraft services, corresponding aircraft computing devices, or corresponding aircraft;

transmitting, by the aircraft interface computing device, one or more first communications to the ground computing device; and transmitting, by the aircraft interface computing device and using the aircraft API, one or more second communications to the aircraft service, wherein the one or more first communications and the one or more second communications cause a data file to be exchanged between the ground computing device and the aircraft computing device.

A1.1. The method of paragraph A1, wherein the ground computing device is configured to exchange the data file with one or more aircraft computing devices within a service region, wherein the service region comprises a plurality of service sub-regions.

A1.1.1. The method of paragraph A1.1, wherein the service region is a global region.

A2. The method of any of paragraphs A1-A1.1.1, wherein each aircraft API of the plurality of aircraft APIs is executable on a plurality of aircraft interface computing devices.

A2.1. The method of paragraph A2, wherein each aircraft interface computing device of the plurality of aircraft interface computing device is located in a corresponding service sub-region of the plurality of service sub-regions.

A2.2. The method of any paragraphs A1-A2.1, wherein the aircraft interface computing device is geographically located in a remote location from the ground computing device.

A2.2.1. The method of paragraph A2.2, wherein the aircraft is within a first service region during the transmission of the initial communication.

A3. The method of any of paragraphs A1-A2.1, wherein the initial communication is transmitted from the aircraft service to the aircraft interface computing device over a first communications medium, and the one or more first communications are transmitted from the aircraft interface computing device to the ground computing device over a second communications medium that is different from the first communications medium.

A3.1. The method of paragraph A3, wherein the first communications medium is one of a wireless network, a satellite network, and a cellular network.

A3.2. The method of any of paragraphs A3-A3.1, wherein the second communications medium is the internet.

A3.3. The method of any of paragraphs A3-A3.1, wherein the second communications medium is a cloud computing network.

A4. The method of any of paragraphs A1-A3.3, wherein the receiving the initial communication from the aircraft service comprises establishing a secure connection between the aircraft computing device and the aircraft interface computing device.

A5. The method of any of paragraphs A1-A4, wherein the aircraft is in flight during the transmission of the initial communication.

A6. The method of any of paragraphs A1-A5, wherein the aircraft interface computing device is an infrastructure component of a cloud computing network.

A7. The method of any of paragraphs A1-A6, wherein the initial communication includes one or more identifiers for the aircraft, the aircraft computing device, and/or the aircraft service.

A7.1. The method of paragraph A7, wherein the one or more identifiers include an airline identifier and/or an airplane identifier.

A7.1.1. The method of paragraph A7.1, wherein the airline identifier comprises one of an international civil aviation organization (ICAO) code or an international air transport association (IATA) code.

A7.1.2. The method of any of paragraphs A7.1-A7.1.1, wherein the airplane identifier comprises one of a tail number, a registration number, a manufacturer number, and a serial number.

A8. The method of any of paragraphs A1-A7.1.2, wherein the receiving the initial communication includes a command.

A8.1. The method of paragraph A8, wherein the command corresponds to a request to exchange the data file between the ground computing device and the aircraft computing device.

A9. The method of any of paragraphs A1-A8.1, wherein the receiving the initial communication is responsive to a prior transmission from the aircraft API.

A9.1. The method of paragraph A9, wherein the initial communication is transmitted periodically by the aircraft service.

A9.2. The method of paragraph A9, wherein the initial communication is transmitted to a plurality of aircraft interface computing devices proximate to the aircraft at the time of transmission.

A9.2.1. The method of paragraph A9.2, further comprising determining that the aircraft interface computing device is the most efficient computing resource for communicating with the aircraft.

A10. The method of any of paragraphs A1-A9.2.1, wherein the aircraft classifier corresponds to one or more of a type of the aircraft, a year of the aircraft, a model of the aircraft, an airline associated with the aircraft, a type of computing device on which the aircraft service is executing, a type of service to which the aircraft service corresponds, or a combination thereof.

A11. The method of any of paragraphs A1-A10, wherein the determining the aircraft classifier comprises accessing a data construct that identifies the aircraft classifier.

A11.1. The method of paragraph A11, wherein the data construct is a lookup table that stores relationships between the one or more identifiers and the aircraft classifier.

A12. The method of any of paragraphs A1-A10, wherein the determining the aircraft classifier comprises transmitting the one or more identifiers included in the initial communication to the ground computing device, and receiving the aircraft classifier from the ground computing device.

A13. The method of any of paragraphs A1-A12, wherein the one or more first communications and the one or more second communications cause the data file to be exchanged between the ground computing device and the aircraft computing device by transmitting the data file from the aircraft computing device to the ground computing device.

A14. The method of any of paragraphs A1-A12, wherein transmitting the data file corresponds to transmitting the data file from the aircraft computing device to a central storage location associated with the ground computing device.

A14.1. The method of paragraph A14, wherein the central storage location segregates stored data according to the aircraft classifiers.

A15. The method of any of paragraphs A1-A14.1, wherein the data file includes a security log, a performance log, health monitoring data, and/or a system log.

A16. The method of any of paragraphs A1-A15, wherein the one or more first communications and the one or more second communications cause the data file to be exchanged between the ground computing device and the aircraft computing device by transmitting the data file to a third party storage location associated with the ground computing device.

A17. The method of any of paragraphs A1-A12, wherein the one or more first communications and the one or more second communications cause the data file to be exchanged between the ground computing device and the aircraft computing device by transmitting the data file from the ground computing device to the aircraft computing device.

A17.1. The method of paragraph A17, wherein the one or more first communications and the one or more second communications cause the data file to be exchanged between the ground computing device and the aircraft computing device by transmitting the data file from the central storage location associated with the ground computing device to the aircraft computing device.

A18. The method of any of paragraphs A1-A17.1, wherein the data file includes a software update and/or a flight plan.

A19. The method of any of paragraphs A1-A18, wherein the data file is exchanged between the ground computing device and the aircraft computing device via a transient storage location.

A19.1. The method of paragraph A19, wherein the transient storage location is associated with the aircraft interface computing device.

A20. The method of any of paragraphs A1-A19.1, further comprising receiving an additional initial communication from the aircraft service based on a break in communication between the aircraft computing device and the aircraft interface computing device.

A20.1. The method of paragraph A20, wherein the additional initial communication is received by the aircraft API executing on the aircraft interface computing device.

A20.2. The method of paragraph A20, wherein the aircraft API device is a first aircraft API executing on a first aircraft interface computing device, and the additional initial communication is received by a second aircraft API executing on a second aircraft interface computing device.

A20.2.1. The method of paragraph A20.2, wherein the second aircraft interface computing device is geographically located remotely from the first aircraft interface computing device.

A20.3. The method of any of paragraphs A20-A20.2.1, further comprising determining the aircraft classifier based on the additional initial communication, and selecting the programmatic protocol based on the aircraft classifier.

A21. The method of any of paragraphs A1-A20.3, further comprising determining that an exchange of the data file was interrupted by the break in communication, and causing the exchange of the data file between the ground computing device and the aircraft computing device to continue.

A22. The method of any of paragraphs A1-A21, wherein the transmitting the one or more first communications includes transmitting to the ground computing device a request to exchange the data file between the aircraft computing device and the ground computing device.

A22.1. The method of paragraph A22, wherein the transmitting the one or more first communications includes transmitting the aircraft classifier and the one or more identifiers to the ground computing device, and wherein the ground computing device is configured to determine, based on the aircraft classifier and the one or more identifiers, that the data file is to be transmitted between the ground computing device and the aircraft computing device.

A22.1.1. The method of paragraph A22.1, further comprising determining, by the ground computing device, that the data file is to be exchanged between the ground computing device and the aircraft computing device by accessing a command queue associated with the aircraft.

A22.1.1.1. The method of paragraph A22.1.1, wherein the ground computing device hosts and/or maintains the command queue in an accessible storage location.

A23. The method of any of paragraphs A1-A22.1.1.1, wherein the initial communication is a first initial communication from a first aircraft service executing on a first aircraft computing device located onboard a first aircraft, and the method further comprises receiving, by the aircraft interface computing device, a second initial communication from a second aircraft service executing on a second aircraft computing device located onboard a second aircraft.

A23.1. The method of paragraph A23, further comprising determining, based on the second initial communication, that the aircraft classifier is associated with at least one of the second aircraft service, the second aircraft computing device, and the second aircraft.

A23.1.1. The method of paragraph A23.1, further comprising selecting, by the aircraft interface computing device and based on the aircraft classifier, a second aircraft API for communicating with the second aircraft service from the plurality of aircraft APIs.

A23.2. The method of paragraph A23, wherein the aircraft classifier is a first aircraft classifier, and the method further comprising determining, based on the second initial communication, that a second aircraft classifier is associated with at least one of the second aircraft service, the second aircraft computing device, and the second aircraft, wherein the second aircraft classifier is different from the first aircraft classifier.

A23.2.1. The method of paragraph A23.2, further comprising selecting, by the aircraft interface computing device and based on the second aircraft classifier, the second aircraft API for communicating with the second aircraft service from the plurality of aircraft APIs.

A23.2.2. The method of paragraph A23.2, wherein the aircraft API is a first aircraft API, and the method further comprises selecting, by the aircraft interface computing device and based on the second aircraft classifier, a second aircraft API for communicating with the second aircraft service from the plurality of aircraft APIs, wherein the second aircraft API is different from the first aircraft API.

B1. A computing method for data exchanges between an aircraft computing device on an aircraft and a ground computing device, the method comprising:

receiving, by the ground computing device, a data transmission from an aircraft interface computing device located remotely from the ground computing device, the data transmission indicating that a data file is to be exchanged between the ground computing device and the aircraft computing device in communication with the aircraft interface computing device; and exchanging the data file between the ground computing device and the aircraft computing device utilizing an aircraft API executing on the aircraft interface computing device, wherein the aircraft API is one of a plurality of aircraft APIs stored on the aircraft interface computing device, and wherein each of the plurality of aircraft APIs are configured for communicating with unique aircraft services executing on unique aircraft computing devices.

B1.1. The method of paragraph B1, wherein the ground computing device is configured to exchange the data file with the aircraft computing device within a service region, wherein the service region comprises a plurality of service sub-regions.

B1.1.1. The method of paragraph B1.1, wherein the service region is a global region.

B2. The method of any of paragraphs B1-B1.1.1, wherein the aircraft interface computing device is one of a plurality of aircraft interface computing devices.

B2.1. The method of paragraph B2, wherein each aircraft interface computing device of the plurality of aircraft interface computing device is located in a corresponding service sub-region of a/the plurality of service sub-regions.

B3. The method of any of paragraphs B1-B2.1, wherein the ground computing device receiving the data transmission from the aircraft interface computing device located in the service sub-region corresponds to receiving a first data transmission from a first aircraft interface computing device located in a first service sub-region, the first data transmission indicating that a first data file is to be exchanged between the ground computing device and a first aircraft computing device in communication with the first aircraft interface computing device.

B3.1. The method of paragraph B3, further comprising:

receiving, by the ground computing device, a second data transmission from a second aircraft interface computing device located in a second service sub-region, wherein the second service sub-region is different from the first service sub-region, and the second data transmission indicating that a second data file is to be exchanged between the ground computing device and a second aircraft computing device in communication with the second aircraft interface computing device; and exchanging, the second data file between the ground computing device and the second aircraft computing device utilizing an aircraft API executing on the second aircraft interface computing device.

B3.2. The method of paragraph B3, further comprising:

receiving, by the ground computing device, a second data transmission from the first aircraft interface computing device, the second data transmission indicating that a third data file is to be exchanged between the ground computing device and a second aircraft computing device in communication with the second aircraft interface computing device; and exchanging, the third data file between the ground computing device and the second aircraft computing device utilizing the aircraft API executing on the second aircraft interface computing device.

B4. The method of any of paragraphs B1-B3.2, wherein the aircraft interface computing device is geographically located in a remote location from the ground computing device.

B4.1. The method of paragraph B4, wherein the aircraft is located within a threshold distance of a geographic location of the aircraft interface computing device during a transmission of an initial communication between the aircraft and the aircraft interface computing device.

B5. The method of any of paragraphs B1-B4.1, wherein the data file includes a security log, a performance log, health monitoring data, and/or a system log.

B6. The method of any of paragraphs B1-B5, wherein the data file includes a software update and/or a flight plan.

B7. The method of any of paragraphs B1-B6, wherein the data transmission is received from the aircraft interface computing device in response to the aircraft interface computing device receiving an/the initial communication from the aircraft.

B8. The method of any of paragraphs B1-B7, wherein the aircraft is in flight during the transmission of an/the initial communication.

B9. The method of any of paragraphs B1-B8, wherein an/the initial communication is transmitted from the aircraft to the aircraft interface computing device over a first communications medium, and the data transmission is transmitted from the aircraft interface computing device to the ground computing device over a second communications medium that is different from the first communications medium.

B9.1. The method of paragraph B9, wherein the first communications medium is one of a wireless network, a satellite network, and a cellular network.

B9.2. The method of any of paragraphs B9-B9.1, wherein the second communications medium is the internet.

B9.3. The method of any of paragraphs B9-B9.1, wherein the second communications medium is a cloud computing network.

B9.3.1. The method of paragraph B9.3, wherein the aircraft interface computing device is an infrastructure component of the cloud computing network.

B10. The method of any of paragraphs B9-B9.3.1, further comprising receiving, from the aircraft interface computing device and by the ground computing device, one or more identifiers associated with the aircraft.

B10.1. The method of paragraph B10, wherein the one or more identifiers are associated with the aircraft, the aircraft computing device, and/or an aircraft service executing on the aircraft computing device.

B10.2. The method of any of paragraphs B10-B10.1, wherein the one or more identifiers include an airline identifier and/or an airplane identifier.

B10.2.1. The method of paragraph B10.2, wherein the airline identifier comprises one of an international civil aviation organization (ICAO) code or an international air transport association (IATA) code.

B10.2.2. The method of any of paragraphs B10.2-B10.2.1, wherein the airplane identifier comprises one of a tail number, a registration number, a manufacturer number, and a serial number.

B11. The method of any of paragraphs B1-B10.2.2, further comprising receiving, from the aircraft interface computing device and by the ground computing device, an aircraft classifier associated with the aircraft.

B12. The method of any of paragraphs B1-B11, further comprising determining an aircraft classifier associated with a/the airplane identifier.

B12.1. The method of paragraph B12, wherein the determining the aircraft classifier comprises accessing a data construct that identifies the aircraft classifier.

B12.1.1. The method of paragraph B12.1, wherein the data construct is a lookup table that stores relationships between the one or more identifiers and the aircraft classifier.

B13. The method of any of paragraphs B11-B12.1.1, wherein the aircraft classifier corresponds to one or more of a type of the aircraft, a year of the aircraft, a model of the aircraft, an airline associated with the aircraft, a type of the aircraft computing device, a type of aircraft service executing on the aircraft computing device, or a combination thereof.

B14. The method of any of paragraphs B1-B13, wherein the exchanging the data file corresponds to:

receiving the data file from the aircraft computing device; and storing the data file on the ground computing device.

B14.1. The method of paragraph B14, wherein the ground computing device segregates stored data according to the aircraft classifiers.

B14.2. The method of any of paragraphs B14-B14.1, further comprising storing the data file in a portion of the ground computing device associated with a/the aircraft classifier associated with the aircraft.

B15. The method of any of paragraphs B1-B13, wherein the exchanging the data file corresponds to:

receiving the data file from the aircraft computing device; and storing the data file in a third party storage location associated with the ground computing device.

B16. The method of any of paragraphs B1-B13, wherein the exchanging the data file corresponds to transmitting the data file from the ground computing device to the aircraft computing device.

B17. The method of any of paragraphs B1-B16, wherein the data file is exchanged between the ground computing device and the aircraft computing device via a transient storage location.

B17.1. The method of paragraph B17, wherein the transient storage location is associated with the aircraft interface computing device.

B18. The method of any of paragraphs B1-B17.1, further comprising receiving an additional data transmission based on a break in communication between the aircraft computing device and the aircraft interface computing device.

B18.1. The method of paragraph B18, wherein the additional data transmission is received from the aircraft interface computing device.

B18.2. The method of paragraph B18, wherein the aircraft interface computing device is a first aircraft interface computing device, and the additional data transmission is received from a second aircraft interface computing device.

B18.2.1. The method of paragraph B18.2, wherein the second aircraft interface computing device is located in a different service sub-region than the first aircraft interface computing device.

B19. The method of any of paragraphs B1-B18.2.1, further comprising determining, by the ground computing device, the data file is to be transmitted between the ground computing device and the aircraft computing device by accessing a command queue associated with the aircraft.

B19.1. The method of paragraph B19, wherein the ground computing device hosts and/or maintains the command queue in an accessible storage location.

B19.2. The method of any of paragraphs B19-B19.1, further comprising:

determining that the data file has been exchanged between the ground computing device and the aircraft computing device;

determining, based on the command queue, that another data file is to be exchanged between the ground computing device and the aircraft computing device based on the command queue; and exchanging the other data file between the ground computing device and the aircraft computing device.

C1. A computing method for data transmissions from an aircraft computing device on an aircraft to a ground computing device, the method comprising:

receiving, by an aircraft API executing on an aircraft interface computing device, an initial communication from an aircraft service executing on the aircraft computing device;

determining, by the aircraft API, that a data file is to be transmitted from the aircraft computing device to the ground computing device;

transmitting, to the aircraft computing device, a data signal configured to cause the data file to be transmitted from the aircraft computing device to a transient storage location associated with the aircraft interface computing device; and causing the data file to be transmitted from the transient storage location to the ground computing device.

C1.1. The method of paragraph C1, wherein the ground computing device is configured to exchange the data file with the aircraft computing device within a service region, wherein the service region comprises a plurality of service sub-regions.

C1.1.1. The method of paragraph C1.1, wherein the service region is a global region.

C2. The method of any of paragraphs C1-C1.1.1, wherein the transient storage location is geographically located in a remote location from the ground computing device.

C2.1. The method of paragraph C2, wherein the aircraft interface computing device is located in a first service sub-region of a/the plurality of service sub-regions, and the transient storage location is located in a second service sub-region of the plurality of service sub-regions that is different from the first service sub-region.

C2.1.1. The method of paragraph C2.1, wherein the aircraft interface computing device is geographically located in a remote location from the ground computing device.

C2.1.2. The method of paragraph C2.1, wherein the aircraft interface computing device is geographically located within a threshold distance of the transient storage location.

C3. The method of any of paragraphs C1-C2.1.2, wherein the aircraft API is one of a plurality of aircraft APIs, and wherein each aircraft API of the plurality of aircraft APIs executes on a plurality of aircraft interface computing devices.

C3.1. The method of paragraph C3, wherein each aircraft interface computing device of the plurality of aircraft interface computing devices is located in a different service sub-region of a/the plurality of service sub-regions.

C4. The method of any of paragraphs C1-C3.1, wherein the aircraft interface computing device is an infrastructure component of a cloud computing network.

C5. The method of any of paragraphs C1-C4, wherein the data file includes a security log, a performance log, health monitoring data, and/or a system log.

C6. The method of any of paragraphs C1-C5, wherein the initial communication includes one or more identifiers for the aircraft, the aircraft computing device, and/or the aircraft service.

C6.1. The method of paragraph C6, wherein the one or more identifiers include an airline identifier and/or an airplane identifier.

C6.1.1. The method of paragraph C6.1, wherein the airline identifier comprises one of an international civil aviation organization (ICAO) code or an international air transport association (IATA) code.

C6.1.2. The method of any of paragraphs C6.1-C6.1.1, wherein the airplane identifier comprises one of a tail number, a registration number, a manufacturer number, and a serial number.

C7. The method of any of paragraphs C1-C6.1.2, further comprising determining, based on the initial communication, an aircraft classifier associated with at least one of the aircraft service, the aircraft computing device, and the aircraft.

C7.1. The method of paragraph C7, wherein the aircraft classifier corresponds to one or more of a type of the aircraft, a year of the aircraft, a model of the aircraft, an airline associated with the aircraft, a type of computing device on which the aircraft service is executing, a type of service to which the aircraft service corresponds, or a combination thereof.

C7.2. The method of any of paragraphs C7-C7.1, wherein the determining the aircraft classifier comprises accessing a data construct that identifies the aircraft classifier.

C7.2.1. The method of paragraph C7.2, wherein the data construct is a lookup table that stores relationships between the one or more identifiers and the aircraft classifier.

C7.3. The method of any of paragraphs C7-C7.1, wherein the determining the aircraft classifier comprises transmitting a/the one or more identifiers included in the initial communication to the ground computing device and receiving the aircraft classifier from the ground computing device.

C8. The method of any of paragraphs C7-C7.3, further comprising selecting, by the aircraft interface computing device and based on the aircraft classifier, the aircraft API for communicating with the aircraft service from a plurality of aircraft APIs, wherein each aircraft API of the plurality of aircraft APIs is configured to communicate with a unique aircraft service of a unique aircraft computing device.

C9. The method of any of paragraphs C1-C8, wherein the initial communication includes a command to transmit the data file from the aircraft computing device to the ground computing device, and wherein the determining that the data file is to be transmitted from the aircraft computing device to the ground computing device is based on the command.

C10. The method of any of paragraphs C1-C8, wherein the determining that the data file is to be transmitted from the aircraft computing device to the ground computing device comprises:

transmitting, by the aircraft interface computing device, the aircraft classifier and the one or more identifiers to the ground computing device; and receiving, from the ground computing device, a notification that the data file is to be transmitted from the aircraft computing device to the ground computing device.

C10.1. The method of paragraph C10, further comprising determining, by the ground computing device, that the data file is to be exchanged between the ground computing device and the aircraft computing device by accessing a command queue associated with the aircraft.

C10.1.1. The method of paragraph C10.1, wherein the ground computing device hosts and/or maintains the command queue in an accessible storage location.

C11. The method of any of paragraphs C1-C10.1, wherein the initial communication is a downlink communication.

C12. The method of any of paragraphs C1-C11, further comprising determining that the data file has been completely stored in the transient storage location, and wherein the data file is transmitted from the transient storage location to the ground computing device based on the data file being completely stored in the transient storage location.

C13. The method of any of paragraphs C1-C12, wherein the transient storage location is a data storage resource of a cloud computing network.

C14. The method of any of paragraphs C1-C13, wherein the causing the data file to be transmitted from the transient storage location corresponds to causing the data file to be transmitted from the transient storage location to a third party storage location associated with the ground computing device.

C15. The method of any of paragraphs C1-C14, wherein the causing the data file to be transmitted from the transient storage location comprises:

determining a location the data file is to be stored in the ground computing device; and causing the data file to be transmitted to the location in the ground computing device.

C15.1. The method of paragraph C15, wherein the determining the location the data file is to be stored in the ground computing device comprises:

transmitting, by the aircraft interface computing device, one or more of the one or more identifiers and the aircraft classifier to the ground computing device; and receiving, by the aircraft interface computing device and from the ground computing device, a uniform resource identifier (URI) for the location the data file is to be stored in the ground computing device; and causing the data file to be transmitted to the location in the ground computing device based on the URI.

C15.1.1. The method of paragraph C15.1, wherein the URI identifies a storage container associated with the one or more identifiers and/or the aircraft classifier.

C15.1.2. The method of any of paragraphs C15-C15.1.1, wherein the URI identifies a storage container associated with the airline that operates the aircraft.

C16. The method of any of paragraphs C1-C15.1.2, further comprising determining that the data file is to be transmitted from the aircraft computing device to the ground computing device via the transient storage location.

C16.1. The method of paragraph C16, wherein the determining that the data file is to be transmitted from the aircraft computing device to the ground computing device via the transient storage location comprises selecting the transient storage location from a plurality of transient storage locations.

C16.2. The method of any of paragraphs C16-C16.1, wherein the determining that the data file is to be transmitted via the transient storage location comprises determining that the transient storage location is geographically located within a threshold distance of the aircraft.

C16.3. The method of any of paragraphs C16-C16.2, wherein the determining that the data file is to be transmitted via the transient storage location is based on the airline identifier and/or the airplane identifier.

C16.4. The method of any of paragraphs C16-C16.1, wherein the determining that the data file is to be transmitted via the transient storage location comprises:

transmitting the airline identifier and/or the airplane identifier to the ground computing device; and receiving, from the ground computing device and based on the airline identifier and/or the airplane identifier, an identification of a selected transient storage location.

C16.5. The method of any of paragraphs C16-C16.4, wherein the determining that the data file is to be transmitted via the transient storage location is based on an airplane link type between the aircraft and the aircraft interface computing device.

C16.5.1. The method of paragraph C16.5, wherein the airplane link type is one of a Wi-Fi link, a cellular link, or a satellite link.

C16.6. The method of any of paragraphs C16-C16.5.1, wherein the determining that the data file is to be transmitted via the transient storage location is based on a file size of the data file, an onboard system type of the aircraft computing device, and/or hardware capabilities of the aircraft computing device.

C16.7. The method of any of paragraphs C16-C16.6, wherein the determining that the data file is to be transmitted via the transient storage location is based on a performance of the cloud computing network and/or a performance of the aircraft interface computing device.

C17. The method of any of paragraphs C1-C16.7, further comprising deleting the data file from the transient storage location.

C17.1. The method of paragraph C17, wherein the deleting the data file from the transient storage location is based on receiving a data transmission from the ground computing device corresponding to a notification the data file has been fully transmitted.

C18. The method of any of paragraphs C1-C17.1, further comprising:

receiving a notification the data file is to be transferred from the aircraft computing device and the ground computing device via a different aircraft interface computing device and/or a different transient storage location; and causing the aircraft computing device to transmit the data file to the ground computing device via the different aircraft interface computing device and/or the different transient storage location.

C19. The method of any of paragraphs C1-C18, wherein the transient storage location receives the data file in component subparts, and the method further comprises aggregating the component subparts to form the data file.

C20. The method of any of paragraphs C1-C18, wherein the transient storage location receives the data file in component subparts, and the transmitting the data file from the transient storage location to the ground computing device comprises transmitting the component subparts from the transient storage location to the ground computing device, wherein the ground computing device is configured to aggregate the component subparts to form the data file.

C21. The method of any of paragraphs C1-C20, further comprising:
determining metadata for the initial communication; and
transmitting a notification to the ground computing device that includes the metadata for the initial communication.

C21.1. The method of paragraph C21, wherein the metadata for the initial communication includes one or more of a name of the data file, a type of the data file, a size of the data file, a time stamp for the data file, a time stamp for the transfer, an airplane classifier, the airline identifier, the airplane identifier, a location of the aircraft, a location of the transient storage location, and a URL for the data file in the transient storage location.

C21.2. The method of any of paragraphs C21-C21.1, further comprising storing the metadata for the initial communication.

C21.3. The method of any of paragraphs C21-C21.2, further comprising tagging the data file with the metadata for the initial communication.

C22. The method of any of paragraphs C1-C21.3, further comprising:
receiving an additional initial communication from the aircraft interface computing device based on a break in communication between the aircraft computing device and the aircraft interface computing device that interrupted the transmission of the data file from the aircraft computing device to the transient storage location; and
resuming the transmission of the data file from the aircraft computing device to the transient storage location.

C22.1. The method of paragraph C22, wherein the break in communication to the aircraft computing device corresponds to losing a network connection.

C22.2. The method of paragraph C22, wherein the break in communication corresponds to a failure of the aircraft interface computing device.

C22.3. The method of paragraph C22, wherein the break in communication corresponds to a failure of the transient storage location.

C22.4. The method of any of paragraphs C22-C22.3, wherein the resuming the transmission of the data file from the aircraft computing device to the transient storage location comprises determining the transient storage is available, and transmitting a notification to the aircraft that causes the transmission of the data file from the aircraft computing device to the transient storage location to resume.

C22.4.1. The method of paragraph C22.4, wherein the resuming the transmission of the data file from the aircraft computing device to the transient storage location is based on the metadata for the initial communication stored by the aircraft interface computing device.

C22.4.2. The method of paragraph C22.4, wherein the resuming the transmission of the data file from the aircraft computing device to the transient storage location comprises:
transmitting the metadata for the additional initial communication to the ground computing device;
receiving, based on the metadata for the initial communication stored by the ground computing device, a notification from the ground computing device that the transmission of the data file is to be continued; and
resuming the transmission of the data file from the aircraft computing device to the transient storage based on the notification that the transmission of the data file is to be continued.

C22.4.2.1. The method of paragraph C22.4.2, wherein the notification includes one or more of a status of the data file, a size of the data file stored on the transient storage location, and a location of the data file on the transient storage location.

C23. The method of any of paragraphs C22-C22.4.2.1, wherein the additional initial communication is received by the aircraft interface computing device.

C24. The method of any of paragraphs C22-C22.4.2.1, wherein the aircraft API is a first aircraft API executing on a first aircraft interface computing device, and the additional initial communication is received by a second aircraft API executing on a second aircraft interface computing device.

C24.1. The method of paragraph C24, wherein the second aircraft interface computing device is located in a different service sub-region than the first aircraft interface computing device.

C25. The method of any of paragraphs C1-C24.1, further comprising selecting an alternate transient storage location, and causing a remaining portion of the data file to be transmitted from the aircraft computing device to the alternate transient storage location.

C25.1. The method of paragraph C25, wherein the selecting the alternate transient storage location is based on one or more of a new geographic location of the aircraft, performance data for the transient storage location, performance data for the alternate transient storage location, a failure of the transient storage location, performance data for the connection between the ground computing device and the transient storage location, performance data for the connection between the ground computing device and the alternate transient storage location, a type of connection between the aircraft computing device and the transient storage location, and a type of connection between the aircraft computing device and the alternate transient storage location.

C25.2. The method of any of paragraphs C25-C25.1, wherein the selecting the alternate transient storage location comprises selecting the alternate transient storage location from a plurality of alternate transient storage locations.

C26. The method of any of paragraphs C1-C25.2, further comprising:
receiving, by the aircraft interface computing device, an additional initial communication from an additional aircraft service executing on an additional aircraft computing device located onboard an additional aircraft;
determining, by the aircraft interface computing device, that an additional data file is to be transmitted from the additional aircraft computing device to the ground computing device;
transmitting, to the additional aircraft computing device, an additional data signal configured to cause the additional data file to be transmitted from the additional aircraft computing device to the transient storage location; and
causing the additional data file to be transmitted from the transient storage location to the ground computing device.

C27. The method of any of paragraphs C1-C265.2, further comprising:
receiving, by the aircraft interface computing device, a further initial communication from an additional aircraft service executing on an additional aircraft computing device located onboard an additional aircraft;

determining, by the aircraft interface computing device, that an additional data file is to be transmitted from the additional aircraft computing device to the ground computing device;

transmitting, to the additional aircraft computing device, an additional data signal configured to cause the additional data file to be transmitted from the additional aircraft computing device to an additional transient storage location that is different from the transient storage location; and causing the additional data file to be transmitted from the additional transient storage location to the ground computing device.

C28. The method of any of paragraphs C1-C27, wherein the initial communication is transmitted from the aircraft service to the aircraft interface computing device over a first communications medium, and one or more first communications are transmitted from the aircraft interface computing device to the ground computing device over a second communications medium that is different from the first communications medium.

C28.1. The method of paragraph C28, wherein the first communications medium is one of a wireless network, a satellite network, and a cellular network.

C28.2. The method of any of paragraphs C28-C28.1, wherein the second communications medium is the internet.

C28.3. The method of any of paragraphs C28-C28.1, wherein the second communications medium is a cloud computing network.

C29. The method of any of paragraphs C1-C28.3, wherein the receiving the initial communication from the aircraft service comprises establishing a secure connection between the aircraft computing device and the aircraft interface computing device.

C30. The method of any of paragraphs C1-C29, wherein the aircraft is in flight during the transmission of the initial communication.

D1. A computing method for data exchanges between an aircraft computing device executing an aircraft service on an aircraft and a ground computing device, the method comprising:

receiving, by the ground computing device, a data transmission from an aircraft interface computing device and in communication with the aircraft computing device, the data transmission indicating that a data file is to be transmitted from the aircraft computing device to the ground computing device; and receiving, by the ground computing device, the data file from the aircraft computing device via a transient storage location associated with the aircraft interface computing device.

D1.1. The method of paragraph D1, wherein the ground computing device is configured to exchange the data file with one or more aircraft computing devices within a service region, wherein the service region comprises a plurality of service sub-regions.

D1.1.1. The method of paragraph D1.1, wherein the service region is a global region.

D2. The method of any of paragraphs D1-D1.1.1, wherein the transient storage location is a data storage resource of a cloud network.

D2.1. The method of paragraph D2, wherein receiving the data file from the aircraft computing device via the transient storage location corresponds to the ground computing device receiving the data file from the transient storage location over the cloud network.

D3. The method of any of paragraphs D1-D2.1, wherein the receiving the data file from the aircraft computing device via the transient storage location comprises causing the data file to be transmitted from the transient storage location to a central storage location associated with the ground computing device.

D4. The method of paragraph D1, wherein the transient storage location is geographically located in a remote location from the ground computing device.

D4.1. The method of paragraph D4, wherein the aircraft interface computing device is located in a first service sub-region of a/the plurality of service sub-regions, and the transient storage location is located in a second service sub-region of the plurality of service sub-regions that is different from the first service sub-region.

D4.1.1. The method of paragraph D4.1, wherein the aircraft interface computing device is geographically located in a remote location from the ground computing device.

D4.1.2. The method of paragraph D4.1, wherein the aircraft interface computing device is geographically located within a threshold distance of the transient storage location.

D5. The method of any of paragraphs D1-D4.1.2, wherein the aircraft API is one of a plurality of aircraft APIs, and wherein each aircraft API of the plurality of aircraft APIs executes on a plurality of aircraft interface computing devices.

D5.1. The method of paragraph D5, wherein each aircraft interface computing device of the plurality of aircraft interface computing devices is located in a different service sub-region of a/the plurality of service sub-regions.

D6. The method of any of paragraphs D1-D5.1, further comprising determining that the data file is to be transmitted via the transient storage location.

D6.1. The method of paragraph D6, wherein the determining that the data file is to be transmitted via the transient storage location comprises selecting a selected transient storage location from a plurality of transient storage locations.

D6.2. The method of any of paragraphs D6-D6.1, wherein the determining that the data file is to be transmitted via the transient storage location is based on the ground computing device determining the transient storage location is geographically located within a threshold distance of the aircraft.

D6.3. The method of any of paragraphs D6-D6.2, wherein the determining that the data file is to be transmitted via the transient storage location is based on an airline identifier and/or an airplane identifier of the aircraft.

D6.3.1. The method of paragraph D6.3, wherein the determining that the data file is to be transmitted via the transient storage location comprises:

receiving the airline identifier and/or the airplane identifier from the aircraft interface computing device;

determining, based on the airline identifier and/or the airplane identifier, the selected transient storage location through which the data file is to be transmitted; and transmitting, to the aircraft interface computing device, an identification of the selected transient storage location.

D6.4. The method of any of paragraphs D6-D6.3.1, wherein the determining that the data file is to be transmitted via the transient storage location is based on an airplane link type between the aircraft and the aircraft interface computing device.

D6.4.1. The method of paragraph D6.4, wherein the airplane link type is one of a Wi-Fi link, a cellular link, or a satellite link.

D6.5. The method of any of paragraphs D6-D6.4.1, wherein the determining that the data file is to be transmitted via the transient storage location is based on a file size of the data file, an onboard system type of the aircraft computing device, and/or hardware capabilities of the aircraft computing device.

D6.6. The method of any of paragraphs D6-D6.5, wherein the determining that the data file is to be transmitted via the transient storage location is based on a performance of the cloud computing network and/or a performance of the aircraft interface computing device.

D7. The method of any of paragraphs D1-D6.6, further comprising:
determining a remaining portion of the data file is to be transferred from the aircraft computing device to the ground computing device via a different transient storage location; and
transmitting a notification the remaining portion of the data file is to be transferred from the aircraft computing device to the ground computing device via the different transient storage location.

D7.1. The method of paragraph D7, wherein the determining the remaining portion of the data file is to be transferred from the aircraft computing device to the ground computing device via the different transient storage location is based on one or more of a new geographic location of the aircraft, performance data for the transient storage location, performance data for an alternate transient storage location, a failure of the transient storage location, performance data for the connection between the ground computing device and the transient storage location, performance data for the connection between the ground computing device and the alternate transient storage location, a type of connection between the aircraft computing device and the transient storage location, and a type of connection between the aircraft computing device and the alternate transient storage location.

D8. The method of any of paragraphs D1-D7.1, wherein receiving the data file from the aircraft computing device via the transient storage location comprises:
receiving the data file in component subparts; and
aggregating, by the ground computing device, the component subparts to form the data file.

D8.1. The method of paragraph D8, wherein the receiving the data file in the component subparts comprises receiving the component subparts of the data file from a plurality of transient storage locations.

D9. The method of any of paragraphs D1-D8.1, further comprising:
determining that the data file has been transmitted to the ground computing device; and
transmitting, to the aircraft interface computing device, a notification the data file has been transferred from the aircraft computing device to the ground computing device, wherein the notification that the data file has been transferred is configured to cause the data file to be deleted from the transient storage location.

D10. The method of any of paragraphs D1-D9, further comprising receiving a notification from the aircraft interface computing device that includes metadata for the data file.

D10.1. The method of paragraph D10, wherein the metadata for the data file includes one or more of a name of the data file, a type of the data file, a size of the data file, a time stamp for the data file, a time stamp for the transfer, an airplane classifier, the airline identifier, the airplane identifier, a location of the aircraft, a location of the transient storage location, and a URL for the data file in the transient storage location.

D10.2. The method of any of paragraphs D10-D10.1, further comprising storing the metadata for the data file.

D10.3. The method of any of paragraphs D10-D10.2, further comprising tagging the data file with the metadata.

D11. The method of any of paragraphs D1-D10.3, wherein the ground computing device receiving the data transmission from the aircraft interface computing device located in the service sub-region corresponds to receiving a first data transmission from a first aircraft interface computing device located in a first service sub-region of a/the plurality of service sub-regions, the first data transmission indicating that a first data file is to be transmitted from a first aircraft computing device in communication with the first aircraft interface computing device to the ground computing device.

D11.1. The method of paragraph D11, further comprising receiving, by the ground computing device, a second data transmission from a second aircraft interface computing device located in a second service sub-region of the plurality of service sub-regions, wherein the second service sub-region is different from the first service sub-region, and the second data transmission indicating that a second data file is to be transmitted from a second aircraft computing device in communication with the second aircraft interface computing device to the ground computing device.

D11.1.1. The method of paragraph D11.1, further comprising receiving, by the ground computing device, the second data file from the second aircraft computing device via the transient storage location.

D11.1.2. The method of any of paragraphs D11.1-D11.1.1, further comprising receiving, by the ground computing device, the second data file from the second aircraft computing device via the alternate transient storage location that is located in a different service sub-region from the transient storage location.

D11.2. The method of paragraph D11, further comprising receiving, by the ground computing device, a second data transmission from the first aircraft interface computing device, the second data transmission indicating that a third data file is to be transmitted from a second aircraft computing device in communication with the first aircraft interface computing device to the ground computing device.

D11.2.1. The method of paragraph D11.2, further comprising receiving, by the ground computing device, the third data file from the second aircraft computing device via the transient storage location.

D11.2.2. The method of any of paragraphs D11.2-D11.2.1, further comprising receiving, by the ground computing device, the third data file from the second aircraft computing device via the alternate transient storage location that is located in the different service sub-region from the transient storage location.

D12. The method of any of paragraphs D1-D11.2.2, wherein the data file includes one or more of a security log, a performance log, health monitoring data, and/or a system log.

D13. The method of any of paragraphs D1-D12, wherein the data transmission is received from the aircraft interface computing device in response to the aircraft interface computing device receiving an initial communication from the aircraft.

D14. The method of any of paragraphs D1-D13, wherein the aircraft is in flight during a transmission of the data file from the aircraft computing device to the transient storage location.

D15. The method of any of paragraphs D1-D14, wherein the data file is transmitted from the aircraft to the transient storage location over a first communications medium, and the data transmission is transmitted from the transient storage location to the ground computing device over a second communications medium that is different from the first communications medium.

D15.1. The method of paragraph D15, wherein the first communications medium is one of a wireless network, a satellite network, and a cellular network.

D15.2. The method of any of paragraphs D15-D15.1, wherein the first communications medium is a downlink communication medium.

D15.3. The method of any of paragraphs D15-D15.2, wherein the second communications medium is the internet.

D15.4. The method of any of paragraphs D15-D15.2, wherein the second communications medium is a cloud computing network.

D16. The method of any of paragraphs D1-D15.4, wherein the aircraft interface computing device is an infrastructure component of a cloud computing network.

D17. The method of any of paragraphs D1-D16, further comprising receiving, from the aircraft interface computing device and by the ground computing device, one or more identifiers associated with the aircraft.

D17.1. The method of paragraph D17, wherein the one or more identifiers are associated with the aircraft, the aircraft computing device, and/or the aircraft service.

D17.2. The method of any of paragraphs D17-D17.1, wherein the one or more identifiers include an airline identifier and/or an airplane identifier.

D17.2.1. The method of paragraph D17.2, wherein the one or more airline identifiers comprise one or more of an international civil aviation organization (ICAO) code or an international air transport association (IATA) code.

D17.2.2. The method of any of paragraphs D17.1-D17.2.1, wherein the airplane identifier comprises one of a tail number, a registration number, a manufacturer number, and a serial number.

D18. The method of any of paragraphs D1-D17.2.2, further comprising determining an aircraft classifier associated with the aircraft.

D18.1. The method of paragraph D18, wherein the determining the aircraft classifier comprises receiving, from the aircraft interface computing device and by the ground computing device, the aircraft classifier associated with the aircraft.

D18.2. The method of paragraph D18, wherein the determining the aircraft classifier comprises determining, by the ground computing device, the aircraft classifier is based at least in part on the airplane identifier.

D18.2.1. The method of paragraph D18.2, wherein the determining the aircraft classifier comprises accessing a data construct that identifies the aircraft classifier.

D18.2.1.1. The method of paragraph D18.2.1, wherein the data construct is a lookup table that stores relationships between the one or more identifiers and the aircraft classifier.

D18.3. The method of any of paragraphs D18-D18.2.1.1, wherein the determining the aircraft classifier comprises:

receiving, from the aircraft interface computing device, the one or more identifiers and/or the aircraft classifier;

determining a storage location where the data file is to be stored in the central storage location; and transmitting, to the aircraft interface computing device and by the ground computing device, a uniform resource identifier (URI) for the storage location where the data file is to be stored in the central storage location.

D18.3.1. The method of paragraph D18.3, wherein the URI identifies a storage container associated with the one or more identifiers and/or the aircraft classifier.

D18.3.2. The method of any of paragraphs D18.3-D18.3.1, wherein the URI identifies a/the storage container associated with an airline that operates the aircraft.

D18.4. The method of any of paragraphs D18-D18.3.2, wherein the aircraft classifier corresponds to one or more of a type of the aircraft, a year of the aircraft, a model of the aircraft, the airline associated with the aircraft, a type of aircraft computing device on which the aircraft service is executing and communicating to a aircraft API to which the aircraft service corresponds, or a combination thereof.

D19. The method of any of paragraphs D1-D18.4, wherein exchanging the data file corresponds to:

receiving the data file from the aircraft computing device; and storing the data file in the central storage location.

D19.1. The method of paragraph D19, wherein the central storage location segregates stored data according to the aircraft classifier.

D19.1.1. The method of paragraph D19.1, further comprising storing the data file in a portion of the central storage location associated with the aircraft classifier associated with the aircraft.

D20. The method of any of paragraphs D1-D19.1.1, wherein the transmission of the data file corresponds to:

receiving the data file from the aircraft computing device;

determining that the data file is associated with a third party; and transmitting the data file for storage in a third party storage location associated with the ground computing device.

D20.1. The method of paragraph D20, wherein the determining that the data file is associated with the third party is based on one or more of the aircraft classifier and the one or more identifiers associated with the aircraft.

D21. The method of any of paragraphs D1-D20.1, further comprising:

receiving an additional data transmission based on a break in communication between the aircraft computing device and the aircraft interface computing device and/or the transient storage location, the additional data transmission indicating that a remaining portion of the data file is to be transmitted from the aircraft computing device to the ground computing device; and resuming the transmission of the data file from the aircraft computing device to the ground computing device.

D21.1. The method of paragraph D21, wherein the break in communication corresponds to the aircraft computing device losing a network connection.

D21.2. The method of paragraph D21, wherein the break in communication corresponds to a failure of the aircraft interface computing device.

D21.3. The method of paragraph D21, wherein the break in communication corresponds to a failure of the transient storage location.

D21.4. The method of any of paragraphs D21-D21.3, wherein the resuming the transmission of the data file from the aircraft computing device to the ground computing device further comprises determining that the transient storage location is available and resuming the transmission of the data file from the aircraft computing device to the transient storage location.

D21.5. The method of any of paragraphs D21-D21.4, wherein the resuming the transmission of the data file from the aircraft computing device to the transient storage location is based on a/the metadata for the data file.

D21.6. The method of any of paragraphs D21-D21.5, wherein the resuming the transmission of the data file from the aircraft computing device to the ground computing device comprises transmitting to the aircraft interface computing device a notification that includes one or more of a status of the data file, a size of the data file stored on the transient storage location, and a location of the data file on the transient storage location.

D21.7. The method of any of paragraphs D21-D21.6, wherein the additional data transmission is received from the aircraft interface computing device.

D21.8. The method of any of paragraphs D21-D21.6, wherein the aircraft interface computing device is a first aircraft interface computing device, and the additional data transmission is received from a second aircraft interface computing device.

D21.8.1. The method of paragraph D21.8, wherein the second aircraft interface computing device is located in a different service sub-region than the first aircraft interface computing device.

D22. The method of any of paragraphs D1-D21.8.1, wherein the receiving the data transmission from the aircraft interface computing device indicating that the data file is to be transmitted from the aircraft computing device to the ground computing device comprises:

receiving, from the aircraft interface computing device and by the ground computing device, one or more of the aircraft classifier and the one or more identifiers associated with the aircraft;

determining, by the ground computing device, the data file is to be transmitted from the aircraft computing device to the ground computing device based on the one or more of the aircraft classifier and the one or more identifiers associated with the aircraft; and transmitting, to the aircraft interface computing device and by the ground computing device, a notification the data file is to be transmitted from the aircraft computing device to the ground computing device.

D22.1. The method of paragraph D22, wherein the determining that the data file is to be transmitted from the aircraft computing device to the ground computing device comprises accessing, by the ground computing device, a command queue associated with the aircraft.

D23. The method of any of paragraphs D1-D22.1, further comprising determining, by the ground computing device, that an additional data file is to be exchanged between the central storage location and the aircraft computing device by accessing the command queue associated with the aircraft.

D24. The method of any of paragraphs D1-D23, further comprising:

determining that the data file has been transmitted from the aircraft computing device to the ground computing device; and determining, based on the command queue, that another data file is to be exchanged between the central storage location and the aircraft computing device; and exchanging the other data file between the central storage location and the aircraft computing device.

D24.1. The method of paragraph D24, wherein the ground computing device hosts and/or maintains the command queue in an accessible storage location.

E1. A computing method for data transmissions from an aircraft computing device on an aircraft to a ground computing device, the method comprising:

receiving, by an aircraft API executing on an aircraft interface computing device, an initial communication from an aircraft service executing on the aircraft computing device;

determining, by the aircraft API, that a data file is to be transmitted from the ground computing device to the aircraft computing device;

transmitting, to the ground computing device, a data signal configured to cause the data file to be transmitted from the ground computing device to a transient storage location associated with the aircraft interface computing device; and causing the data file to be transmitted from the transient storage location to the aircraft computing device.

E1.1. The method of paragraph E1, wherein the ground computing device is configured to exchange the data file with one or more aircraft computing devices within a service region, wherein the service region comprises a plurality of service sub-regions.

E1.1.1. The method of paragraph E1.1, wherein the service region is a global region.

E2. The method of any of paragraphs E1-E1.1.1, wherein the transient storage location is geographically located in a remote location from the ground computing device.

E2.1. The method of paragraph E2, wherein the aircraft interface computing device is geographically located within a threshold distance of the transient storage location.

E2.1.1. The method of paragraph E2.1, wherein the aircraft interface computing device is geographically located in a remote location from the ground computing device.

E3. The method of any of paragraphs E1-E2.1.1, wherein the aircraft interface computing device is an infrastructure component of a cloud computing network.

E4. The method of any of paragraphs E1-E3, wherein the data file includes a security log, a performance log, health monitoring data, and/or a system log.

E5. The method of any of paragraphs E1-E4, wherein the initial communication includes one or more identifiers for the aircraft, the aircraft computing device, and/or the aircraft service.

E5.1. The method of paragraph E5, wherein the one or more identifiers include an airline identifier and/or an airplane identifier.

E5.1.1. The method of paragraph E5.1, wherein the airline identifier comprises one of an international civil aviation organization (ICAO) code or an international air transport association (IATA) code.

E5.1.2. The method of paragraph E5.1, wherein the airplane identifier comprises one of a tail number, a registration number, a manufacturer number, and a serial number.

E6. The method of any of paragraphs E1-E5.1.2, wherein the aircraft API is one of a plurality of aircraft APIs, and wherein each aircraft API of the plurality of aircraft APIs executes on a plurality of aircraft interface computing devices.

E6.1. The method of paragraph E6, wherein each aircraft interface computing device of the plurality of aircraft interface computing devices is located in a corresponding service sub-region of a/the plurality of service sub-regions.

E7. The method of any of paragraphs E1-E6.1, further comprising determining, based on the initial communication, an aircraft classifier associated with at least one of the aircraft service, the aircraft computing device, and the aircraft.

E7.1. The method of paragraph E7, further comprising selecting, by the aircraft interface computing device and based on the aircraft classifier, the aircraft API for communicating with the aircraft service from a plurality of aircraft APIs, wherein each of the aircraft APIs allows the aircraft interface computing device to communicate with one or more of corresponding aircraft services, corresponding aircraft computing devices, or corresponding aircraft.

E7.2. The method of any of paragraphs E7-E7.1, wherein the aircraft classifier corresponds to one or more of a type of aircraft, a year of the aircraft, a model of the aircraft, an airline associated with the aircraft, a type of computing device on which the aircraft service is executing, a type of service to which the aircraft service corresponds, or a combination thereof.

E7.3. The method of any of paragraphs E7-E7.2, wherein the determining the aircraft classifier is based on one or more identifiers for the aircraft, the aircraft computing device, and/or the aircraft service.

E7.4. The method of any of paragraphs E7-E7.3, further comprising accessing a data construct that identifies the aircraft classifier.

E7.4.1. The method of paragraph E7.4, wherein the data construct is a lookup table that stores relationships between one or more identifiers for the aircraft, the aircraft computing device, and/or the aircraft service and the aircraft classifier.

E7.5. The method of any of paragraphs E7-E7.3, wherein the determining the aircraft classifier comprises:
transmitting the one or more identifiers included in the initial communication to the ground computing device; and
receiving the aircraft classifier from the ground computing device.

E8. The method of any of paragraphs E1-E7.5, wherein the initial communication includes a command to transmit the data file from the ground computing device to the aircraft computing device and wherein the determining that the data file is to be transmitted from the ground computing device to the aircraft computing device is based on the command.

E9. The method of any of paragraphs E7-E7.5, wherein the determining that the data file is to be transmitted from the ground computing device to the aircraft computing device comprises:
transmitting, by the aircraft interface computing device, the aircraft classifier and one or more identifiers for the aircraft, the aircraft computing device, and/or the aircraft service to the ground computing device; and
receiving, from the ground computing device, a notification that indicates that the data file is to be transmitted from the ground computing device to the aircraft computing device.

E9.1. The method of paragraph E9, further comprising determining, by the ground computing device, that the data file is to be transmitted from the ground computing device to the aircraft computing device by accessing a command queue associated with the aircraft.

E9.1.1. The method of paragraph E9.1, wherein the ground computing device hosts and/or maintains the command queue in an accessible storage location.

E10. The method of any of paragraphs E1-E9.1.1, wherein the initial communication is a downlink communication.

E11. The method of any of paragraphs E1-E10, wherein the transient storage location is a data storage resource of a cloud computing network.

E11.1. The method of paragraph E11, wherein the transmitting the data file to the transient storage location comprises transmitting the data file via the cloud computing network.

E12. The method of any of paragraphs E1-E11.1, wherein the transmitting the data file to the transient storage location comprises transmitting the data file to the transient storage location from a central storage location associated with the ground computing device.

E13. The method of any of paragraphs E1-E11.1, wherein the transmitting the data file to the transient storage location comprises transmitting the data file to the transient storage location from a third party storage location associated with the ground computing device.

E14. The method of any of paragraphs E1-E13, wherein the causing the data file to be transmitted to the transient storage location corresponds to causing the data file to be transmitted to the transient storage location in the aircraft computing device via an uplink communication.

E15. The method of any of paragraphs E1-E14, further comprising determining that the data file is to be transmitted from the aircraft computing device to the ground computing device via the transient storage location.

E15.1. The method of paragraph E15, wherein the determining that the data file is to be transmitted via the transient storage location comprises selecting the transient storage location from a plurality of transient storage locations.

E15.2. The method of any of paragraphs E15-E15.1, wherein the determining that the data file is to be transmitted via the transient storage location is based on determining the aircraft will be geographically located within a threshold distance of the transient storage location at the time the data file will be transferred to the aircraft computing device.

E15.3. The method of any of paragraphs E15-E15.2, wherein the data file is preloaded to the transient storage location before the aircraft is geographically located within the threshold distance of the transient storage location.

E15.4. The method of any of paragraphs E15-E15.3, wherein the determining that the data file is to be transmitted via the transient storage location is based on a flight plan of the aircraft.

E15.5. The method of any of paragraphs E15-E15.4, wherein the transient storage location is a cloud storage resource that is geographically located within a threshold distance of at least a portion of the flight plan of the aircraft and/or that is expected to have an efficient connection to the aircraft computing device during at least the portion of the flight plan of the aircraft.

E15.6. The method of any of paragraphs E15-E15.5, wherein the determining that the data file is to be transmitted via the transient storage location is based on the airline identifier and/or the airplane identifier.

E15.6.1. The method of paragraph E15.6, wherein the determining that the data file is to be transmitted via the transient storage location comprises:
transmitting the airline identifier and/or the airplane identifier to the ground computing device; and
receiving, from the ground computing device and based on the airline identifier and/or the airplane identifier, an identification of the selected transient storage location.

E15.7. The method of any of paragraphs E15-E15.6.1, wherein the determining that the data file is to be transmitted via the transient storage location is based on an airplane link type between the aircraft and the aircraft interface computing device.

E15.7.1. The method of paragraph E15.7, wherein the airplane link type is one of a Wi-Fi link, a cellular link, or a satellite link.

E15.8. The method of any of paragraphs E15-E15.7.1, wherein the determining that the data file is to be transmitted via the transient storage location is based on a file size of the data file, an onboard system type of the aircraft computing device, and/or hardware capabilities of the aircraft computing device.

E15.9. The method of any of paragraphs E15-E15.8, wherein the determining that the data file is to be transmitted via the transient storage location is based on a performance of the cloud computing network and/or a performance of the aircraft interface computing device.

E16. The method of any of paragraphs E1-E15.9, further comprising deleting the data file from the transient storage location.

E16.1. The method of paragraph E16, wherein the deleting the data file from the transient storage location is based on receiving the data transmission from the aircraft computing device corresponding to a notification that the data file has been fully transmitted.

E17. The method of any of paragraphs E1-E16.1, further comprising:

receiving a notification that a remaining portion of the data file is to be transferred from the ground computing device to the aircraft computing device via an alternate aircraft interface computing device and/or an alternate transient storage location; and causing the aircraft computing device to receive the data file from the ground computing device via the alternate aircraft interface computing device and/or the alternate transient storage location.

E18. The method of any of paragraphs E1-E17, further comprising:

determining metadata for the initial communication; and transmitting a notification to the ground computing device that includes the metadata for the initial communication.

E18.1. The method of paragraph E18, wherein the metadata for the initial communication includes one or more of a name of the data file, a type of the data file, a size of the data file, a time stamp for the data file, a time stamp for the transfer, an airplane classifier, the airline identifier, the airplane identifier, a location of the aircraft, a location of the transient storage location, and a URL for the data file in the transient storage location.

E18.2. The method of any of paragraphs E18-E18.1, further comprising storing the metadata for the initial communication.

E18.3. The method of any of paragraphs E18-E18.2, further comprising tagging the data file with the metadata for the initial communication.

E19. The method of any of paragraphs E1-E18.3, further comprising:

receiving an additional initial communication from the aircraft service based on a break in communication between the aircraft computing device and the aircraft interface computing device that interrupted the transmission of the data file from the aircraft computing device to the transient storage location; and resuming the transmission of the data file from the aircraft computing device to the transient storage location.

E19.1. The method of paragraph E19, wherein the break in communication to the aircraft computing device comprises losing a network connection.

E19.2. The method of any of paragraphs E19-E19.1, wherein the break in communication is a failure of the aircraft interface computing device.

E19.3. The method of any of paragraphs E19-E19.2, wherein the break in communication corresponds to a failure of the transient storage location.

E19.4. The method of any of paragraphs E19-E19.3, wherein the resuming the transmission of the data file from the aircraft computing device to the transient storage location comprises determining the transient storage is available, and transmitting a notification to the aircraft that causes the transmission of the data file to the aircraft computing device and from the transient storage location to resume.

E19.5. The method of any of paragraphs E19-E19.4, wherein the resuming the transmission of the data file to the aircraft computing device and from the transient storage location is based on a/the metadata for the initial communication stored by the aircraft interface computing device.

E19.6. The method of any of paragraphs E19-E19.5, wherein the resuming the transmission of the data file to the aircraft computing device and from the transient storage location comprises:

transmitting the metadata for the additional initial communication to the ground computing device;

receiving, based on the metadata for the initial communication stored by the ground computing device, a notification from the ground computing device that the transmission of the data file is to be continued; and causing the transmission of the data file to the aircraft computing device and from the transient storage location to resume based on the notification that the transmission of the data file is to be continued.

E19.6.1. The method of paragraph E19.6, wherein the notification that the transmission of the data file is to be continued includes one or more of a status of the data file, a size of the data file stored on the transient storage location, and a location of the data file on the transient storage location.

E19.7. The method of any of paragraphs E19-E19.6.1, wherein the additional initial communication is received by the aircraft API executing on the aircraft interface computing device.

E19.8. The method of any of paragraphs E19-E19.6.1, wherein the aircraft interface computing device is a first aircraft interface computing device, and the additional initial communication is received by a second aircraft interface computing device.

E19.8.1. The method of paragraph E19.8, wherein the second aircraft interface computing device is geographically located in a different service sub-region than the first aircraft interface computing device.

E20. The method of any of paragraphs E1-E19.8.1, further comprising selecting an alternate transient storage location, and causing a remaining portion of the data file to be transmitted to the aircraft computing device and from the alternate transient storage location.

E20.1. The method of paragraph E20, wherein the selecting the alternate transient storage location comprises selecting the alternate transient storage location based on one or more of a new geographic location of the aircraft, performance data for the transient storage location, performance data for the alternate transient storage location, a failure of the transient storage location, performance data for the connection between the ground computing device and the transient storage location, performance data for the connection between the ground computing device and the alternate transient storage location, a type of connection between the aircraft computing device and the transient storage location, and a type of connection between the aircraft computing device and the alternate transient storage location.

E20.2. The method of any of paragraphs E20-E20.1, wherein the selecting the alternate transient storage location comprises selecting the alternate transient storage location from the plurality of transient storage locations.

E21. The method of any of paragraphs E1-E20.2, further comprising:

receiving, by the aircraft interface computing device, a further initial communication from an additional aircraft service executing on an additional aircraft computing device located onboard an additional aircraft;

determining, by the aircraft interface computing device, that an additional data file is to be transmitted to the additional aircraft computing device and from the ground computing device;

transmitting, to the ground computing device, an additional data signal configured to cause the additional data file to be transmitted from the ground computing device to the transient storage location; and causing the additional data file to be transmitted from the transient storage location to the additional aircraft computing device.

E22. The method of any of paragraphs E1-E20.2, further comprising:

receiving, by the aircraft interface computing device, a further initial communication from an additional aircraft service executing on an additional aircraft computing device located onboard an additional aircraft;

determining, by the aircraft interface computing device, that an additional data file is to be transmitted from the additional aircraft computing device to the ground computing device;

transmitting, to the ground computing device, an additional data signal configured to cause the additional data file to be transmitted from the ground computing device to an additional transient storage location that is different from the transient storage location; and causing the additional data file to be transmitted from the additional transient storage location to the additional aircraft computing device.

E23. The method of any of paragraphs E1-E22, wherein the initial communication is transmitted from the aircraft service to the aircraft API over a first communications medium, and one or more first communications are transmitted from the aircraft interface computing device to the ground computing device over a second communications medium that is different from the first communications medium.

E23.1. The method of paragraph E23, wherein the first communications medium is one of a wireless network, a satellite network, and a cellular network.

E23.2. The method of any of paragraphs E23-E23.1, wherein the second communications medium is the internet.

E23.3. The method of any of paragraphs E23-E23.1, wherein the second communications medium is a cloud computing network.

E24. The method of any of paragraphs E1-E23.3, wherein the receiving the initial communication from the aircraft service comprises establishing a secure connection between the aircraft computing device and the aircraft interface computing device.

E25. The method of any of paragraphs E1-E24, wherein the aircraft is in flight during the transmission of the initial communication.

F1. A computing method for data exchanges between an aircraft computing device executing an aircraft service on an aircraft and a ground computing device, the method comprising:

receiving, by the ground computing device, a data transmission from an aircraft interface computing device located remotely from the ground computing device, the data transmission indicating that a data file is to be transmitted from the ground computing device to the aircraft computing device in communication with the aircraft interface computing device via an aircraft API executing on the aircraft interface computing device; and transmitting, by the ground computing device, the data file to the aircraft computing device via a transient storage location associated with the aircraft interface computing device.

F1.1. The method of paragraph F1, wherein the ground computing device is configured to exchange the data file with one or more aircraft computing devices within a service region, wherein the service region comprises a plurality of service sub-regions.

F1.1.1. The method of paragraph F1.1, wherein the service region is a global region.

F2. The method of any of paragraphs F1-F1.1.1, wherein the transient storage location is a data storage resource of a cloud network.

F3. The method of any of paragraphs F1-F2, wherein the transmitting the data file to the aircraft computing device via the transient storage location corresponds to the ground computing device transmitting the data file from the transient storage location over the cloud network.

F4. The method of any of paragraphs F1-F3, wherein the transient storage location is geographically located remotely from the ground computing device.

F4.1. The method of paragraph F4, wherein the aircraft interface computing device is located in a first service sub-region of the plurality of service sub-regions, and the transient storage location is located in a second service sub-region of the plurality of service sub-regions that is different from the first service sub-region.

F4.1.1. The method of paragraph F4.1, wherein the aircraft interface computing device is geographically located remotely from the ground computing device.

F4.1.2. The method of paragraph F4.1, wherein the aircraft interface computing device is geographically located within a threshold distance of the transient storage location.

F5. The method of any of paragraphs F1-F4.1.2, wherein the aircraft API is one of a plurality of aircraft APIs, and wherein each aircraft API of the plurality of remote APIs executes on a plurality of aircraft interface computing devices.

F5.1. The method of paragraph F5, wherein each aircraft interface computing device of the plurality of aircraft interface computing device is located in a different service sub-region of the plurality of service sub-regions.

F6. The method of any of paragraphs F1-F5.1, further comprising receiving, from the aircraft interface computing device and by the ground computing device, one or more identifiers associated with an aircraft.

F6.1. The method of paragraph F6, wherein the one or more identifiers are associated with the aircraft, the aircraft computing device, and/or the aircraft service.

F6.2. The method of any of paragraphs F6-F6.1, wherein the one or more identifiers include an airline identifier and/or an airplane identifier.

F6.2.1. The method of paragraph F6.2, wherein the airline identifier comprises one or more of an international civil aviation organization (ICAO) code or an international air transport association (IATA) code.

F6.2.2. The method of paragraph F6.2, wherein the airplane identifier comprises one of a tail number, a registration number, a manufacturer number, and a serial number.

F7. The method of any of paragraphs F1-F6.2.2, further comprising determining an aircraft classifier associated with the aircraft.

F7.1. The method of paragraph F7, wherein the determining the aircraft classifier comprises receiving, from the aircraft interface computing device and by the ground computing device, the aircraft classifier associated with the aircraft.

F7.2. The method of paragraph F7, wherein the determining the aircraft classifier comprises determining, by the ground computing device, the aircraft classifier based at least in part on the airplane identifier.

F7.2.1. The method of paragraph F7.2, wherein the determining the aircraft classifier comprises accessing a data construct that identifies the aircraft classifier.

F7.2.1.1. The method of paragraph F7.2.1, wherein the data construct is a lookup table that stores relationships between the one or more identifiers and the aircraft classifier.

F8. The method of any of paragraphs F1-F7.2.1.1, further comprising determining that the data file is to be transmitted via the transient storage location.

F8.1. The method of paragraph F8, wherein the determining that the data file is to be transmitted via the transient storage location comprises selecting the transient storage location from a plurality of transient storage locations.

F8.2. The method of any of paragraphs F8-F8.1, wherein the determining that the data file is to be transmitted via the transient storage location is based on the ground computing device determining the location of the transient storage location is geographically within a threshold distance of the aircraft.

F8.3. The method of any of paragraphs F8-F8.2, wherein the determining that the data file is to be transmitted via the transient storage location is based on the ground computing device determining the aircraft will be located within the threshold distance of the transient storage location at the time the data file will be transferred to the aircraft computing device.

F8.4. The method of any of paragraphs F8-F8.3, wherein the data file is preloaded to the transient storage location before the aircraft is geographically located within the threshold distance of the transient storage location.

F8.5. The method of any of paragraphs F8-F8.4, wherein the transient storage location is selected from a plurality of potential transient storage locations based on a flight plan of the aircraft.

F8.6. The method of any of paragraphs F8-F8.5, wherein the transient storage location is a cloud storage resource that is geographically located within the threshold distance of the transient storage location during at least a portion of the flight plan of the aircraft and/or that is expected to have an efficient connection to the aircraft computing device during at least the portion of the flight plan of the aircraft.

F8.7. The method of any of paragraphs F8-F8.6, wherein the transient storage location is selected from the plurality of potential transient storage locations based on one or more of performance data for an alternate transient storage location, a failure of the transient storage location, performance data for the connection between the ground computing device and the transient storage location, performance data for the connection between the ground computing device and the alternate transient storage location, a type of connection between the aircraft computing device and the transient storage location, and a type of connection between the aircraft computing device and the alternate transient storage location.

F8.8. The method of any of paragraphs F8-F8.7, wherein the determining that the data file is to be transmitted via the transient storage location is based on the airline identifier and/or the airplane identifier.

F8.9. The method of any of paragraphs F8-F8.8, wherein the determining that the data file is to be transmitted via the transient storage location comprises:
receiving the airline identifier and/or the airplane identifier from the aircraft interface computing device; and
determining, based on the airline identifier and/or the airplane identifier, a selected transient storage location through which the data file is to be transmitted.

F8.10. The method of any of paragraphs F8-F8.9, wherein the determining that the data file is to be transmitted via the transient storage location is based on an airplane link type between the aircraft and the aircraft interface computing device.

F8.10.1. The method of paragraph F8.10, wherein the airplane link type is one of a Wi-Fi link, a cellular link, or a satellite link.

F8.11. The method of any of paragraphs F8-F8.10.1, wherein the determining that the data file is to be transmitted via the transient storage location is based on a file size of the data file, an onboard system type of the aircraft computing device, and/or hardware capabilities of the aircraft computing device.

F8.12. The method of any of paragraphs F8-F8.11, wherein the determining that the data file is to be transmitted via the transient storage location is based on a performance of the cloud computing network and/or a performance of the aircraft interface computing device.

F9. The method of any of paragraphs F1-F8.12, further comprising:
determining that a remaining portion of the data file is to be transferred from the ground computing device to the aircraft computing device via a different transient storage location; and
transmitting a notification that the remaining portion of the data file is to be transferred from the ground computing device to the aircraft computing device via the different transient storage location.

F9.1. The method of paragraph F9, wherein the determining the remaining portion of the data file is to be transferred from the ground computing device to the aircraft computing device via the different transient storage location is based on one or more of a new geographic location of the aircraft, performance data for the transient storage location, performance data for the alternate transient storage location, a failure of the transient storage location, performance data for the connection between the ground computing device and the transient storage location, performance data for the connection between the ground computing device and the alternate transient storage location, a type of connection between the aircraft computing device and the transient storage location, and a type of connection between the aircraft computing device and the alternate transient storage location.

F10. The method of any of paragraphs F1-F9.1, wherein the ground computing device receiving the data transmission from the aircraft interface computing device corresponds to receiving a first data transmission from a first aircraft interface computing device located in a first service sub-region, the first data transmission indicating that a first data file is to be transmitted from the ground computing device to a first aircraft computing device in communication with the first aircraft interface computing device.

F10.1. The method of paragraph F10, further comprising receiving, by the ground computing device, a second data transmission from a second aircraft interface computing device located in a second service sub-region, wherein the second service sub-region is different from the first service sub-region, and the second data transmission indicating that a second data file is to be transmitted from the ground computing device to a second aircraft computing device in communication with the second aircraft interface computing device.

F10.1.1. The method of paragraph F10.1, further comprising transmitting, by the ground computing device, the second data file to the second aircraft computing device via the transient storage location.

F10.1.2. The method of paragraph F10.1, further comprising transmitting, by the ground computing device, the second data file to the second aircraft computing device via the alternate transient storage location that is located in a different service sub-region from the transient storage location.

F10.2. The method of paragraph F10, further comprising receiving, by the ground computing device, a second data transmission from the first aircraft interface computing device, the second data transmission indicating that a third data file is to be transmitted from the ground computing device to a second aircraft computing device in communication with the first aircraft interface computing device.

F10.2.1. The method of paragraph F10.2, further comprising transmitting, by the ground computing device, the third data file to the second aircraft computing device via the transient storage location.

F10.2.2. The method of paragraph F10.2, further comprising transmitting, by the ground computing device, the third data file to the second aircraft computing device via the alternate transient storage location that is located in a different service sub-region from the transient storage location.

F11. The method of any of paragraphs F1-F10.2.2, wherein the data file includes a software update and/or a flight plan.

F12. The method of any of paragraphs F1-F11, wherein the data transmission is received from the aircraft interface computing device in response to the aircraft interface computing device receiving an initial communication from the aircraft.

F13. The method of any of paragraphs F1-F12, wherein the aircraft is in flight during a transmission of the data file from the transient storage location to the aircraft computing device.

F14. The method of any of paragraphs F1-F13, wherein the data file is transmitted to the aircraft from the transient storage location over a first communications medium, and the data transmission is transmitted to the transient storage location from the ground computing device over a second communications medium that is different from the first communications medium.

F14.1. The method of paragraph F14, wherein the first communications medium is one of a wireless network, a satellite network, and a cellular network.

F14.2. The method of any of paragraphs F14-F14.1, wherein the first communications medium is a downlink communication medium.

F14.3. The method of any of paragraphs F14-F14.2, wherein the second communications medium is the internet.

F14.4. The method of any of paragraphs F14-F14.2, wherein the second communications medium is a cloud computing network.

F15. The method of any of paragraphs F1-F14.3, wherein the aircraft interface computing device is an infrastructure component of a cloud computing network.

F16. The method of any of paragraphs F1-F15, further comprising receiving, from the aircraft interface computing device and by the ground computing device, an aircraft classifier associated with the aircraft.

F16.1. The method of paragraph F16, wherein the aircraft classifier corresponds to one or more of a type of the aircraft, a year of the aircraft, a model of the aircraft, an airline associated with the aircraft, a type of computing device on which the aircraft service is executing, a type of service to which the aircraft service corresponds, or a combination thereof.

F17. The method of any of paragraphs F1-F16.1, further comprising:

receiving an additional data transmission based on a break in communication between the aircraft computing device and the aircraft interface computing device and/or the transient storage location, the additional data transmission indicating that a remaining portion of the data file is to be transmitted from the ground computing device to the aircraft computing device; and resuming the transmission of the data file from the ground computing device to the aircraft computing device.

F17.1. The method of paragraph F17, wherein the break in communication corresponds to the aircraft computing device losing a network connection.

F17.2. The method of paragraph F17, wherein the break in communication corresponds to a failure of the aircraft interface computing device.

F17.3. The method of paragraph F17, wherein the break in communication corresponds to a failure of the transient storage location.

F17.4. The method of any of paragraphs F17-F17.3, wherein the resuming the transmission of the data file from the transient storage location to the aircraft computing device comprises determining the transient storage location is available.

F17.5. The method of any of paragraphs F17-F17.4, wherein the resuming the transmission of the data file from the transient storage location to the aircraft computing device is based on metadata for the data file.

F17.6. The method of any of paragraphs F17-F17.5, wherein the resuming the transmission of the data file from the ground computing device to the aircraft computing device comprises transmitting to the aircraft interface computing device a notification that includes one or more of a status of the data file, a size of the data file stored on the transient storage location, and a location of the data file on the transient storage location.

F17.7. The method of any of paragraphs F17-F17.6, wherein the additional data transmission is received from the aircraft interface computing device.

F17.8. The method of any of paragraphs F17-F17.7, wherein the aircraft interface computing device is a first aircraft interface computing device, and the additional data transmission is received from a second aircraft interface computing device.

F17.8.1. The method of paragraph F17.8, wherein the second aircraft interface computing device is geographically located in a remote location from the first aircraft interface computing device.

F18. The method of any of paragraphs F1-F17.8.1, wherein the receiving the data transmission from the aircraft interface computing device indicating the data file is to be transmitted from the aircraft computing device to the ground computing device comprises:

receiving, from the aircraft interface computing device, one or more of the aircraft classifiers and the one or more identifiers associated with the aircraft;

determining that the data file is to be transmitted from the aircraft computing device to the ground computing device is based on the one or more of the aircraft classifiers and the one or more identifiers associated with the aircraft; and transmitting, to the aircraft interface computing device, a notification that the data file is to be transmitted from the aircraft computing device to the ground computing device.

F18.1. The method of paragraph F18, further comprising determining, by the ground computing device, that the data file is to be transmitted from the ground computing device to the aircraft computing device by accessing a command queue associated with the aircraft.

F19. The method of any of paragraphs F1-F18.1, further comprising:

determining that the data file has been transmitted to the aircraft computing device and from the ground computing device;

determining, based on the command queue, an additional data file is to be exchanged between the central storage and the aircraft computing device; and exchanging the additional data file between the ground computing device and the aircraft computing device.

F20. The method of any of paragraphs F1-F19, wherein the ground computing device hosts and/or maintains the command queue in an accessible storage location.

F21. The method of any of paragraphs F1-F20, further comprising receiving, by the ground computing device, a command to transmit the data file to the aircraft computing device.

F21.1. The method of paragraph F21, wherein the command to transmit the data file is received from a third party computer separate from the ground computing device.

F21.2. The method of paragraph F21, wherein the command to transmit the data file is received via a user input received by one of the ground computing device and a user computer associated with the ground computing device.

F21.3. The method of any of paragraphs F21-F21.2, wherein the command to transmit the data file is added to the command queue based on the receiving the command to transmit the data file to the aircraft computing device.

G1. A computing method for data exchanges between an aircraft computing device executing an aircraft service on an aircraft and a ground computing device, the method comprising:

accessing a command queue associated with the aircraft computing device located on an aircraft, wherein the command queue corresponds to a data structure that identifies a plurality of commands that are to be executed in association with the aircraft computing device;

determining a command in the command queue is to be executed, wherein the command corresponds to a notification that a data file is to be exchanged between the aircraft computing device and the ground computing device; and transmitting, by the ground computing device, a data transmission to an aircraft API operating on an aircraft interface computing device, wherein the data transmission is configured to cause the aircraft API to cause the data file to be exchanged between the aircraft computing device and the ground computing device.

G2. The method of paragraph G1, wherein the data file is exchanged between the aircraft computing device and the ground computing device while the aircraft is in flight.

G3. The method of any of paragraphs G1-G2, wherein the command corresponds to a notification that the data file is to be transmitted to the ground computing device and from the aircraft computing device.

G3.1. The method of paragraph G1, further comprising causing the data file to be stored in a storage device associated with the ground computing device.

G3.1.1. The method of paragraph G3.1, wherein a central storage location segregates stored data according to one or more aircraft classifiers.

G3.1.1.1. The method of paragraph G3.1.1, wherein individual aircraft classifiers of the one or more aircraft classifiers correspond to one or more of a type of the aircraft, a year of the aircraft, a model of the aircraft, an airline associated with the aircraft, a type of computing device on which an aircraft service is executing, a type of service to which the aircraft service corresponds, or a combination thereof.

G3.2. The method of paragraph G1, further comprising transmitting the data file to a third party computer associated with a third party airline.

G4. The method of any of paragraphs G1-G2, wherein the command corresponds to a notification the data file is to be transmitted to the aircraft computing device and from the ground computing device.

G4.1. The method of paragraph G4, wherein the command corresponds to a notification the data file is to be exchanged between a plurality of aircraft computing devices executing on a plurality of aircraft and the ground computing device.

G5. The method of any of paragraphs G1-G4.1, wherein the data file comprises one or more of a software update, a flight plan, a security log, a performance log, health monitoring data, and/or a system log.

G6. The method of any of paragraphs G1-G5, further comprising receiving, from the aircraft interface computing device, a data transmission that includes a command request and one or more identifiers associated with the aircraft.

G6.1. The method of paragraph G6, wherein the command request is received from the aircraft interface computing device in response to the aircraft interface computing device receiving an initial communication from the aircraft computing device.

G6.1.1. The method of paragraph G6.1, wherein the initial communication is received from the aircraft computing device while the aircraft is in flight.

G6.1.2. The method of any of paragraphs G6.1-G6.1.1, wherein the initial communication includes the command request.

G6.1.2.1. The method of paragraph G6.1.2, wherein the ground computing device is configured to access the command queue associated with the aircraft computing device located on the aircraft based on the command request received from the aircraft interface computing device.

G6.1.3. The method of any of paragraphs G6.1-G6.1.2.1, wherein the ground computing device is configured to access the command queue associated with the aircraft computing device located on the aircraft based on the one or more identifiers.

G6.1.3.1. The method of paragraph G6.1.3, wherein the initial communication includes the one or more identifiers for the aircraft, the aircraft computing device, and/or the aircraft service.

G6.2. The method of any of paragraphs G6-G6.1.3.1, wherein the one or more identifiers include an airline identifier and/or an airplane identifier.

G6.2.1. The method of paragraph G6.2, wherein the airline identifier comprises one of an international civil aviation organization (ICAO) code or an international air transport association (IATA) code.

G6.2.2. The method of any of paragraphs G6.2-G6.2.1, wherein the airplane identifier comprises one of a tail number, a registration number, a manufacturer number, and a serial number.

G6.3. The method of any of paragraphs G6-G6.2.2, further comprising:

determining an identity of the aircraft associated with the command based on the one or more identifiers associated with the aircraft; and selecting the command queue from a plurality of command queues based on the identity of the aircraft.

G7. The method of any of paragraphs G1-G6.3, wherein the ground computing device is configured to access the command queue associated with the aircraft computing device located on the aircraft based on the determination that a trigger condition has occurred.

G7.1. The method of paragraph G7, wherein the trigger condition corresponds to a time period expiring, a message being received, an alert being received, reception of a user input, a notification from a third party computing device being received, a location of the aircraft, or a combination thereof.

G8. The method of any of paragraphs G1-G7.1, wherein the command queue further identifies an order of the plurality of commands that indicates the sequence in which the individual commands are to be executed, and the determining that the command in the command queue is to be executed is based on the order of the plurality of commands in the command queue.

G8.1. The method of paragraph G8, wherein the determining that the command in the command queue is to be executed is based on the order of the plurality of commands in the command queue is based on a/the one or more identifiers.

G8.2. The method of any of paragraphs G8-G8.1, wherein the determining that the command in the command queue is to be executed based on the order of the plurality of commands in the command queue is based on a location of the aircraft.

G9. The method of any of paragraphs G1-G8.2, wherein the determining that the command in the command queue is to be executed is based on a performance of a cloud computing network.

G10. The method of any of paragraphs G1-G9, wherein the determining that the command in the command queue is to be executed is based on a file size of the data file, an onboard system type of the aircraft computing device, and/or hardware capabilities of the aircraft computing device.

G11. The method of any of paragraphs G1-G10, wherein the determining the command in the command queue is to be executed is based on a type of the trigger condition that has occurred.

G12. The method of any of paragraphs G1-G11, wherein the data transmission causes the remote API to transmit one or more communications to the aircraft API executing on the aircraft computing device.

G12.1. The method of paragraph G12, wherein the one or more communications to the aircraft service cause the data file to be exchanged between the aircraft computing device and the ground computing device.

G13. The method of any of paragraphs G1-G12.1, wherein causing the data file to be exchanged between the aircraft computing device and the ground computing device comprises the data file being transmitted from the aircraft computing device to the ground computing device.

G13.1. The method of paragraph G13, wherein the data file being transmitted from the aircraft computing device to the ground computing device comprises:

the data file being transmitted from the aircraft computing device to a transient storage location, wherein the transient storage location is a data storage resource of a cloud computing network; and wherein the method further comprises receiving, by the ground computing device, the data file from the transient storage location.

G13.1.1. The method of paragraph G13.1, wherein the data file is transmitted from the aircraft computing device to the transient storage location over one of a wireless network, a satellite network, and a cellular network.

G13.1.2. The method of any of paragraphs G13.1-G13.1.1, wherein the data file is received by the ground computing device and from the transient storage location over the cloud computing network.

G14. The method of any of paragraphs G1-G12.1, wherein causing the data file to be exchanged between the aircraft computing device and the ground computing device comprises transmitting the data file from the ground computing device to the aircraft computing device.

G14.1. The method of paragraph G14, wherein the transmitting the data file from the ground computing device to the aircraft computing device comprises:

transmitting, by the ground computing device, the data file to a transient storage location, wherein the transient storage location is a data storage resource of a cloud computing network; and transmitting the data file to the aircraft computing device from the transient storage location.

G14.1.1. The method of paragraph G14.1, wherein the data file is received by the aircraft computing device and from the transient storage location over one of a wireless network, a satellite network, and a cellular network.

G14.1.2. The method of any of paragraphs G14.1-G14.1.1, wherein the data file is transmitted by the ground computing device to the transient storage location over the cloud computing network.

G15. The method of any of paragraphs G1-G14.1.2, further comprising determining a break in communication between the aircraft computing device and the ground computing device.

G15.1. The method of paragraph G15, further comprising storing metadata associated with the break in communication in the command queue.

G15.1.1. The method of paragraph G15.1, further comprising determining a data connection with the aircraft computing device is formed, and causing an exchange of the data file to resume based on the metadata associated with the break in communication.

G16. The method of any of paragraphs G1-G15.1.1, further comprising determining the exchange of the data file is complete.

G16.1. The method of paragraph G16, further comprising transmitting a notification to the aircraft interface computing device configured to cause the data file to be deleted from the transient storage location based on the exchange of the data file being complete.

G16.2. The method of any of paragraphs G16-G16.1, further comprising removing the command from the command queue.

G16.3. The method of any of paragraphs G16-G16.2, further comprising:

determining an additional command in the command queue is to be executed, wherein the additional command corresponds to an additional notification that an additional data file is to be exchanged between the aircraft computing device and the ground computing device; and transmitting, by the ground computing device, an additional data transmission to the aircraft API operating on the aircraft interface computing device, wherein the additional data transmission is configured to cause the aircraft API to cause the additional data file to be exchanged between the aircraft computing device and the ground computing device.

G17. The method of any of paragraphs G1-G14.1.2, further comprising receiving an input data communication that includes the command the data file is to be exchanged between the aircraft computing device and the ground computing device.

G17.1. The method of paragraph G17, wherein the command included in the input data communication indicates the data file is to be exchanged between a plurality of aircraft computing devices located on different aircrafts and the ground computing device.

G17.2. The method of any of paragraphs G17-G17.1, wherein the command included in the input data communication indicates that a plurality of data files are to be exchanged between the aircraft computing devices and the ground computing device.

G17.3. The method of any of paragraphs G17-G17.2, wherein the input data communication is received by the ground computing device from a third party computing device associated with an airline.

G17.4. The method of any of paragraphs G17-G17.2, wherein the input data communication corresponds to a user input to the ground computing device.

G17.5. The method of any of paragraphs G17-G17.2, wherein the input data communication corresponds to a user input to a computing device associated with the ground computing device.

G17.6. The method of any of paragraphs G17-G17.2, wherein the input data communication is received by the ground computing device from the aircraft computing device.

G17.7. The method of any of paragraphs G17-G17.6, wherein the command included in the input data communication indicates that the data file is to be exchanged between the ground computing device and one or more aircraft associated with a specified aircraft classifier.

G17.8. The method of any of paragraphs G17-G17.7, wherein the command included in the input data communication indicates that the data file is to be exchanged between the ground computing device and one or more aircraft associated with an aircraft identifier.

G17.9. The method of any of paragraphs G17-G17.8, further comprising adding the command to the command queue.

G18. The method of any of paragraphs G1-G17.9, further comprising reordering the command queue based on one or more of an importance or urgency of individual commands, the file size of the data file, the flight plan of the aircraft, a performance of the cloud computing network, and the hardware capabilities of the aircraft computing device.

H1. A computing device comprising:
a processing unit;
a memory; and
an API stored on the memory, wherein the API comprises non-transitory computer readable instructions that, when executed by the processing unit, cause the computing device to perform the computing methods of any of paragraphs A1-G18.

I1. Use of the computing device of paragraph H1 to exchange a data file between an aircraft computing device and a ground computing device.

J1. Non-transitory computer readable instructions stored on a memory of a computing device that, when executed by a processing unit of the computing device, cause the computing device to perform the computing methods of any of paragraphs A1-G18.

K1. Use of the non-transitory computer readable instructions of paragraph J1 to exchange a data file between an aircraft computing device and a ground computing device.

L1. A cloud computing system for supporting data communication between a plurality of aircraft computing devices and a ground computing device, the cloud computing system comprising:
the plurality of aircraft computing devices, each aircraft computing device being located on a corresponding aircraft;
a plurality of aircraft interface computing devices of the cloud computing system, wherein individual aircraft interface computing devices of the plurality of aircraft interface computing devices store non-transitory computer readable instructions that, when executed by a processing unit of the individual aircraft interface computing devices, cause the individual aircraft interface computing devices to perform the computing methods of any of paragraphs A1-A23.2.2, C1-C30, and E1-E25;
a plurality of transient storage locations of the cloud computing system; and
a ground computing device, wherein the ground computing device stores non-transitory computer readable instructions that, when executed by a processing unit of the ground computing device, cause the ground computing device to perform the computing methods of any of paragraphs B1-19.2, D1-D24.1, F1-F21.3, and G1-G18.

M1. Use of the cloud computing system of paragraph L1 to exchange a data file between an aircraft computing device and a ground computing device.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B")

may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B, (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

The invention claimed is:

1. A computing method for transmitting data from a plurality of aircraft computing devices on a plurality of aircraft to a ground computing device, the method comprising:

receiving, by a first appropriate aircraft application programming interface (API) executing on a ground-based aircraft interface computing device, a first initial communication from a first aircraft service executing on a first aircraft computing device of a first aircraft, wherein the first appropriate aircraft API is one of a plurality of aircraft APIs available for execution on the ground-based aircraft interface computing device, and wherein each of the plurality of aircraft APIs is configured to communicate with a unique aircraft service of a unique aircraft computing device;

determining, by the first appropriate aircraft API, that a first data file is to be transmitted from the first aircraft computing device to the ground computing device;

transmitting, by the first appropriate aircraft API to the first aircraft computing device, a first data signal configured to cause the first data file to be transmitted from the first aircraft computing device to a ground-based transient storage location associated with the ground-based aircraft interface computing device;

causing transmission of the first data file from the ground-based transient storage location to the ground computing device;

receiving, by a second appropriate aircraft API of the plurality of aircraft APIs a second initial communication from a second aircraft service executing on a second aircraft computing device of a second aircraft, wherein the second aircraft service and the second aircraft computing device are different from the first aircraft service and the first aircraft computing device;

determining, by the second appropriate aircraft API, that a second data file is to be transmitted from the second aircraft computing device to the ground computing device;

transmitting, by the second appropriate aircraft API to the second aircraft computing device, a second data signal configured to cause the second data file to be transmitted from the second aircraft computing device to the ground-based transient storage location; and causing transmission of the second data file from the ground-based transient storage location to the ground computing device.

2. The method of claim 1, wherein the causing the first data file to be transmitted from the ground-based transient storage location comprises:

determining a location the first data file is to be stored in the ground computing device;

transmitting, by the ground-based aircraft interface computing device, at least one of one or more identifiers associated with the first aircraft and an aircraft classifier associated with at least one of the first aircraft service, the first aircraft computing device, and the first aircraft to the ground computing device;

receiving, by the ground-based aircraft interface computing device and from the ground computing device, a unique storage location that the first data file is to be stored in the ground computing device; and causing the transmission of the first data file to the location in the ground computing device based on the unique storage location.

3. The method of claim 1, further comprising determining that the first data file is to be transmitted from the first aircraft computing device to the ground computing device via the ground-based transient storage location.

4. The method of claim 3, wherein the determining that the first data file is to be transmitted from the first aircraft computing device to the ground computing device via the ground-based transient storage location comprises selecting the ground-based transient storage location from a plurality of ground-based transient storage locations that are geographically remote with respect to each other.

5. The method of claim 3, wherein the determining that the first data file is to be transmitted via the ground-based transient storage location comprises determining that the ground-based transient storage location is geographically located within a threshold distance of the first aircraft.

6. The method of claim 3, wherein the determining that the first data file is to be transmitted via the ground-based transient storage location comprises:

transmitting one of an airline identifier or an airplane classifier associated with the first aircraft to the ground computing device; and receiving, from the ground computing device and based on the one of the airline identifier or the airplane classifier, an identification of a selected ground-based transient storage location based on a geographic location of the first aircraft.

7. The method of claim 3, wherein the determining that the first data file is to be transmitted via the ground-based transient storage location is based on at least one of:

a file size of the first data file;

an onboard system type of the first aircraft computing device;

hardware capabilities of the first aircraft computing device;

a performance of a cloud network; and a performance of the ground-based aircraft interface computing device.

8. The method of claim 1, wherein each of the plurality of aircraft APIs executes on a plurality of ground-based aircraft interface computing devices.

9. The method of claim 1, further comprising deleting the first data file from the ground-based transient storage location based on receiving a data transmission from the ground computing device corresponding to a notification that the first data file has been fully transmitted.

10. The method of claim 1, wherein the ground-based transient storage location receives the first data file in component subparts, and the method further comprises aggregating the component subparts to form the first data file.

11. The method of claim 1, further comprising:

receiving an additional initial communication from the ground-based aircraft interface computing device based on a break in communication between the first aircraft computing device and the ground-based aircraft interface computing device that interrupted the transmission of the first data file from the first aircraft computing device to the ground-based transient storage location; and resuming the transmission of the first data file from the first aircraft computing device to the ground-based transient storage location.

12. The method of claim 11, wherein the break in communication to the ground computing device corresponds to one of:

the first aircraft computing device losing a network connection;

a failure of the ground-based aircraft interface computing device; or a failure of the ground-based transient storage location.

13. The method of claim 11, wherein the resuming the transmission of the first data file from the first aircraft computing device to the ground-based transient storage location comprises determining the ground-based transient storage location is available, and transmitting a notification to the first aircraft that causes transmission of the first data file from the first aircraft computing device to the ground-based transient storage location to resume.

14. The method claim 1, further comprising selecting an alternate ground-based transient storage location, and causing a remaining portion of the first data file to be transmitted from the first aircraft computing device to the alternate ground-based transient storage location.

15. The method of claim 1, further comprising:

receiving, by the ground-based aircraft interface computing device, an additional initial communication from an additional aircraft service executing on an additional aircraft computing device located onboard an additional aircraft;

determining, by the ground-based aircraft interface computing device, that an additional data file is to be transmitted from the additional aircraft computing device to the ground computing device;

transmitting, to the additional aircraft service, an additional data signal configured to cause the additional data file to be transmitted from the additional aircraft computing device to the ground-based transient storage location; and causing the additional data file to be transmitted from the ground-based transient storage location to the ground computing device.

16. A computing method for exchanging data between aircraft computing devices executing aircraft services on aircraft and a ground computing device, the method comprising:

receiving, by the ground computing device, a first data transmission from a first ground-based aircraft interface computing device and in communication with a first aircraft computing device of a first aircraft via a first appropriate aircraft application programming interface (API) of a plurality of aircraft APIs available for execution on the first ground-based aircraft interface computing device, each of the plurality of aircraft APIs configured to communicate with a unique aircraft service of a unique aircraft computing device, the first data transmission indicating that a first data file is to be transmitted from the first aircraft computing device to the ground computing device;

receiving, by the ground computing device, the first data file from the first aircraft computing device via a first ground-based transient storage location associated with the ground-based aircraft interface computing device;

receiving, by the ground computing device, a second data transmission from a second ground-based aircraft interface computing device and in communication with a second aircraft computing device of a second aircraft via a second appropriate aircraft API of the plurality of aircraft APIs available for execution on the second ground-based aircraft interface computing device; and receiving, by the ground computing device, the second data file from the second aircraft computing device via a second ground-based transient storage location associated with the second ground-based aircraft interface computing device.

17. The method of claim 16, wherein the first ground-based aircraft interface computing device is located in a first service sub-region of a plurality of service sub-regions, and wherein the second ground-based aircraft interface computing device is located in a second service sub-region of the plurality of service sub-regions.

18. The method of claim 16, further comprising:
receiving an additional data transmission based on a break in communication between the first aircraft computing device and one of the first ground-based aircraft interface computing device and the first ground-based transient storage location, the additional data transmission indicating that a remaining portion of the first data file is to be transmitted from the first aircraft computing device to the ground computing device; and
resuming the transmission of the first data file from the first aircraft computing device to the ground computing device.

19. The method of claim 18, wherein the additional data transmission is received from a third ground-based aircraft interface computing device.

20. The method of claim 16, wherein receiving the first data file from the first aircraft computing device via the first ground-based transient storage location comprises:
receiving the first data file from the first ground-based transient storage location in component subparts; and
aggregating, by the ground computing device, the component subparts to form the first data file.

* * * * *